March 23, 1937.　　　E. L. DUNN ET AL　　　2,074,578
ELEVATOR CONTROL
Filed Dec. 21, 1934　　　13 Sheets-Sheet 3
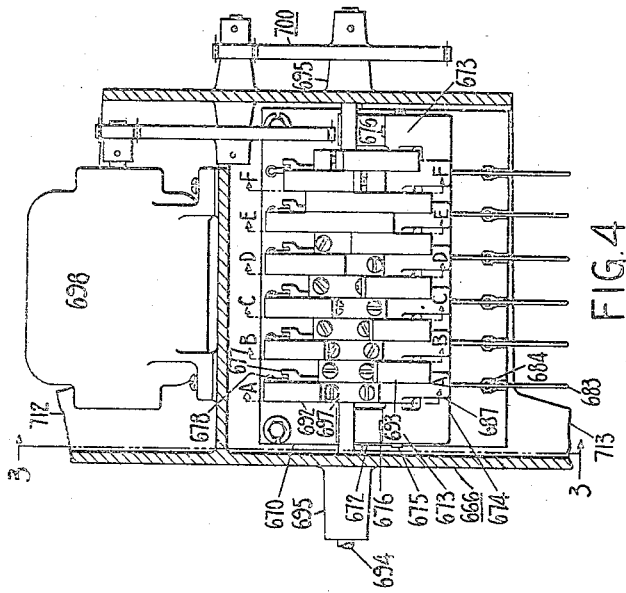
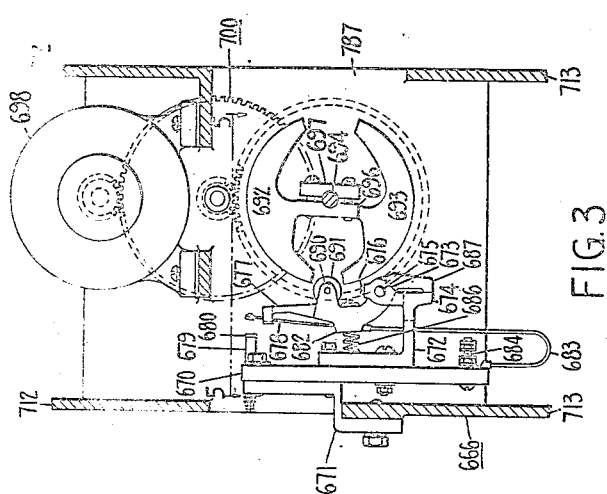
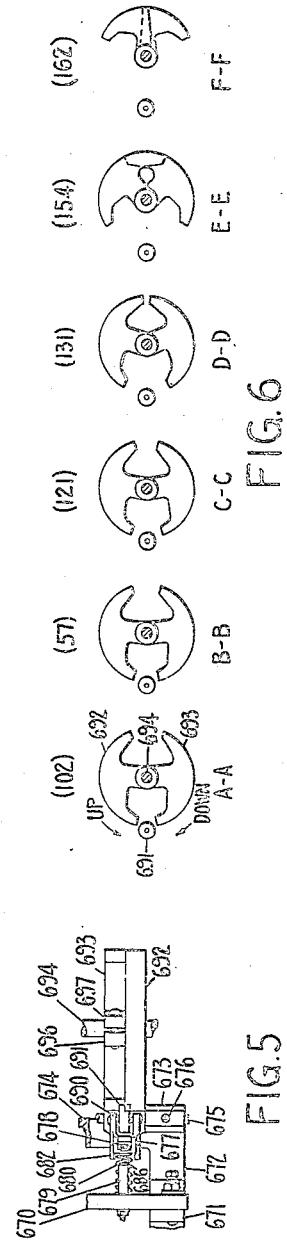
Edward Lee Dunn
David Carl Larson    INVENTORS
BY   Arthur E. Bradley   ATTORNEY March 23, 1937.   E. L. DUNN ET AL   2,074,578
ELEVATOR CONTROL
Filed Dec. 21, 1934   13 Sheets-Sheet 4

Edward Lee Dunn
David Carl Larson   INVENTORS
BY Walter R. Bradley   ATTORNEY

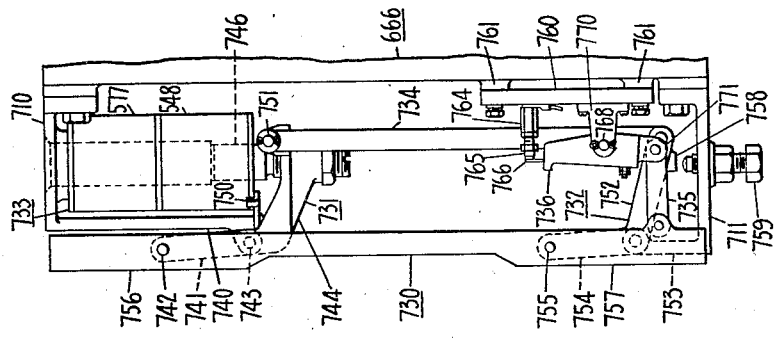
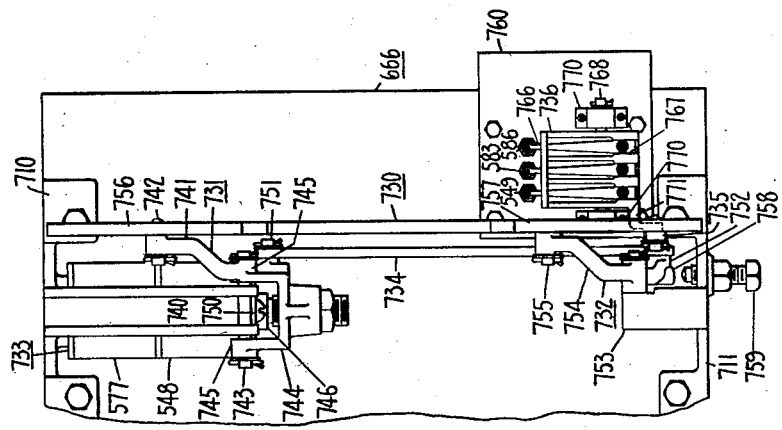

March 23, 1937.　　　E. L. DUNN ET AL　　　2,074,578
ELEVATOR CONTROL
Filed Dec. 21, 1934　　　13 Sheets-Sheet 6
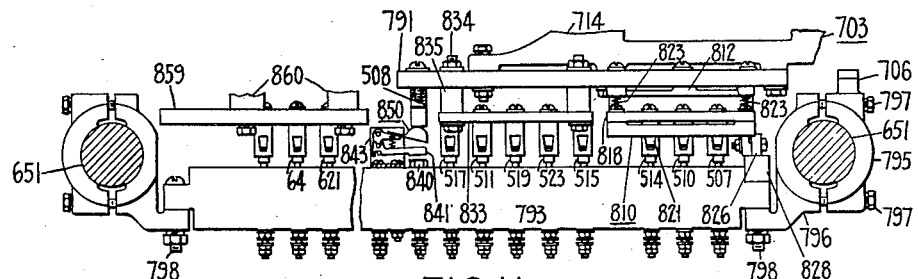
FIG.11
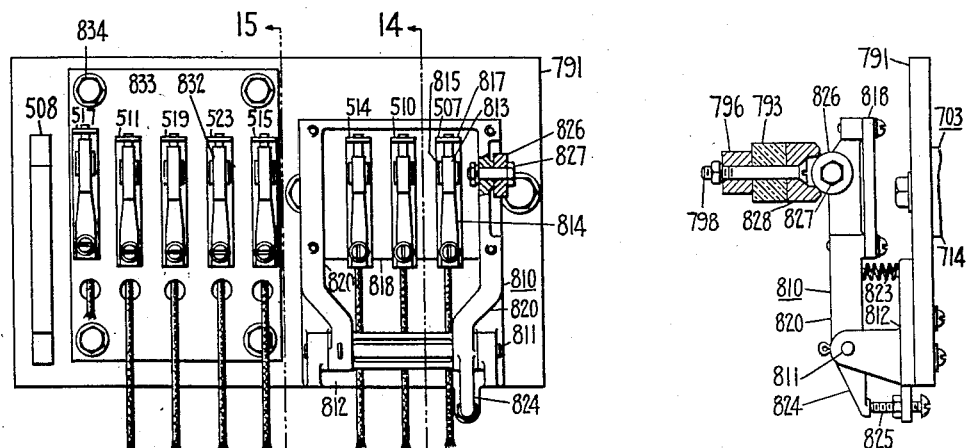
FIG.12
FIG.13
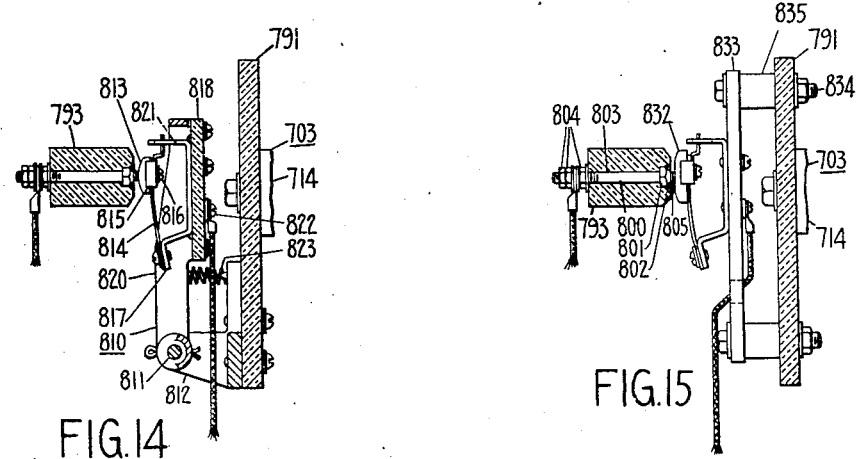
FIG.14
FIG.15
Edward Lee Dunn
David Carl Larson } INVENTORS
BY _____ ATTORNEY March 23, 1937.   E. L. DUNN ET AL   2,074,578
ELEVATOR CONTROL
Filed Dec. 21, 1934    13 Sheets—Sheet 7

Edward Lee Dunn
David Carl Larson   INVENTORS
BY Walter T. Bradley   ATTORNEY

March 23, 1937.  E. L. DUNN ET AL  2,074,578
ELEVATOR CONTROL
Filed Dec. 21, 1934   13 Sheets-Sheet 8

Edward Lee Dunn
David Carl Larson   INVENTORS
BY  Walter...Bradley   ATTORNEY

Patented Mar. 23, 1937

2,074,578

UNITED STATES PATENT OFFICE 2,074,578

ELEVATOR CONTROL

Edward Lee Dunn, Livingston, N. J., and David Carl Larson, Yonkers, N. Y., assignors to Otis Elevator Company, New York, N. Y., a corporation of New Jersey Application December 21, 1934, Serial No. 758,548

55 Claims. (Cl. 187—29)

The invention relates to elevators. It is directed to the control of certain operations of the elevator car and to mechanism employed in effecting such control.

Although certain features of the invention are of utility in connection with simple forms of elevator control, the invention is of particular utility in connection with elevator controls which are in comparison exceedingly complicated. In order that all the features and advantages of the invention may be readily understood, it will be described as embodied in one of these more complicated forms of control. In view of the complexity of such system, its operation will first be outlined as an aid to an understanding of the principles and features of the invention.

The starting of the elevator car after each stop is under the control of an attendant in the car, while the stopping of the car is automatic. Stops to discharge passengers are made in response to push buttons within the elevator car operated by the attendant as directed by the passengers. Stops to take on passengers are made in response to push buttons at the landings operated by the intending passengers themselves. Such control as applied to a plurality of elevator cars involves controlling the stopping of all cars by the push buttons at the landings, these buttons being common to the cars.

The starting of the car is effected by a manual operation on the part of the car attendant. Mechanism actuated in accordance with movement of the elevator car is provided which cooperates with stationary circuit controlling means to select the floors at which stops are to be made to be in accordance with the push buttons operated. When the car nears the landing for which a push button has been pressed it is caused to slow down. It is thereafter brought to a stop as it arrives at the landing. A light is lighted at the floor in accordance with the direction in which the car is to leave the floor for the information of intending passengers. Stops are made in the natural order of floors, regardless of the order in which the push buttons are operated. When a plurality of elevators are operated in a group, but one car is caused to respond to each operated hall button, the car selected being determined by the relative positions of the cars and their directions of travel.

One feature of the invention resides in the provision of a plurality of switches for controlling the speed of an elevator car which are actuated by car movement to control the complete slow down of the car for each floor, regardless of the slow down distance involved.

Another feature of the invention is to operate the speed controlling switches in effecting the starting of the car and to cause the number of switches operated to be in accordance with the slow down distance involved in the next stop to be made.

Another feature is to advance a device, carried by a member actuable in accordance with car movement, with respect to this member as the speed controlling switches are operated in effecting the starting of the car and to bring the device to a stop by stopping means provided for the floor at which the next stop is to be made, either in a partially or fully advanced condition depending upon the length of the run to that floor, the number of speed controlling switches operated being determined by the amount of such advance.

Still another feature of the invention is to take up the advance of the device after it has been brought to a stop by movement of said member in accordance with car movement and in so doing to restore the speed controlling switches as the car arrives at decreasing distances from the floor.

Another feature is to effect the advance of said device prior to the actual starting of the car.

Another feature resides in the provision of mechanism for facilitating the setting of the speed control switches.

Another feature of the invention is to arrange the mechanism, which cooperates with the stationary circuit controlling means, on said device to be advanced thereby with respect to said member actuated in accordance with car movement.

Another feature is to stop the movement of said device upon cooperation of said mechanism with stationary circuit controlling means corresponding to an operated push button.

Still another feature is to effect cooperation between the mechanism carried by said device and each stationary circuit controlling means for but a fraction of the time that they are opposite each other.

Another feature of the invention is to cause the period during which a hall light is lighted to be of maximum duration without false or duplicate indications.

Another feature of the invention resides in improvements in mechanism for bringing the car to an exact landing level.

There are many other features and advantages. These will be set forth in the following description and appended claims.

In the drawings:

Figure 3 is a detail in side elevation of the selector switches and operating mechanism therefor;

Figure 4 is another detail of the same in front elevation, Figure 3 being taken along the line 3—3 of Figure 4;

Figure 5 is a fragmental detail of one of the selector switches and its operating cams as viewed from above, this view being taken along the line 5—5 of Figure 3;

Figure 6 illustrates the settings of the operating cams for the selector switches, these views being taken along the lines A—A, B—B, C—C, D—D, E—E and F—F of Figure 4;

Figure 9 is a detail in side elevation of mechanism for retracting the pawls and a control switch operated thereby for the advancer mechanism;

Figure 10 is a detail of the same in front elevation;

Figure 11 is a top view of a floor bar of the selector, illustrating the arrangement of the stationary contacts and floor brush switch thereon, and also illustrating the travelling brushes for engaging the stationary contacts and the cam for operating the floor brush switch;

Figure 12 is a detail in front elevation of the stopping, reset, hall light, and automatic reversal brushes, and the operating cam shown in Figure 11;

Figure 13 is a side view of the frame which carries the stopping brushes, illustrating the arrangement for controlling the manner in which the stopping brushes engage their cooperating stationary contacts;

Figure 14 is a side view taken along the line 14—14 of Figure 12, showing one of the stopping brushes and also showing the manner in which it cooperates with a stationary contact;

Figure 15 is a side view taken along the line 15—15 of Figure 12, showing a reset brush in engagement with a stationary contact;

Figure 1:
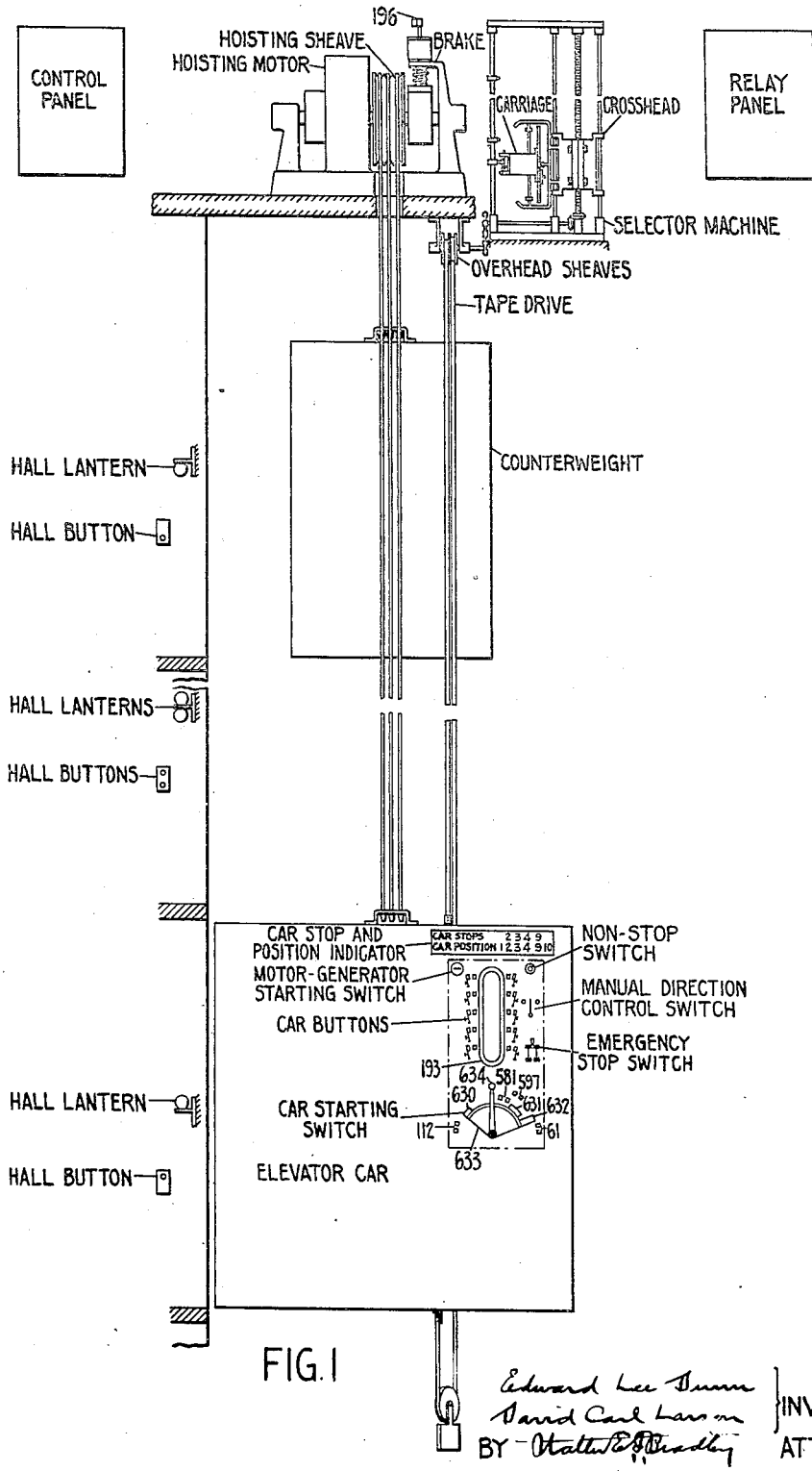
Figure 1 is a simplified schematic representation of an elevator installation in accordance with the invention.

For a general understanding of the invention, reference may be had to Figure 1, wherein various parts of the system, chosen to illustrate the principles of the invention, are indicated by legend. The elevator car is raised and lowered by means of a hoisting motor. This motor drives a traction sheave over which pass the hoisting ropes for the car and counterweight. An electromagnetic brake is provided and is applied to effect the final stopping operation and to hold the car when at rest.

A plurality of control switches are provided in the car, some of which are shown in Figure 1. These switches include a motor generator starting switch, a non-stop switch, a series of push button switches, an emergency stop switch, a direction control switch and a car starting switch. All of these switches are for operation by the car attendant.

The car starting switch comprises a plurality of pairs of contacts designated 112, 581, 597 and 61. Bridging contacts 630, 631 and 632 are mounted on a pivoted segment 633 for bridging these pairs of stationary contacts. Segment 633 is operated by means of operating handle 634. The car starting switch segment may be moved into three different operative positions from neutral. Two of these operative positions are attained by movement of the segment counterclockwise about its pivot. In one of these positions, contact 631 bridges contacts 581. Further counterclockwise movement causes contact 630 to bridge contacts 112 and contact 632 to bridge contacts 597. Contact 631 is elongated so as to maintain contacts 581 bridged in this second position of the car switch. This second position is the full start position of the switch, to which it must be moved to effect the starting of the car.

The car starting switch also controls the closing and opening of the car gate and hatchway doors. The door and gate closing operation is effected by moving the car starting switch to its first or intermediate position, where contact 631 bridges contacts 581. The bridging of contacts 581 also causes certain other control operations to take place, which will be discussed later. The preferred operation, however, is to move the starting switch immediately from neutral to full start position. The opening of the car gate and hatchway door is effected by operating handle 634 to move segment 633 clockwise about its pivot into position where contact 632 bridges contact 61. The car cannot start unless the car gate and all the hatchway doors for that car are closed.

The slowing down of the car preparatory to stopping to effect passenger transfers is initiated in response to the push buttons within the car and also to push buttons at the landings.

The pressing of a car button causes the car, upon its arrival at the proper slow down distance from the floor corresponding to the button pressed, to be slowed down and thereafter brought to a stop with the car level with the landing. There is only one car button in the car for each floor, these buttons serving both as up and as down buttons. That is, during up travel of the car, each button is effective to cause slow down to be initiated upon the arrival of the car at a certain distance below the landing, and, during down travel, the same button is effective to cause slow down to be initiated upon the arrival of the car at a certain distance above the landing. The car buttons, once pressed, are held in operated condition by means of a magnet 193. This magnet is in the form of an elongated coil which is controlled so as to be deenergized when the direction of car travel is reversed. This releases all operated car buttons. The coil is immediately reenergized as a part of the reversing operation, so that subsequently operated car buttons are again held in operated condition.

Where a plurality of cars are operated as a group, the push buttons at the landings are common to all the cars of the group and are capable of causing the slowing down of any one of them. Both an up hall button and a down hall button are provided at each intermediate floor served by the cars of the group. When an up hall button is pressed, the first available up travelling car is caused to slow down and thereafter to be brought to a stop at the floor at which the button is located. Similarly, when a down hall button is pressed, the first available down travelling car is caused to slow down and thereafter to be brought to a stop at the floor at which the button is located. A hall button may be provided also at each of the terminal floors.

The hall buttons act through floor relays arranged on the relay panel. Each relay, once operated, is maintained so, permitting the push button which causes the operation to be released. The floor relays illustrated in the control system are of the latching type. Such a relay comprises an operating coil for causing the operation of the relay, latching mechanism for latching the relay in latched condition and a reset coil energizable to release the latching mechanism. The reset coil of an operated floor relay is not energized and therefore the relay is retained in operated condition until circuits are set up to answer the call registered thereby. The reset of the relay avoids causing other cars to be slowed down in answer to that call.

The floors are served in the natural order of floors for each direction of car travel, regardless of the order in which the push buttons for the floors are operated.

The slowing down of the car, preparatory to bringing it to a stop at a floor for which a push button has been pressed, is initiated by a selector machine for that car. The selector machines for the cars of the group also select the car which answers each operated hall button. These selector machines, in cooperation with other control apparatus, act automatically to select the first available car to respond to an operated hall button. This car may not be the car nearest the floor at which the button is located, but it is the car which is in effect the nearest car. The selector machine of the car to be stopped also causes further slow down to take place and finally causes the car to be brought to a stop at the floor landing.

Each selector machine is driven preferably by means of two steel tapes attached to the car. One tape extends from the top of the car to an overhead sheave. The other tape extends from the bottom of the car around a tension sheave and then up to a second overhead sheave. The tapes are wound on the overhead sheaves in a manner similar to the winding of a measuring tape, one being wound oppositely with respect to the other. The shaft upon which the overhead sheaves are mounted drives the selector machine through a chain and sprocket. One tape is unwound as the other is wound up in effecting the driving operation.

Each selector machine comprises a crosshead which is driven by a screw, which is in turn driven by the chain and sprocket, to move in accordance with movement of the car for which the machine is provided. The crosshead carries a carriage upon which is mounted mechanism for setting up circuits to cause the car to be slowed down and stopped at a floor. Mechanism is also mounted on the carriage for causing slow down to begin when the car arrives at a certain distance from the floor and for causing further slow down as the car arrives at decreasing distances from the floor. The carriage is advanced from a neutral position with respect to the crosshead in starting the car and its advance is stopped after a certain amount of movement by its engaging a stop. Thereafter the carriage moves with the crosshead. When circuits are set up to cause the car to be slowed down, the carriage is brought to a stop. This may occur before the carriage is fully advanced on a short run. In any case, the crosshead, which moves with the car, thereafter takes up the advance of the carriage so that when the car comes to a stop, the carriage is again in neutral. This relative action of the carriage and crosshead is utilized to control the slow down of the car.

Signals are arranged at the floors for advising intending passengers of the approach to the floor of a car which is to be stopped thereat to effect a transfer of passengers. These signals are preferably in the form of lamps, usually known as hall lanterns. Each car is provided with both an up hall lantern and a down hall lantern at each intermediate floor, an up hall lantern at the lower terminal and a down hall lantern at the upper terminal. The up hall lanterns at intermediate floors are lighted during upward travel of their respective cars and the down hall lanterns at intermediate floors are lighted during downward travel of their respective cars. When circuits are set up incident to answering the highest call to cause the direction of an up travelling car to be reversed as the car comes to a stop, the down hall lantern for that car at the floor at which the stop is being made is lighted instead of the up hall lantern at that floor.

A maximum duration of lighting of the hall lantern is provided. The hall lantern is lighted as soon as circuits are set up by the selector machine to cause the car to be slowed down and stopped at a floor. In case such circuits are set up before the carriage becomes fully advanced, the hall lantern for that car for the floor for which the circuits have been set up is lighted before the car starts. When full advance of the carriage has been obtained and the car has started, the proper hall lantern is lighted immediately circuits are set up to cause slow down and stopping of the car to take place. The hall lantern is maintained lighted during the slow down and stopping period and while the car is stopped at a floor. It is not extinguished until the car starting switch has been moved to start position to start the car. The circuits for the hall lanterns are controlled by the selector machines.

Mechanism is also provided for each car for causing the car, upon being brought to a stop, to come to an exact landing level in case of an overrun or an underrun. This levelling mechanism may be arranged on the selector machine.

The electromagnetic switches for controlling the operation of each elevator are mounted on the control panel for that elevator.

Many of the mechanisms and elements which go to make a complete elevator system have not been illustrated in the drawings. Among these are the safety devices, including the safety governor, safety brake, buffers, limit switches, and various auxiliary switches included in the elevator car for operation by the car attendant. The system will be described in connection with the wiring diagrams as applied to a ten-floor installation. It is to be understood, however, that the system may be arranged for an installation of any number of floors.

Figure 2:
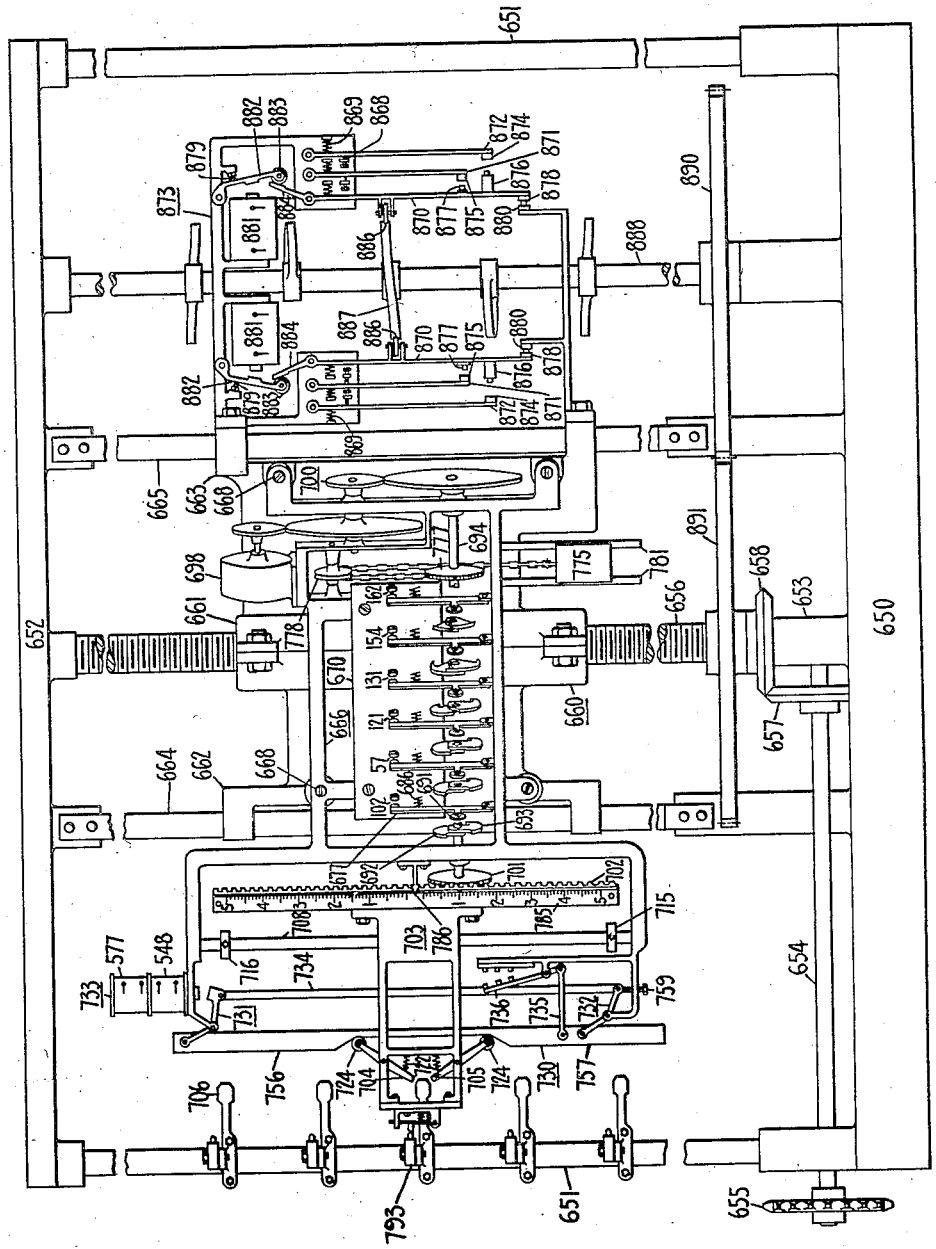
Figure 2 is a schematic representation of the selector machine used in the control system.

Reference may now be had to Figure 2, which illustrates schematically a selector machine of preferred construction. This figure is principally used to give a more comprehensive understanding of the machine and its operation. It is not intended to show the details of construction, the details of the various parts of the selector machine being illustrated in Figures 3 to 22 inclusive. In the drawings showing details of construction, certain parts, not involved in the operation of the portion of the mechanism illustrated in a particular figure of drawings, are not shown in that figure in order that the construction and operation of such portion of the mechanism may be readily understood.

Referring first to Figure 2, the selector machine comprises a frame formed by a base plate 650, four standards 651, and a top plate 652 supported by these standards. The standards are secured in sockets formed in bosses both on the base plate and the top plate. The base plate 650 is formed with a centrally disposed pedestal 653, which, together with a boss formed on the base plate at one side thereof, provides bearings for the selector machine operating shaft 654. The driving sprocket 655 for the selector machine is secured to the outer end of the shaft. This shaft drives a vertical screw 656 through the intermediary of bevel gears 657 and 658. The vertical screw is supported at its lower end by a ball thrust bearing and at its upper end extends into a bearing in a boss depending from top plate 652.

The vertical screw 656 drives a crosshead 660. This crosshead comprises a split nut 661 and guides 662 and 663 connected to the nut by flanges and cooperating with vertically extending guide bars 664 and 665 respectively to prevent rotative movement of the crosshead and to guide it as it is driven upwardly and downwardly by rotative movement of screw 656. The guide bars 664 and 665 extend from the base plate to the top plate and are secured to bosses formed on these plates.

The crosshead carries a plurality of switches 102, 57, 121, 131, 154 and 162. These switches are principally for controlling the retardation and stopping of the car. They also serve to determine the amount of acceleration on short runs. These switches are arranged within a box like frame 666. The frame is formed with lugs 667 (Figure 8) provided with aperatures through which screws 668 (Figure 2) extend into threaded bosses on the guide portions 662 and 663 of the crosshead, securing the frame to the crosshead. Each of the switches is of the same construction, the construction of one of them being shown in Figures 3 and 5.

Referring to these figures, a switch panel 670 is mounted on a bracket 671 secured to the frame 666. A bearing bracket 672 is secured to the face of the panel. This bracket comprises a pair of apertured lugs 673 connected by an elongated web 674. An elongated pivot pin 675 extends between the lugs 673 and is supported in the apertures. This pin is secured in place as by screws 676. The contact levers 677 of the switches are mounted in side by side relation on pin 675 between the lugs. These contact levers carry spring contacts 678 for cooperating with stationary contacts 679 secured to the switch panel.

Each of these switches is of the same construction. The stationary contact of each switch comprises a contact stud provided with a tungsten contacting tip 680 on its contacting end. The other end of the stud, which extends through the panel, is threaded and is provided with binding nuts for securing the stud to the panel and connecting the contact in the system. The movable contact for engaging the stationary contact is likewise tungsten tipped, this tip being carried by the end of the contacting spring 678. The contacting spring is of leaf spring construction, preferably of a bronze alloy. It extends downwardly into a channel formed on the contact lever by lugs 682, at which point it is secured to the lever as by a screw. This screw also secures a clip from which a flexible conductor 683 extends to a binding post 684. At the upper end of the contact lever, the spring extends through a slot which serves to protect the spring from being bent out of shape.

The contact lever is of insulating material and is pivoted on pin 675 at a point below the lugs 682. The contact lever is biased into position where the movable contact is disengaged from the stationary contact as by a spring 686 extending from a locating slot in the panel to the contact lever at a point between the lugs 682 where the securing screw for the movable contact serves as a spring seat. Below its pivot point the contact lever is formed with a depending stop arm 687 arranged to cooperate with web 674 to form a stop to limit the amount of movement of the contact lever by its biasing spring 686. Above its pivot point the contact lever is formed with outwardly extending lugs 690 provided with apertures through which extends a pivot pin for an operating roller 691. This roller is positioned in the path of movement of cams 692 and 693 to move the contact lever about its pivot against the force of spring 686 into contact engaging position.

The operating cams for the switches are secured to an operating shaft 694 rotatively supported in bosses 695 formed on the frame 666. These cams are arranged side by side on shaft 694. Each cam is arc-shaped, the camming surface being the arc of a circle with the center coinciding with the center of the operating shaft. The cam is clamped to the shaft by means of a clamping plate 697 secured as by screws to a counterpart 696 formed integral with the cam. The cams are positioned on the shaft so that the two cams for operating each switch straddle the operating roller 691 for that switch.

With the car stopped at a floor the cams assume a position in which their leading edges are substantially equally spaced from the rollers which they operate, so that substantially the same amount of rotative movement is required in one direction as in the other to close each switch. The cams are set so that their leading edges are increasingly farther from the rollers of the switches which they operate, in the order of switches 102, 57, 121, 131, 154 and 162. In other words, upon rotative movement of the operating shaft in either direction, the switches are closed in the order of switches 102, 57, 121, 131, 154 and 162. The relative positions of the cams of the various switches with respect to the rollers with the cam shaft in neutral are shown in Figure 6, wherein the switches operated by the cams are indicated in parentheses above the respective pairs of cams.

The rotative movement of the cams to close the switches is effected by a split field torque motor 698 through a train of gears 700. The motor and gears are mounted on the frame 666, the motor being positioned over the cams as illustrated in Figure 4.

Reverse rotative movement of shaft 694 to return the cams to positions permitting the opening of the switches by springs 686 is effected by movement of the elevator car in moving crosshead 660. Referring back to Figure 2, in rotating shaft 694 to effect the closing of the switches, the motor also acts through a gear 701 and rack 702 meshing therewith to vertically move a carriage 703, either up or down, depending upon the direction of rotation of the shaft. This advances the position of stopping pawls 704 and 705 with respect to the crosshead 660. These pawls cooperate with stopping lugs 706, one for each floor, secured to one of the standards 651, to bring carriage 703 to a stop. Thus, the rack 702 is stopped so that as the car continues to drive crosshead 660, gear 701 is rotated by the rack in a direction to move operating cams for the selector switches back to the positions illustrated in Figure 6. Actually, the cams for each switch will not be equidistant from the operating roller for that switch when the car is stopped at a floor, one or the other cam, depending upon the direction of car travel, being closer to the roller due to certain working clearances allowed for the pawls.

Figure 8:
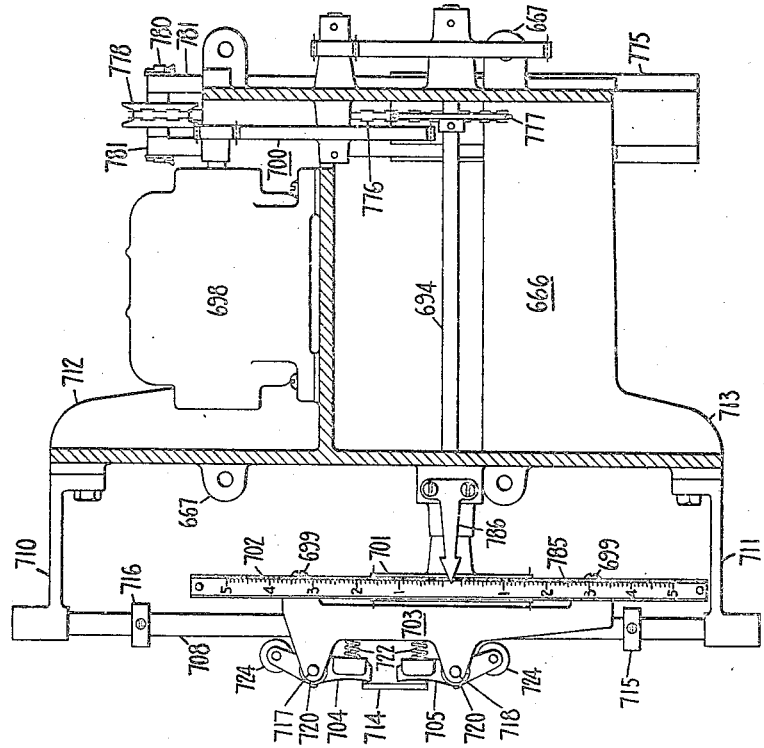
Figure 8 is a detail of the same in front elevation.
Figure 7:
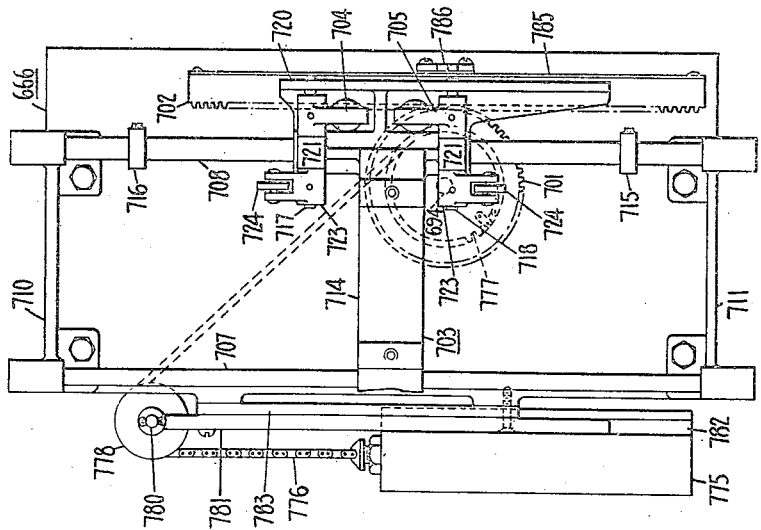
Figure 7 is a detail in side elevation illustrating the advancer mechanism for the brushes and pawls on the selector machine carriage, the counterbalance therefor, and the scale for setting the selector switches.

Details of this portion of the mechanism are shown in Figures 7 and 8. The toothed rack 702 which meshes with gear 701 is secured to the carriage 703 as by screws 699. The carriage is guided in its upward and downward movement by means of guide bars 707 and 708. These bars extend into sockets provided in bosses formed on brackets 710 and 711. These brackets are secured to frame 666 by means of screws extending into threaded bosses provided on extensions 712 and 713 of the frame. The carriage is formed with a horizontal extension 714 which, as will be shown later, provides a support for the crosshead panel for the travelling brushes. Extension 714 is formed with bosses provided with apertures through which the guide bars 707 and 708 extend, thereby forming guides for the carriage.

Upon clockwise rotative movement of gear 701 as viewed in Figure 7, the rack 702 and carriage 703 are moved downwardly on the guide bars. This movement continues so long as operating shaft 694 is rotated by motor 698 until the carriage engages stop collar 715 provided on guide bar 708. A similar stop collar 716 is provided on guide bar 708 above the carriage to limit the amount of upward movement on the bars upon counterclockwise rotative movement of gear 701 by the motor. This movement of the carriage on its guide bars is relative to frame 666 and therefore to the crosshead 660. The motor is controlled to effect this movement of the carriage in the same direction as the crosshead is to be moved. Thus the relative movement between the carriage and the crosshead is one of advancement. In other words, the carriage is advanced by the motor with respect to the crosshead.

The pawls 704 and 705 carried by the carriage 703 are pinned to shafts 717 and 718 rotatably supported by the carriage. These shafts extend through apertures provided in flanges 720 on the carriage and apertures provided in bosses 721 also formed on the carriage. Compression springs 722 are arranged between spring seats formed on the pawls and on the carriage to bias the pawls outwardly from the carriage. The pawls are reversed so that pawl 704 is biased by its spring for clockwise rotative movement about shaft 717 while pawl 705 is biased by its spring for counterclockwise rotative movement about shaft 718. An arm 723 is secured to each operating shaft 717 and 718 on the other side of boss 721. These arms rotatably support rollers 724. The pawls are retracted against the force of springs 722 to clear the stopping lugs by pushing the rollers 724 outwardly from the carriage 703.

Referring back to Figure 2, the rollers are moved outwardly to retract the pawls by means of a cam 730. The cam is carried by the crosshead through the intermediary of bell crank levers 731 and 732. An electromagnet 733 carried by the crosshead is provided for controlling the action of cam 730. This magnet comprises two coils 577 and 548. The control system is arranged so that the coil 577 is energized to effect the retraction of the pawls whereas, to permit the pawls to be reextended for cooperating with the stopping lugs, coil 548 is also energized to magnetically neutralize coil 577. Upon the energization of coil 577, the bell crank lever 731 is pulled upwardly and, through link 734, bell crank lever 732 is also pulled upwardly, causing the cam to be extended outwardly to push rollers 724 away from the carriage. This rotates the shafts 717 and 718 in a direction to force the pawls into retracted positions against the force of springs 722.

In moving outwardly, cam 730 acts through link 735 to pull contact lever 736 clockwise about its pivot to close contacts of a switch which controls the energization of motor 698. Thus the motor for advancing the carriage is not energized until the pawls are moved to retracted position.

The details of the mechanism for operating cam 730 are shown in Figures 9 and 10. The upper bell crank 731 for operating the cam is pivotally supported by a channel-shaped extension 740 formed on bracket 710. It is mounted on a pivot pin 743 supported by extension 740 and extending through apertures formed therein. One arm 741 of the bell crank is connected to cam 730 by a pivot pin 742. The other arm 744 of the bell crank extends substantially horizontally, being formed with two lugs 745 at its pivot point to straddle extension 740. At its outer end, arm 744 adjustably supports a movable core 746 for magnet 733. The magnet is supported by bracket 710, its stationary core being secured in an aperture formed in the bracket. The magnet coils 577 and 548 are held in position on the stationary core by means of the clip 750 secured to extension 740 by a screw.

The link 734 is connected to bell crank 731 by means of a pivot pin 751 extending through apertures in the link and a lug formed on arm 744. The link is similarly connected to arm 752 of bell crank 732. This bell crank is pivotally supported by an extension 753 formed on bracket 711. The upwardly extending arm 754 of the bell crank is connected to cam 730 by pivot pin 755. The cam is formed with outwardly extending or stepped portions 756 and 757 at its upper and lower ends respectively. The purpose of this construction will be explained later. Cam 730 is biased to its retracted position by arms 744 and 752 of the bell cranks, linkage 734 and movable core 746. A lug 753 is formed on arm 752 for cooperating with adjustable stop 759 to bring the cam to a stop in its retracted position. The mechanism is illustrated with cam 730 in extended position in Figures 9 and 10.

The switch operated by the cam is mounted on the panel 760 secured by screws extending into threaded apertures in bosses 761 formed on extension 713 of frame 666. The switch comprises three pairs of contacts 549, 583 and 586. Each pair of contacts is of the same construction. The stationary contact comprises a contact stud 764 secured to the panel and having a tungsten-tipped contact point 765. The movable contact 766 for engaging the stationary contact is likewise tungsten-tipped. This movable contact is in the form of a leaf spring, preferably of a bronze alloy, which extends downwardly into a channel 767 formed on the contact lever 736, at which point it is secured to the lever as by a screw.

All three of the leaf springs are secured to the one contact lever 736, the channels 767 being arranged side by side. Slots are provided in the contact lever at the upper end through which the leaf springs extend. These slots serve to protect the springs from being bent out of shape. Connections are taken from the contacts at the contact studs and at the binding nuts for the securing screws for the leaf springs.

The contact lever is of insulating material and is pivotally mounted on shaft 768 supported by bearing brackets 770 secured to the panel. At its lower end the contact lever is formed with an arm 771 to which the link 735 which connects the lever to cam 730 is pivotally secured.

The weight of the carriage 703 and mechanism carried thereby, including the panel 791 and parts mounted thereon, to be described later, is counterbalanced. Referring to Figures 7 and 8, the counterbalancing mechanism comprises a counterweight 775 connected by a sprocket chain 776 to a sprocket 777 mounted on operating shaft 694 to be rotated thereby. The chain is secured to the sprocket by a pin passing through the end link of the chain. After extending substantially half way around the sprocket, the chain passes upwardly over a pulley 778 pivotally mounted on a pin 780 supported by guide bars 781 for the counterweight. These guide bars are secured to frame 666 as by screws, and extend into slots 782 provided in the counterweight to guide the counterweight in its upward and downward movement. Spacing bars 783 are provided between the guide bars and frame 666 to extend the counterweight outwardly a sufficient distance to clear the frame. With this arrangement, upon rotative movement of the torque motor 698 in a direction to advance the carriage in the upward direction, the chain is unwound from the sprocket, lowering the counterweight. When the torque motor is rotated in the opposite direction to advance the carriage downwardly, the chain is wound onto the sprocket, lifting the counterweight. Thus the counterweight effectively counterbalances the weight of the carriage and parts carried thereby.

Referring back to Figure 2, the operation of the mechanism so far described is as follows: Upon energization of coil 577, bell cranks 731 and 732 are pulled counterclockwise about their pivots. This extends cam 730, which pushes rollers 724 outwardly, swinging pawls 704 and 705 about their pivots against the force of their biasing springs to retracted positions. Cam 730, in moving outwardly, acts through link 735 to swing contact lever 736 to contact engaging position. This causes the circuit for motor 698 to be completed. The motor acts through gearing 700 to rotate operating shaft 694. The direction of rotation is determined by the control system, which will be described later.

Assume that the controlling mechanism is set for up travel of the elevator car. Under such conditions, the torque motor rotates shaft 694 in a counterclockwise direction as viewed in Figure 7. Thus, the leading edges of the cams 692 engage the operating rollers of selector switches 102, 57, 121, 131, 154 and 162 in the order named, to move these switches to closed positions. At the same time, gear 701 moves rack 702 in the up direction, causing upward movement of the carriage 703. When the carriage engages stop collar 716 on guide bar 708, it is brought to a stop. This prevents further rotative movement of gear 701, which brings operating motor 698 to a stop.

When circuits are set up to cause the car to be slowed down and brought to a stop at a floor, coil 548 of magnet 733 is energized, neutralizing the magnetic action of coil 577. This releases bell cranks 731 and 732 and cam 730 is returned to retracted position. This return movement is effected quickly due to the kick off action of pawl springs 722. Pawl 705 is thus extended for cooperation with the stopping lug 706 for the floor for which the circuits have been set up. The mechanism which causes the setting up of these circuits acts to effect the neutralization of coil 577 and the retraction of cam 730 at a point where pawl 705, upon being extended by its biasing spring, is immediately beneath the stopping lug. Only pawl 705 is effective for cooperation with the stopping lugs during up car travel. Pawl 704 is effective only during down car travel. Thus, pawl 705 may be termed the up stopping pawl while pawl 704 may be termed the down stopping pawl. The return of cam 730 to retracted position also causes movement of contact lever 736 about its pivot to open the contacts. This causes the motor 698 to be deenergized.

The small clearance between up pawl 705 and the stopping lug is taken up by the upward movement of crosshead 660 as a result of upward movement of the elevator car. The engagement of pawl 705 with the stopping lug brings the carriage 703 to a stop. The crosshead, however, continues to be driven upwardly by the elevator car, taking up the advance of the carriage. As continued upward movement of the crosshead takes place, gear 701 is rotated clockwise as viewed in Figure 7 by rack 702. This rotates shaft 694 clockwise, returning cams 692 to the positions shown in Figure 6, resulting in the opening of selector switches 162, 154, 131, 121, 57 and 102 in sequence in the order named as the car reaches certain points in its approach to the landing. The opening of these selector switches causes the car to be slowed down and brought to a stop at the floor level, the car being stopped as a result of the opening of switch 102 just before the car reaches an exact level with the landing.

Had the controlling mechanism for the elevator car been set for down travel instead of up travel, the torque motor would have been energized by the closing of switch contacts controlled by magnet 733 so as to rotate shaft 694 in a clockwise direction as viewed in Figure 7. Under such conditions, the selector switches are closed by cams 693 instead of cams 692. Gear 701 moves rack 702 in the down direction, causing downward movement of carries 703 until it is brought to a stop by engaging stop collar 715 on bar 708. When circuits are set up to cause the car to be slowed down and brought to a stop at a floor during downward travel, coil 548 is again energized to neutralize the magnetic action of coil 577. Cam 730 is thereupon retracted and down stopping pawl 704 is extended for cooperation with the stopping lug 706 for the floor for which circuits have been set up. When the engagement of pawl 704 and the stopping lug occurs, the carriage is brought to a stop but the crosshead continues to be driven downwardly by the elevator car, taking up the advance of the carriage. Thus, gear 701 is rotated counterclockwise as viewed in Figure 7 by rack 702 as continued downward movement of the crosshead takes place. This results in the return of cams 693 to the position shown in Figure 6 and the opening of selector switches 162, 154, 131, 121, 57 and 102 in sequence in the order named. This causes the car to be slowed down and brought to a stop at the floor level.

In the preferred arrangement of control which will be discussed later, the energization of coil 577 is effected to cause the energization of torque motor 698 and this torque motor operates to complete the advancement of carriage 703 before the starting of the car takes place. The carriage may be moved to full advanced position or it may be brought to a stop before reaching this point. If circuits are not set up to cause the car to be brought to a stop at a floor before the carriage reaches full advanced position, the carriage is brought to a stop upon engagement with one of the stop collars 715 or 716 and motor 698 remains energized until such circuits are made. However, should such circuits be set up before the carriage becomes fully advanced, the torque motor is deenergized and the carriage comes to a stop. The setting up of circuits to cause slow down and stop occurs when a stopping brush on the selector engages an "alive" contact, as will be shown later.

When circuits are set up to cause slow down and stop with only a partial advance of the carriage, the clearance between the pawl and stopping lug is taken up by the starting of the car to move the crosshead an amount sufficient to effect this engagement. When full advance of the carriage has been attained, however, the car will be in motion at the time the circuits are set up and the car continues to drive the crosshead after the pawls are released, taking up the clearance. In either case, continued movement of the crosshead takes up the advance of the carriage and in so doing causes the return of the cams of shaft 694 to switch opening positions from the positions to which they have moved, opening all of the selector switches which were closed.

Selector machines of a construction shown on these drawings already built have been geared at a ratio of 120 to 1, i. e., the crosshead moves 1 foot for each 120 feet of car travel. A scale 785 is secured to rack 702 and is marked off in feet at this ratio. The scale is graduated the same on each side of the neutral point, the ungraduated space in the middle being for the working clearance of the pawls. In other words, when the car is stopped at a floor during up car travel, the pointer 786, which is secured to frame 666, and represents the position of the car, is at the line just below the central space. When the stop is made during down car travel, the pointer is at the line just above the space.

Each mark on the scale represents one foot, those marks opposite the numerals 1, 2, 3, 4 and 5 representing 10, 20, 30, 40 and 50 feet respectively. The scale and pointer are for setting the cams to operate at the proper points. Assume that it is desired to set the selector for full advance for a 1000 feet per minute installation. The approximate slow down distance in feet for a 1000 feet per minute installation is 33 feet. With the car at the floor level, the carriage is moved in one direction to a point where pointer 786 is opposite the 33 foot mark on the scale. The cam for switch 162 for the direction in which the carriage has been moved is then set so that its leading edge engages the operating roller for switch 162 so as to just "crack" open the switch. The cam is then tightened on shaft 694 in this position. The carriage is then moved in the opposite direction to the 33 foot mark where the other cam for switch 162 is set and tightened in a like manner. The other selector switches are set to open at less distances from the floor, the setting being accomplished in a similar manner by moving the carriage to a point on the scale corresponding to the distance from the point at which it is desired to have the switch open. With the carriage moved the required amount in one direction, the leading edge of the cam for that direction for the switch which is being set is moved to position to just "crack" open the switch where it is tightened on the shaft, and the cam for that switch for the other direction of movement is set in the same way.

It is to be noted that the cams 692 and 693 for operating these switches are formed in such way, as shown in Figures 3 and 4, that when the cam is moved to a point where it just "cracks" open the switch which it operates, the screws which clamp the cam to the shaft are readily accessible through the opening 787 in frame 666. The angular distance between the leading edges of the cams for operating switch 102, which cause the final stopping operation, and the horizontal is due to the working clearance for the pawls 704 and 705 and the amount of coast of the car after the opening of the switch.

If the selector were adjusted for an installation in which the car operated at a speed different from 1000 feet per minute, the cams on shaft 694 would be adjusted differently. For example, for a 1200 feet per minute installation, the cams for operating switch 162 would be set to "crack" open the switch at about 43 feet from the floor, i. e., with the pointer on the 43 foot marks on the scale. The distances at which the other switches would be caused to operate would be changed accordingly. For a 400 feet per minute installation, the cams for operating switch 162 would be set to "crack" open the switch with the car about 6 feet from the floor, i. e., with the pointer on the 6 foot marks on the scale.

Regardless of the slow down distance, the carriage may be operated to full advance position, i. e., 50 feet with the arrangement shown, by setting stop collars 715 and 716 to permit this amount of movement. Thus, for the 400 feet per minute installation, the cams for operating switch 162 when fully advanced would have to be rotated back to where the pointer came opposite the 6 foot mark before permitting the opening of the switch. If desired, the collars may be set to restrict the advance to less than 50 feet.

Inasmuch as in the higher speed installations of around 1000 feet per minute average one and two floor runs would be made without advancing the carriage sufficiently to close switch 162, this switch would not be brought into action on these short runs. Also, in these higher speed installations, the trailing edges of the cams for operating switch 162 may have to be cut off as shown in Figure 6 to insure that the trailing edge of the cam for one direction of travel does not affect the closing of the switch during the opposite direction of car travel by engaging the operating roller of the switch ahead of the leading edge of the cam for such opposite direction of car travel.

The outwardly extending or step portions 756 and 757 of cam 730 are to prevent damage to the mechanism in case movement of the crosshead should take place without energization of coil 577 of magnet 733 to retract pawls 704 and 705. Referring to Figure 2, should upward movement, for example, of the crosshead take place without the pawls being pushed into retracted positions, the incline portion of cam 730 between the trough portion and step portion 757 would force operating roller 724 for up pawl 705 outwardly so that the pawl would clear the stopping lug as the upward movement of the crosshead took place. The incline portion of cam 730 between the trough portion and the step portion 756 would similarly serve to force down stopping pawl 704 counter-clockwise about its pivot to clear the stopping lug in the event that downward movement of the crosshead took place without energization of coil 577 to move the pawls to retracted position.

The brushes for setting up the circuits to cause the car to be slowed down and stopped at the floors are carried on a panel 791 mounted on carriage 703. These brushes set up these circuits by engaging "alive" stationary contacts. The stationary contacts 792 with which these and other brushes moved by the crosshead cooperate are mounted on floor bars 793 supported by standards 651. The details of construction of this mechanism are shown in Figures 11 to 19 inclusive.

Figure 19:
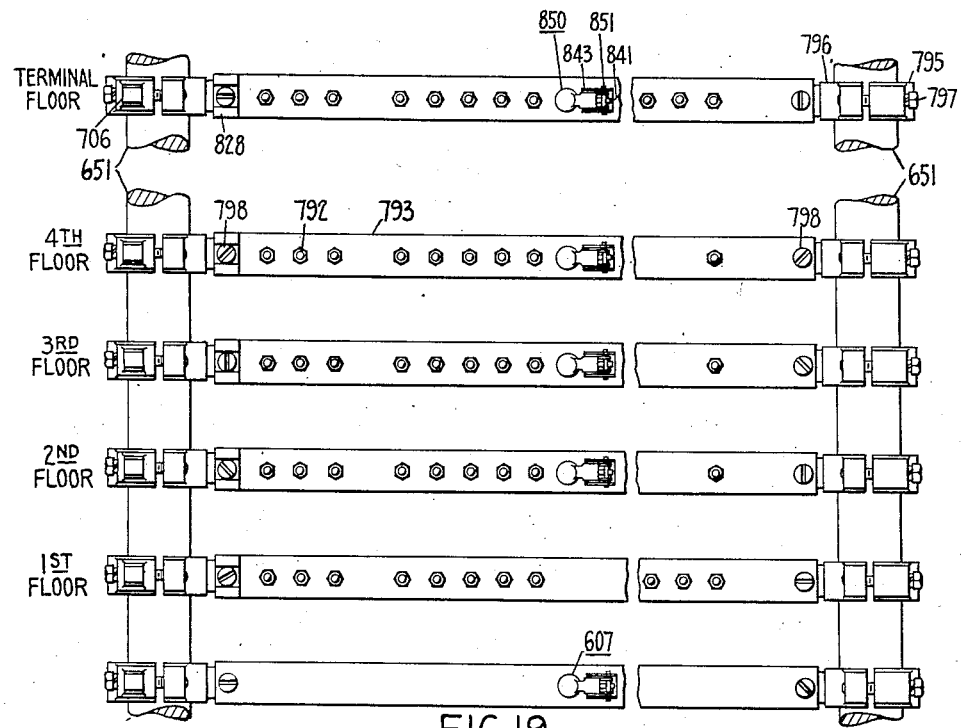
Figure 19 is a view in front elevation showing the arrangement of the floor bars for several floors.

Referring to these figures and particularly to Figures 11 and 19, the floor bars are moulded insulation and are secured as by screws 798 to brackets mounted on standards 651. These brackets are split to form two portions 795 and 796, which are clamped to the standards by means of screws 797. The stopping lugs 706 engaged by the pawls 704 and 705 are formed on the portions 795 of the brackets on one of these standards. Portions 796 of the brackets on both standards are formed with lugs to which the floor bars are secured by screws 798.

Each stationary contact mounted on the floor bar is of the same construction. These contacts are mounted in apertures formed in the floor bar, the construction and mounting of one of these stationary contacts being illustrated in Figure 15. Referring to this figure, the stationary contact comprises a contact stud 800 having a hexagonal head 801 which fits into a corresponding hexagonal socket 802 formed in the floor bar. After extending through the aperture 803 which extends through the bar from the socket 802, the contact stud is clamped to the back of the bar by nuts 804, which also serve as binding nuts to connect the contact in the system. The hexagonal head of the stud is beveled at the end and is drilled (see Figure 17) to receive a tungsten contact tip 805. These tips are engaged by the brushes during the upward and downward movement of the crosshead.

Referring particularly to Figure 12, the brushes for establishing circuits to cause the car to be slowed down and brought to a stop at a landing are designated 507, 510 and 514. Brush 507 is for cooperating with stationary contacts in one vertical column, the circuits to which are controlled by push buttons in the elevator car. When brush 507 engages one of these contacts which has been rendered "alive" by the pressing of its controlling car button, circuits are set up to cause the car to be slowed down and brought to a stop at the floor for which the car button and contacts are provided. Brush 510 is for cooperating with stationary contacts in another vertical column, the circuits to which are controlled by down push buttons at the landings. When brush 510, in its downward movement, engages one of these contacts which has been rendered "alive" by the pressing of its controlling down push button, circuits are set up to cause the car to be slowed down and brought to a stop at the floor for which down and push button are provided. the contact and down push button are provided. Brush 514 cooperates with stationary contacts in still another vertical column, the circuits to which are controlled by up push buttons at the landings. When brush 514, in its upward movement, engages one of these contacts which has been rendered "alive" by the pressing of its controlling up push button, circuits are set up to cause the car to be slowed down and brought to a stop at the floor for which the contact and up push button are provided.

Each of these brushes 507, 510 and 514 is of the same construction, the details of their construction being shown in Figures 12 and 14. These brushes are carried by a switch frame 810. This frame is in the form of a lever and is pivotally mounted on a shaft 811 supported by the arms of a bracket 812 secured to panel 791. The actual engagement with the stationary contact is made by a rounded contacting element 813. This element is secured to a bronze alloy leaf spring 814 by means of a clip 815 and screw 816. The clip is formed into a channel into which the contacting element and leaf spring extend. The contacting element is threaded to receive the screw which clamps the element, spring and clip together as a unit. The spring is secured at its lower end as by a screw to a bracket 817. This bracket in turn is secured to an insulating panel 818 extending between and secured to the arms 820 of switch frame 810. This bracket is provided with a slot 821 at its upper end through which an extension on the clip extends to protect the contact spring against being bent out of shape. One of the screws 822 for securing bracket 817 to panel 818 serves as a connector for the clip on the end of a flexible conductor connecting the brush in the system.

All three brushes are mounted on insulating panel 818 in the same way. The brushes are arranged in a side by side relation as shown in Figure 12. The switch frame is biased about its pivot in a direction to move the brushes toward contact engaging positions by springs 823 extending between the contact frame and bracket 812. An arm 824 depending from the frame cooperates with a screw 825 mounted on bracket 812 to form an adjustable stop to limit the amount of movement of the switch frame toward the stationary contacts by springs 823.

An operating roller 826 is pivotally mounted on the shank of a screw 827 secured to one of the arms 820 of frame 810. This roller cooperates with a plurality of trough shaped cams 828 mounted in a vertical column, one on each floor bar 793. These cams are arranged at one end of the floor bars and are secured by the same screws 798 that secure the floor bars to the portions 796 of the bracket at that end of the bars. The roller and cams prevent the engagement of brushes 507, 510 and 514 with their cooperating stationary contacts except when the roller has rolled down into the trough of the cams. When the roller is in the trough of a cam as shown in Figure 13, springs 823 force the frame about its pivot into position where the arm 824 engages stop screw 825, in which position the contacting elements 813 of the brushes are pushed into engagement with their cooperating stationary contacts on the bar on which the cam is mounted against the force of the leaf springs 814, as shown in Figure 14. As soon as the roller starts to move out of the trough onto a higher part of the cam, the switch frame is swung about its pivot against the force of springs 823, disengaging the brushes from their stationary contacts. Thus, as movement of carriage 703 takes place, the brushes are caused to make momentary contact with their stationary contacts. This permits very accurate adjustments of the slow down distances. It also permits the operation of a maximum number of selector switches by their cams in making short floor runs in higher speed installations. This permits a maximum of acceleration on such runs, as will be seen from later description.

As soon as brush 514 contacts with an "alive" contact during up car travel, or brush 510 contacts with an "alive" contact during down car travel, or brush 507 contacts with an "alive" contact during either down or up car travel, circuits are set up to cause the energization of coil 548 of magnet 733 which results in the deenergization of torque motor 698, stopping relative movement between carriage 703 and crosshead 660 in the event that it has not already been stopped by engagement of the carriage with one of the stopping collars 715 or 716 and to extend the stopping pawl for the direction of car travel for engagement with the stopping lug 706 for the floor for which such circuits have been set up. As soon as the clearance between the pawl and the stopping lug is taken up by movement of the crosshead, the carriage is brought to a stop in this position. The roller 826 will have been moved slightly out of the trough of cam 828 for that floor, thereby disengaging brushes 507, 510 and 514 from their cooperating stationary contacts for that floor. Since further movement of the carriage is prevented during the slow down and stopping operation, the brushes remain in this position disengaged from their stationary contacts during this slow down and stopping operation.

Five other brushes are carried by panel 791. These brushes are of the same construction as brushes 507, 510 and 514, with the exception that the contacting elements 832 are somewhat longer than contact elements 813 of brushes 507, 510 and 514. These brushes, designated 515, 523, 519, 511 and 517, are mounted on an insulating panel 833. This panel is secured to panel 791 by screws 834. Spacers 835 are provided on these screws between the two panels to extend the brushes toward the floor bars for proper cooperation with the stationary contacts.

The contacting elements 832 of these five additional brushes are somewhat elongated to insure that the brushes are in engagement with their stationary contacts for a floor when the carriage is brought to a stop preparatory to slowing down and stopping the car at that floor. As pointed out before, in discussing the scale 785, certain working clearance is allowed for the pawls 704 and 705, which causes the pointer to register with a different mark on the scale with the car stopped at a floor during down car travel than when it is stopped at the same floor during up car travel. For the same reason, each of the contacting elements of the five additional brushes engage its stationary contact at a different point on the contacting element during stopping of the car at a floor during up car travel from when stopping the car at the same floor during down car travel.

Brush 515 and the stationary contacts engaged by this brush are for effecting the reset of the floor relays operated by up push buttons when response is made to such buttons during upward travel of the car. Brush 511 and the stationary contacts engaged by this brush are for effecting the reset of the floor relays operated by down push buttons when response is made to such buttons during downward travel of the car. Brush 511 and its cooperating contacts are also for effecting the reset of a down floor relay during up car travel under certain conditions of operation, which will be explained in discussing the control system.

Brushes 519 and 523 and their cooperating stationary contacts are for controlling the lighting of the hall lanterns at the floors, brush 523 controlling the lighting of up hall lanterns and brush 519 controlling the lighting of down hall lanterns.

Brush 517 and the contacts engaged thereby are for causing the car to be slowed down and stopped in response to a down hall button when no higher call, registered either by a car button or a hall button, exists and when the up hall button for the floor at which the down hall button is located is not pressed, and also for causing the direction of car travel to be reversed from up to down as the car is brought to a stop.

Panel 791 also carries a cam 508 of insulating material for operating a series of floor brush switches carried by the floor bars. A floor brush switch is provided on the floor bar for each floor above the first floor, these floor brush switches being for controlling circuits to cause the direction of car travel to be reversed from up to down upon answering the highest operated car button when the up hall button for the same floor or the hall button for a floor above is not operated.

Figure 18:
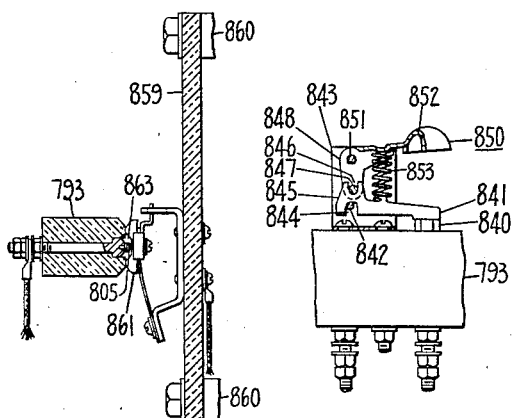
Figure 18 is a top view, with parts broken away, showing the details of a floor brush switch.

Each floor brush switch is of the same construction, the construction of one of them being illustrated in Figure 18. It comprises a stationary contact 840 secured to the floor bar and a contact lever 841 pivotally mounted on a pin 842 extending between two sides of a bracket 843 secured to the floor bar. The contact lever is arranged between the two sides of the bracket and is formed with a widened slot 844 which extends over the pin to form the pivot. The contact lever is formed with an upwardly extending arm 845 which also is formed with a slot 846 to receive the pin 847 secured to the arm 848 of operating lever 850. This operating lever is pivoted on a pin 851 extending between the two sides of the bracket. It is in the form of a bell crank and on its outer end is provided with a contact shoe 852 for engagement by cam 508. A spring 853 is arranged between the contact lever 841 and the operating lever 850 for biasing the contact lever into engagement with the stationary contact and the operating lever into extended position for cooperation with the cam.

Upon engagement of shoe 852 by cam 508, the operating lever is moved clockwise as viewed in Figure 18, against the force of spring 853. The operating lever acts through pin 847 and slot 846 to push the contact lever 841 counterclockwise about its pivot. This movement disengages the contact lever from stationary contact 840. The initial movement of the contact lever is a sliding one, due to the lost motion occasioned by the widened slot 844, thereby obtaining the advantage of rubbing contact engagement. As soon as this lost motion is taken up, the pivotal movement takes place, forcing the disengagement of the contact lever from the stationary contact against the force of spring 853. Cam 508 is set to engage and open the floor brush switch on each floor bar above the first floor before the engagement of brush 507 with its cooperating stationary contact on that bar. The purpose of this will be seen from later description. Furthermore, cam 508 is of such length and is so positioned as to maintain the floor brush switch on any floor bar open until after brush 507 during upward movement has left the stationary contact on the floor bar above. The purpose of this also will be shown later.

An additional floor brush switch 607 is provided on a floor bar positioned beneath the floor bar for the first floor (see Figure 19). This floor brush switch serves a different purpose from that of the other floor brush switches, as will be shown later, the positioning being such that it is opened by cam 508 when a car is at the main floor and also so that the cam passes off the switch to permit it to reclose after a short advance of the carriage in the upward direction from its first floor position.

Figures 16, 17:
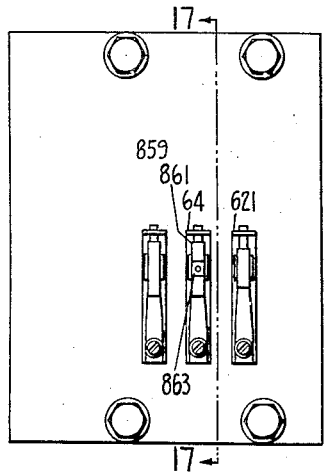
Figure 16 is a detail in front elevation of the remaining brushes shown in Figure 11.
Figure 17 is a view in side elevation taken along the line 17—17 of Figure 16, showing the details of the brush for controlling the point at which automatic door opening takes place and also showing the manner in which this brush cooperates with a stationary contact.

Referring particularly to Figure 16, the crosshead 660 carries two different additional brushes 64 and 621. These brushes are mounted on an insulating panel 859 secured by screws to bosses 860 formed on the framework of the levelling mechanism (see Figures 21 and 22), this levelling mechanism being secured to the crosshead, as will be explained later. These brushes are of the same construction as brushes 507, 510 and 514, with the exception of the contacting element 861 of brush 64. The contacting element 861 of brush 64 is elongated and is formed with a trough portion 863 as shown in Figure 17. This trough portion is to break the circuit through the brush and its cooperating stationary contact just before the car reaches the floor (either the top or bottom terminal floor) for which the stationary contact is provided.

Brush 64 and its cooperating stationary contacts are for controlling the automatic opening of the car gate and hatchway doors at the terminal floors. Brush 621 and its cooperating stationary contacts are for effecting reversal of the direction of car travel at the terminal floors. Since panel 859 moves directly with the crosshead, i. e., is not subject to the advancer mechanism, this panel does not in effect have the two centers occasioned by the pawl clearances, as in the case of the panels carried by carriage 703. Thus the contact element of brush 621 may be shorter than the contacting elements of brushes carried by panel 833. Brush 64, however, is longer than brush 621, owing to the construction and nature of the circuits in which it is utilized.

The arrangement of the stationary contacts on the floor bars is shown in Figure 19. This figure shows floor bars for the first, second, third and fourth floors and for the upper terminal floor as well as a special floor bar below the one for the first floor. As there shown, stationary contacts are provided on each floor bar above the special floor bar for cooperation with brushes 507, 510, 514, 515, 523, 519, 511 and 517. Stationary contacts are provided only at the terminal floors for cooperation with brushes 64 and 621. Floor brush switches are provided only on floor bars for floors above the first floor and on the special lowermost bar. Space is provided for additional stationary contacts and other mechanism on the right ends of the floor bars as shown. Such space may be desired for special operations or circuits which are not described in this system. As indicative, a column of contacts is shown in this space. These contacts are engaged by an elongated brush carried on panel 859 and may be employed, for example, to control the circuits for a car position indicator. The floor bars are spaced in accordance with the distances between the corresponding floors. The floor bars are shown considerably spaced in Figure 2 in order that the principles of operation of the selector machine may be readily seen from the illustration.

Figure 20:
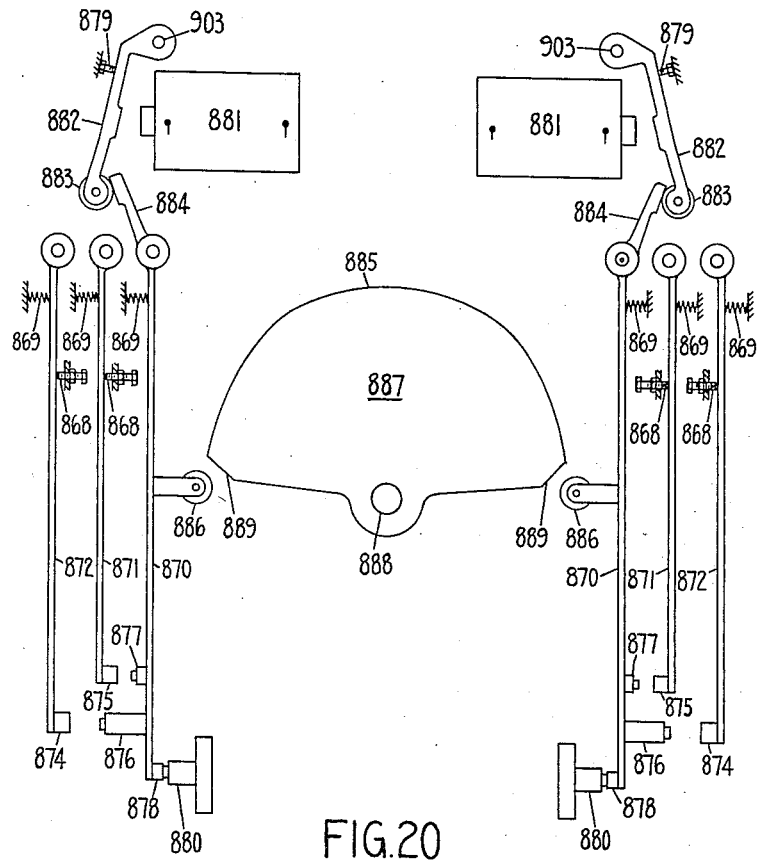
Figure 20 is a schematic representation of the levelling mechanism.

Referring to Figure 20 and also back to Figure 2, switching mechanism operable in association with other parts of the control system to bring the car to exact landing levels regardless of whether underruns or overruns occur, will be described. This mechanism is illustrated as arranged on the selector machine to be operated through the intermediary of sprocket 655, shaft 654 and vertical screw 656. The screw 656, as pointed out previously, causes movement of the crosshead 660 according to movement of the elevator car. A portion of the levelling mechanism is carried by the crosshead. This portion comprises two levelling switch units, one for up levelling and the other for down levelling. Each switch unit comprises three contact levers 870, 871 and 872, pivotally mounted on the framework 873 of the mechanism. Levers 871 and 872 are free to pivot and are biased by springs 869 against adjustable stops 868 carried by the framework. Each of these levers carries a contact at its outer end. Contact 874 is carried by lever 872 and is adapted to be engaged by contact 876 carried by lever 870. Contact 875 carried by lever 871 is adapted to be engaged by contact 877 also carried by lever 870. Lever 870 also carries a contact 878 for engaging a stationary contact 880 mounted on the levelling switch framework. In the wiring diagram (Figure 24a), the pairs of contacts 878, 880, which serve as interlocks, are designated by single reference numerals 83 and 90; the pairs of contacts 877, 875, which serve as up and down levelling direction contacts, are designated by single reference numerals 82 and 87; and the pairs of contacts 876, 874, which serve as fast speed levelling contacts, are designated by single reference numerals 75 and 77.

Lever 870 is biased by its spring 869 in a direction to separate contacts 877 and 876 from contacts 875 and 874 respectively, and to engage contact 878 with contact 880. It is adapted to be moved about its pivot against the force of its biasing spring to separate contacts 878 and 880 and to engage contacts 877 and 875 and contacts 876 and 874 by magnet 881. This magnet acts to move lever 870 through an armature 882 which is pivoted to the framework of the mechanism for attraction by the magnet, and which carries at its end opposite the pivot point an operating roller 883 for engaging arm 884 of lever 870.

Upon magnet 881 being energized, armature 882 is attracted and swung about its pivot. The armature acts through roller 883 and arm 884 to swing contact lever 870 against the force of its biasing spring to separate contact 878 from contact 880. As this movement continues, contact 877 engages contact 875. Further movement causes contact lever 871 to be swung about its pivot against the force of its biasing spring and thereafter contact 876 to move into engagement with contact 874, contact lever 872 being swung about its pivot against the force of its biasing spring as this engagement takes place until armature 882 is brought to a stop. When magnet 881 is deenergized, the armature is swung outwardly about its pivot by the biasing spring 869 for lever 870 until it is brought to a stop by engaging adjustable stop screw 879. This stop also limits the movement of lever 870 by its spring 869.

Contact lever 870 also carries an operating roller 886 which cooperates with levelling cams 887 to effect the levelling operation. These cams are mounted on cam shaft 888 which extends between base plate 650 and top plate 652, at which points it is supported by bearings. A cam is provided on this shaft for each floor for which a stop is to be made and the levelling cams are spaced along the cam shaft so that the distances between adjacent cams are in accordance with the distances between their respective floor landings. Each cam is helical and has a pitch equal to the pitch of the thread on screw 656. The radius of the working face 885 of each cam is a maximum at the central portion thereof and is a minimum at the end portions. These end portions are bevelled at 889. A gear 890 is secured to cam shaft 888 to effect rotative movement thereof. This gear meshes in a driven relation with the corresponding gear 891 secured to screw 656 so as to rotate therewith.

The coils of the magnets 881 of the two units have been designated in the wiring diagram as 166 and 167 (see Figure 24a), these coils being connected in series relation so as to be energized simultaneously as shown in this figure. When the car is at rest, the levelling magnet coils are not energized. Under such conditions, the levers assume operative positions in accordance with the illustration in Figure 20, i. e., with the back contacts 878, 880 in engagement and the forward contacts 877, 875 and 876, 874 separated. Also, the operating rollers 886 are in non-retracted positions. With the car at a landing, the rollers assume a position with respect to the cam for that landing as shown in Figure 20.

The coils of the levelling magnet are energized during starting of the car and act upon levers 870 to cause operation of the contacts in the manner previously described. The movement of levers 870 also causes rollers 886 to assume retracted positions where they clear the levelling cams during movement of the car. The levelling magnets are deenergized during slow down operation, the deenergization of these magnets releasing armatures 882 which in turn release levers 870. Under such conditions, the biasing springs 869 tend to move all the levers toward the levelling cams. If the car is out of level with the floor when this takes place, the levelling cam for that floor is out of central position with respect to its rollers 886, and is struck by the roller of one of the levelling switch units, the roller which strikes the cam depending upon whether the car is above or below the floor. This restricts the movement of the lever 870, upon which the roller is mounted, by its biasing spring 869, which in turn prevents the engagement of contacts 878, 880 and the separation of contacts 877, 875 and possibly of contacts 876, 874 of that unit, depending upon how much the car is out of level. The levers of the other levelling switch unit, however, are returned to the position shown in Figure 20, separating the forward contacts and engaging the back contacts of that unit. The engagement of the back contacts 878, 880, as will be seen from later description, establishes a feed through the closed forward contacts 877, 875 of the unit whose roller strikes the cam.

The forward contacts act, as will be described later, to cause the car to come to the floor level. As this levelling operation takes place, first contacts 876, 874, if closed, open due to the roller riding onto a lower portion of the cam, i. e., a portion of less radius, reducing the speed of the car. Further rotative movement of the cam permits roller 886 of that unit to ride onto a still lower portion of the cam and thus permits further movement of lever 870 toward the cam. This results in the separation of contacts 877, 875, which causes the car to be brought to a stop at the exact landing level. The slight coast of the car after the separation of contacts 877, 875 results in the engagement of back contacts 878, 880 and the disengagement of the roller from the cam.

Figure 21:
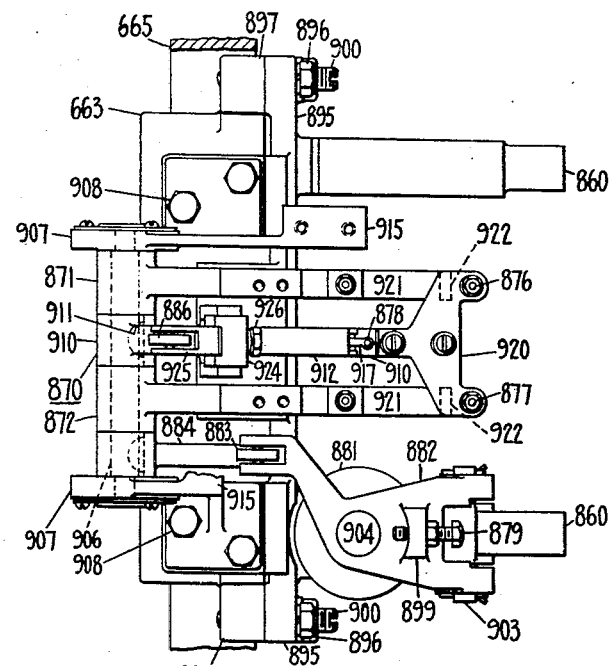
Figure 21 is a detail in side elevation of a switch unit of the levelling mechanism.
Figure 22:
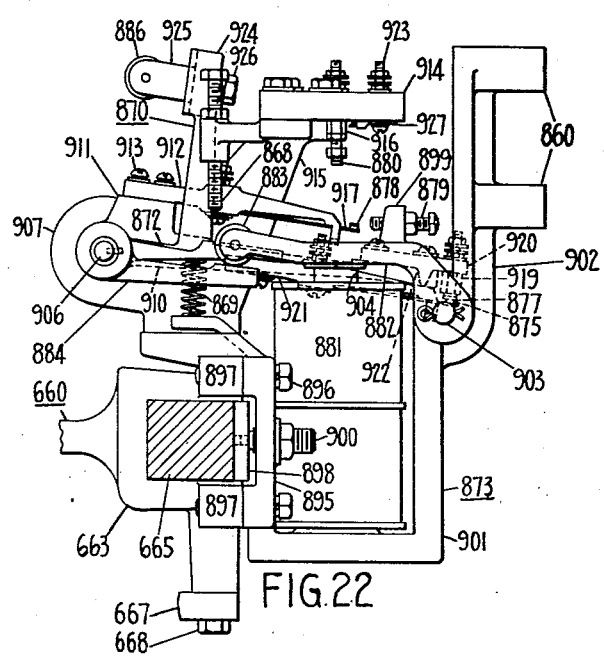
Figure 22 is a top view of the same.

The details of one of the levelling switch units are shown in Figures 21 and 22. The portion of the framework 873 upon which this unit is mounted comprises an elongated plate 895 secured to the guide portion 663 of the crosshead as by bolts 896. The guide portion of the crosshead is forked to cooperate with guide bar 665 in guiding the crosshead, and the securing screws 896 extend into threaded apertures in lugs 897 formed on these forks. A guiding gib 898 is pressed against the remaining face of the guide bar by adjustable screws 900. A U-shaped strap portion 901 is formed integral with the plate 895 and receives the magnet 881, the stationary core of the magnet being secured to the yoke of the strap portion. An extension 902 is formed on the strap and on this extension two of the lugs 860 for supporting panel 859 (Figure 11) are formed.

At the point that extension 902 joins the strap portion 901, the framework is provided with an aperture to receive the pivot pin 903 for armature 882. The adjustable stop screw 879 for the armature is secured to a lug 899 formed on the armature and cooperates with extension 902 to limit the movement of the armature and lever 870 by biasing spring 869 for this lever. The movable core 904 for magnet 881 is secured to this armature. At its outer end the armature pivotally supports operating roller 883, the roller extending into a slot formed in the armature. Arm 884 operated by armature 882 is engaged by roller 883 at its outer end. The arm is mounted on shaft 906 supported by brackets 907 secured to plate 895 by screws 908. Arm 884 is keyed to this shaft and another arm 910 is likewise keyed to the shaft to comprise lever 870.

The arm 910 is formed with a boss 911 to which a contact arm 912 of insulating material is secured as by screws 913. This arm carries movable contact 878 for cooperation with stationary contact 880. The stationary contact is tungsten-tipped and is secured in a contact stud 916 mounted on a panel 914 secured to extensions 915 on brackets 907. The panel is not shown in Figure 21 in order that the construction of other parts may be more readily ascertained. The movable contact comprises a tungsten-tipped contact spring 917 secured in a channel on the insulated contact arm 912 by a screw, the construction being similar to the construction of contact spring 678 and contact lever 677 (see Figure 3).

At its outer end contact arm 910 carries a Y-shaped contact holder 820 of insulating material. This contact holder carries contacts 876 and 877. These contacts are in the form of tungsten-tipped contacts on contact studs 919 secured to the contact holder. Contacts 875 and 874, which are engaged by contacts 877 and 876 respectively, are carried by insulated contact arms 921 secured to the levers 871 and 872. These levers are freely mounted on shaft 906. The contact arms 921 and contacts 874 and 875 are of the same construction as contact arm 912 and contact 878. The contact holder 920 is formed with lugs 922 for engaging contact arms 921 after the engagement of contacts 874 and 875 by contacts 876 and 877 occurs. This arrangement is provided so that levers 871 and 872 are respectively moved along with lever 870 after the contact engagements occur, thereby protecting the leaf spring contacts.

Connections are made from the binding posts for the screws which secure contacts 874 and 875 to contact arm 921, contact 878 to contact arm 912 and contacts 876 and 877 to contact holder 920, by flexible conductors to terminals on panel 914. These flexible conductors are not shown, although the clip 927 for one of them is indicated in Figure 22. These terminals comprise the contact stud for contact 880 and terminal screws 923 provided on the panel.

Arm 910 is formed on the extension 924 at right angles thereto. The supporting bracket 925 for the roller 886 which cooperates with the levelling cams is adjustably secured to extension 924 as by screws 926. The extension is formed with a slot through which contact arm 912 extends. It is not thought necessary to review the operation of the levelling mechanism in connection with the details shown in Figures 21 and 22 as it is believed that the operation will be clear from the description already given in connection with Figures 2 and 20.

Figure 23:
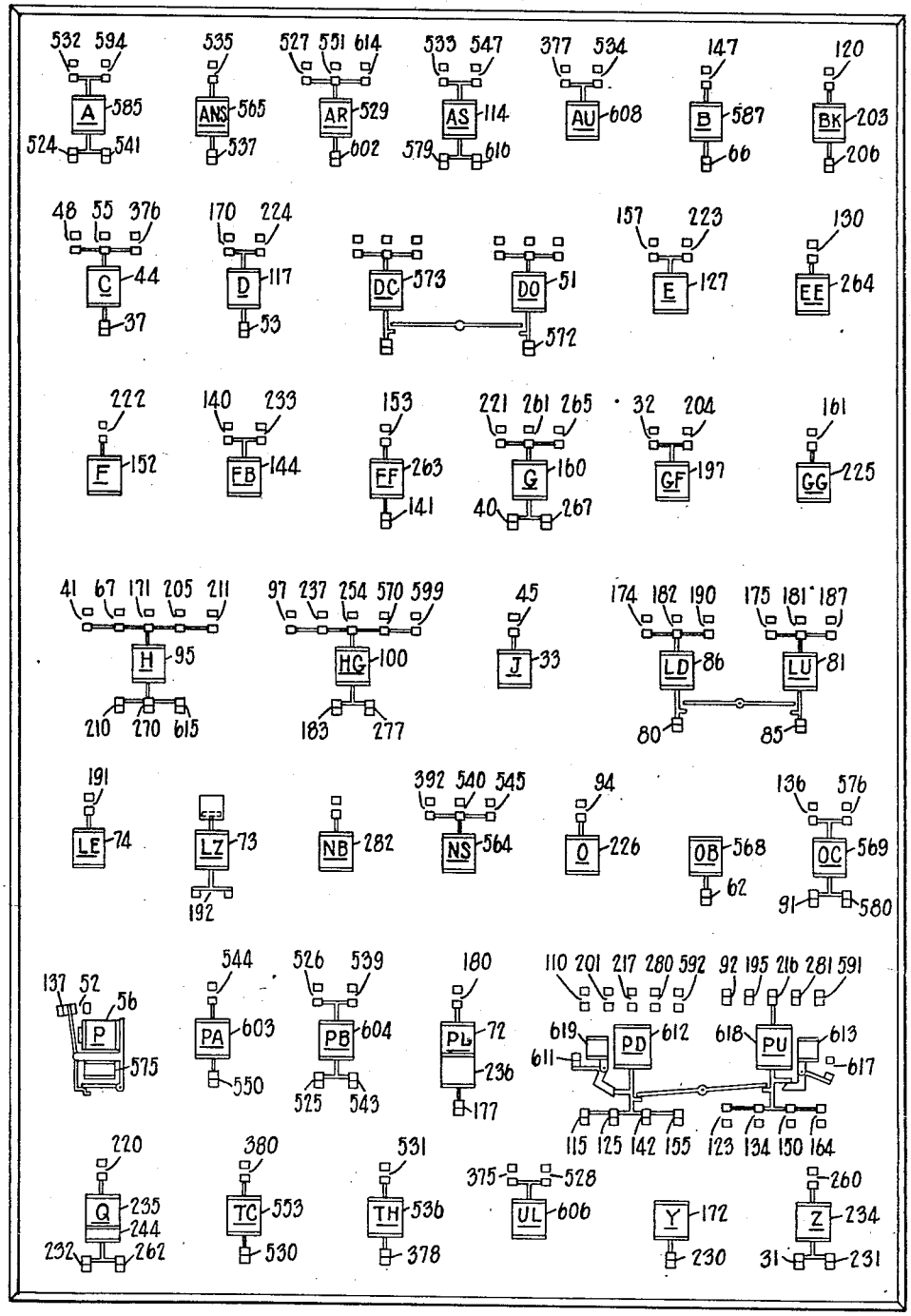
Figure 23 is a diagrammatic representation of the control panel showing the relationship of the coils and contacts of the various switches mounted thereon.
Figure 24A:
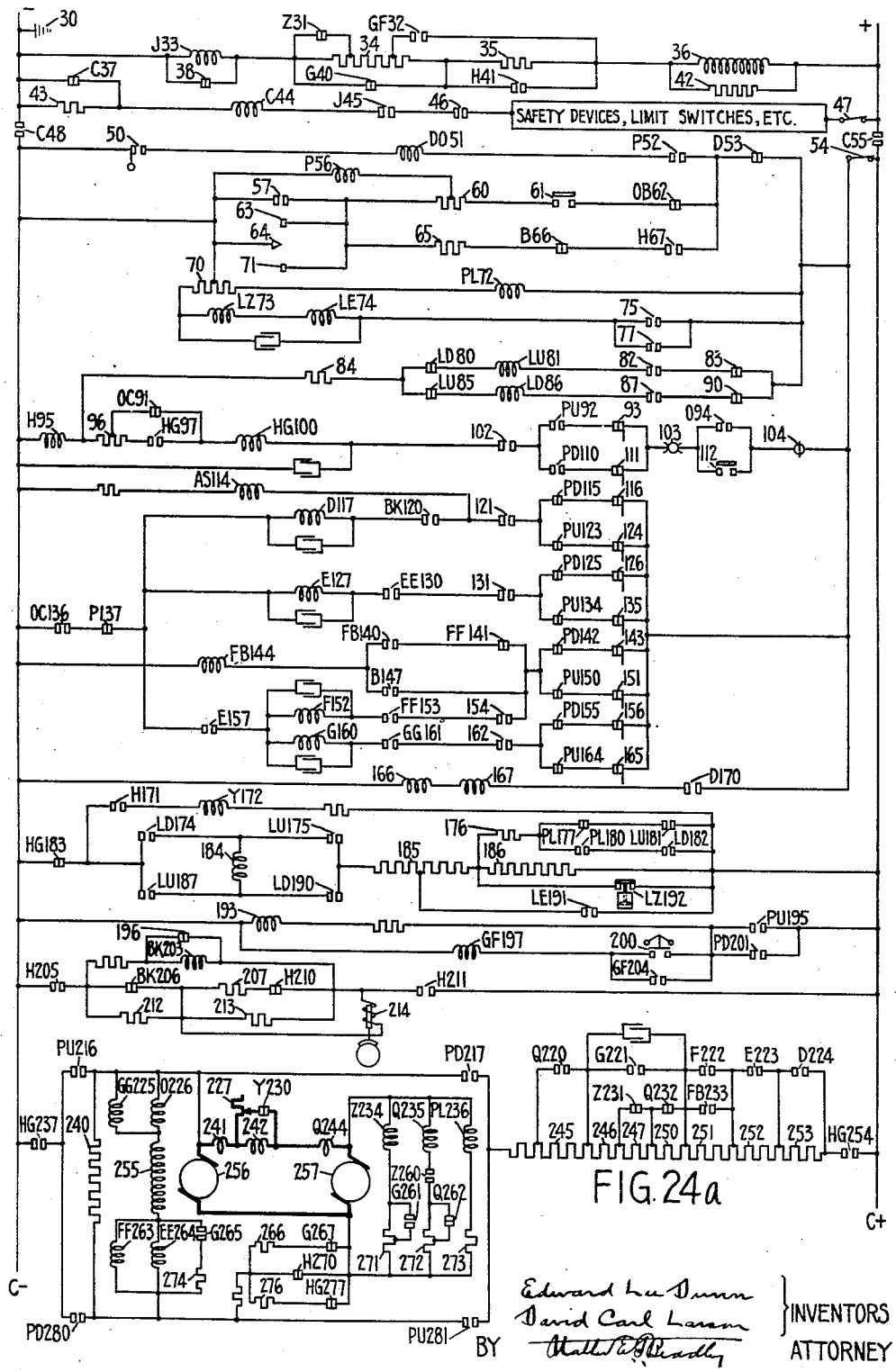
Figures 24a, b and c, taken together, constitute a simplified diagram of the power and control circuits for one elevator.
Figure 24B:
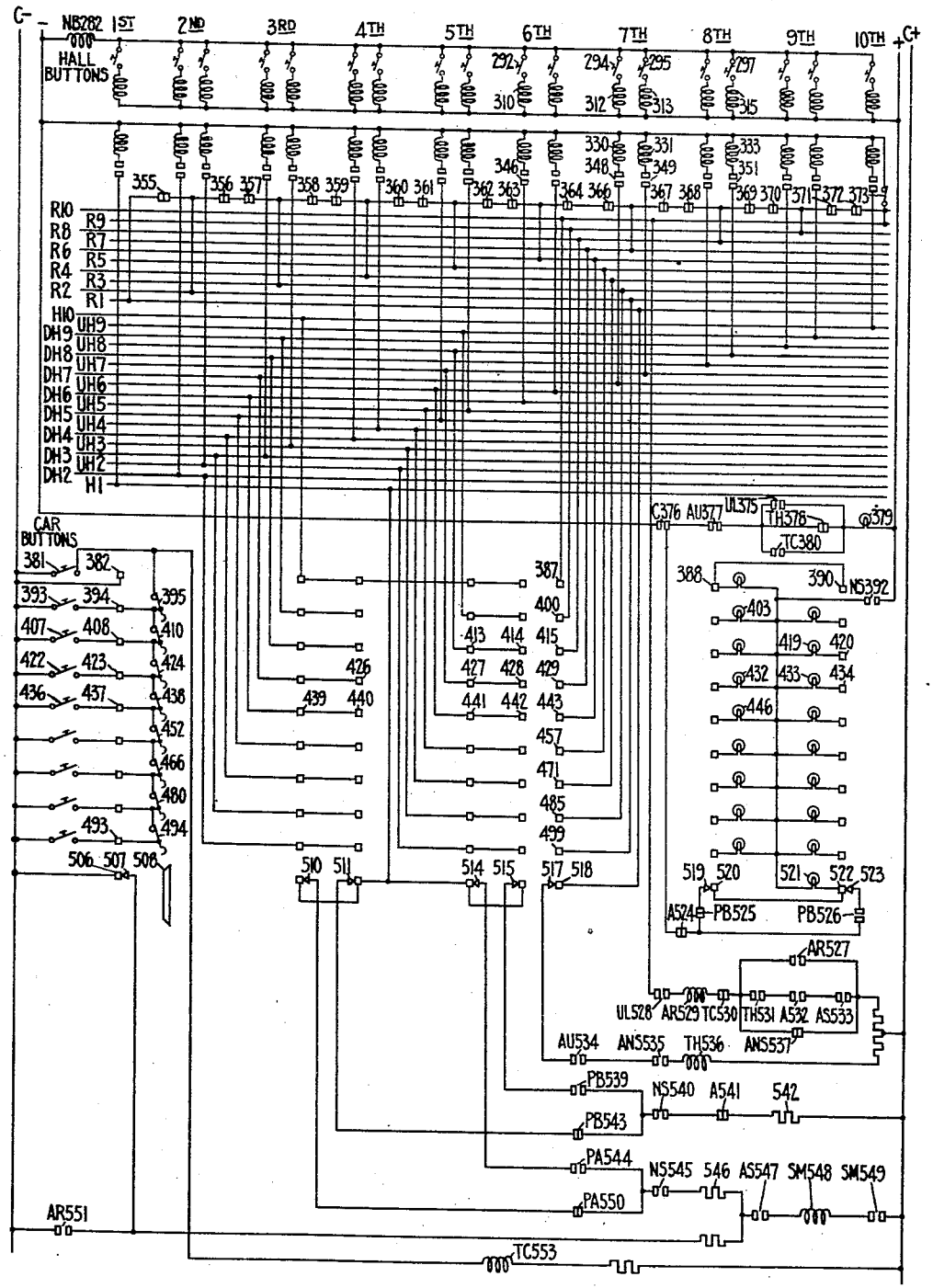
Figure 24C:
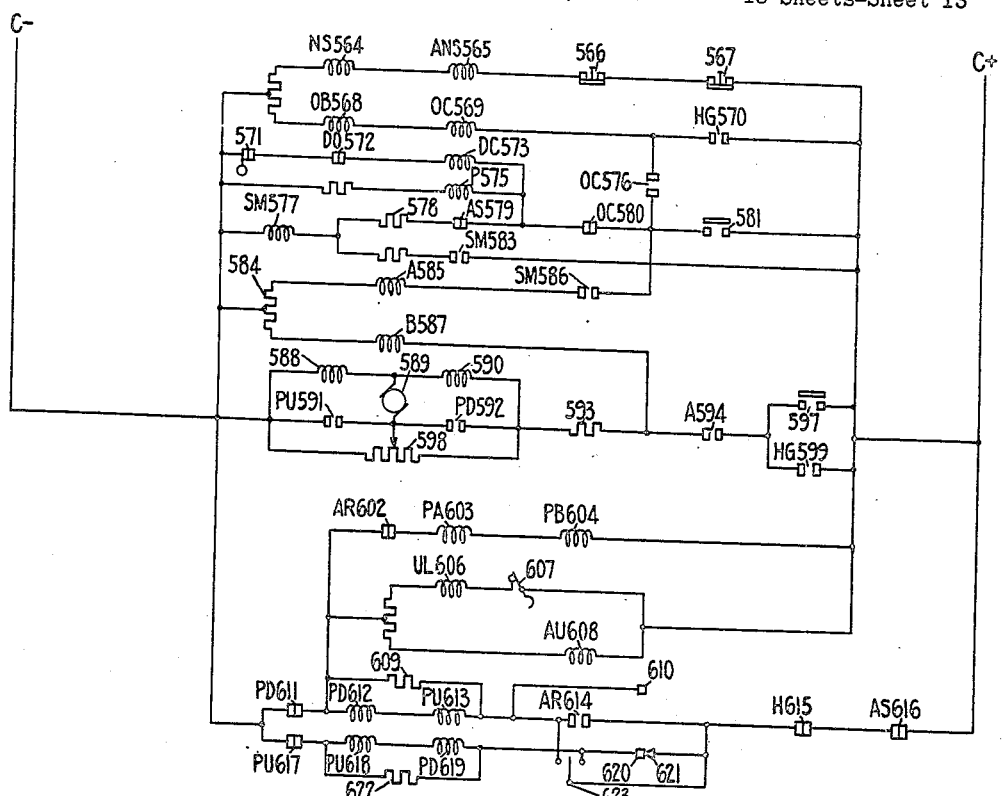

Reference may now be had to Figures 24a, 24b and 24c, which illustrate diagrammatically the various control and power circuits. No attempt is made in these figures to show the coils and contacts of the switches in their associated positions, "straight" diagrams being employed, wherein the coils and contacts of the various switches are separated in such manner as to render the circuits involved relatively simple. The relation of the coils and the contacts may be seen upon reference to Figure 23.

Figures 24a and 24c constitute a wiring diagram of the control system for one elevator. Figure 24b shows the slow down initiating and signal circuits for that elevator. The slow down initiating and signal circuits are illustrated for only ten floors.

The numerals employed in designating the various elements of the control system are arranged in sequence in these diagrams, the lower number 30 which indicates a grounded supply line, appearing in the upper left hand corner of Figure 24a, with the succeeding numbers following in numerical sequence from left to right downwardly on the sheet of drawings. The circuits in Figure 24b are joined to the circuits in Figure 24a as indicated by the continuance of wires C— and C+, and the numbers continue in Figure 24b in the same sequence. The arrangement of numerals in this sequence facilitates the location of any element referred to in the description.

Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. The generator of such arrangement has been illustrated. The driving motor for the motor generator set and control arrangement therefor have not been illustrated. It is to be understood that either a direct current or alternating current driving motor may be employed, depending upon the kind of power supplied to the building and the character of the installation, and that any suitable control arrangement therefor may be utilized, such, for example, as one embodying the principles of the arrangement disclosed in the patent to Lindquist, Waters and Glaser, No. 1,997,260. For convenience, it will be assumed that direct current is supplied to the building.

The armature of the supply generator is designated 256, its separately excited field winding being designated 255, its series field winding 242 and its interpole field winding 241. The armature of the elevator motor is designated 257, and its separately excited field winding is designated 36.

When the generator is driven by an alternating current driving motor, an exciter driven by the driving motor is employed to supply current to the separately excited field windings of the supply generator and the elevator motor and to the coils of various electromagnetic switches. With such arrangement, the lines + and — of Figure 24a would be connected to the exciter terminals. In case of a direct current power supply, lines + and — would be connected to the power supply lines.

Discharge resistances 42 and 240 are provided for the separately excited field windings 36 and 255 of the elevator motor and generator respectively. A resistance 227 is arranged in shunt to generator series field winding 242. A resistance, arranged in steps 245, 246, 247, 250, 251, 252 and 253, is provided for controlling the strength of the generator separately excited field, and therefore the voltage applied to the elevator motor armature. A resistance, illustrated in sections 34 and 35, is provided in series with the elevator motor field winding 36. 214 is the release coil for the elevator electromagnetic brake. This coil is provided with a discharge resistance designated 213. It is also provided with cooling resistance 212. The contacts operated by the car gate and engaged when the gate is closed are designated 103. The door contacts operated by the various doors are arranged in series relation. For convenience, the door contacts are shown as a single pair of contacts designated 104.

The electromagnetic switches have been designated as follows:

- A—First auxiliary stopping relay
- ANS—Auxiliary non-stop relay
- AR—Automatic reversal relay
- AS—Auxiliary speed relay
- AU—Auxiliary up direction relay
- B—Second auxiliary stopping relay
- BK—Brake resistance relay
- C—Potential switch
- D—First speed switch
- DC—Door close switch
- DO—Door open switch
- E—Second speed switch
- EE—Second speed relay
- F—Third speed switch
- FB—Field boosting switch
- FF—Third speed relay
- G—Fourth speed switch
- GF—Governor field switch
- GG—Fourth speed relay
- H—Brake and field switch
- HG—Generator field switch
- J—Minimum current field relay
- LD—Down levelling direction switch
- LE—Levelling fast speed switch
- LU—Up levelling direction switch
- LZ—Levelling slow down relay
- NB—Night bell relay
- NS—Non-stop relay
- O—Safety handle relay
- OB—First starting switch sequence relay
- OC—Second starting switch sequence relay
- P—Door operating relay
- PA,PB—Auxiliary direction switches
- PD—Down direction switch
- PL—Direction levelling relay
- PU—Up direction switch
- Q—Load magnet
- TC—Topmost car call relay
- TH—Topmost hall call relay
- UL—Up indicator light relay
- Y—Series field switch
- Z—Notch-back switch The magnet 733 of the selector for extending cam 730, hereinafter referred to as the stop magnet, is designated generally by the letters SM. Throughout the description which follows, these letters, in addition to reference numerals, will be applied to parts of the above designated switches. For example, "contacts C48" indicates that the contacts are on the potential switch C, while "operating coil H95" indicates that the coil operates the brake and field switch H. All electromagnetic switches are illustrated in de-energized position. All latching switches are illustrated in reset condition.

The operation of the control system illustrated will now be described. The motor generator set may be started by the motor generator starting switch in the elevator car (see Figure 1).

According to the preferred arrangement, with the elevator motor at rest, the current supplied to the field winding is reduced, providing what may be termed a "standing field". Resistance 35 is employed for this purpose.

The electromagnetic switch employed to connect the driving motor to the power mains is provided with additional contacts for interlocking the driving motor control with the control for the elevator motor. These additional contacts are illustrated and designated 38 and 46. Contacts 38 separate to remove the short circuit for coil J33 of the minimum current field relay J upon the connection of the driving motor to the power mains, coil J33 being connected in series relation with the elevator motor field winding. Contacts 46 are in the circuit for the coil C44 of the potential switch C. Relay J acts to insure the elevator motor field being built up to substantially standing field value before the potential switch can operate, contacts J45 being connected in the circuit for coil C44 of the potential switch. With both contacts 46 and J45 in engagement, the circuit for coil C44 of the potential switch is complete. This circuit is through potential switch contacts C37 and emergency stop switch 47. The circuit also includes various safety switches, limit switches and the like which are indicated simply by legend.

The potential switch, upon operation, engages its contacts C48 and C55 in the feed lines to the control and field circuits. The potential switch also causes the engagement of contacts C376 and the separation of contacts C37. Contacts C37 act to insert cooling resistance 43 in the circuit with the potential switch coil C44. Contacts C376 are arranged in a circuit common to the hall lanterns.

With the car at the lower terminal, the up direction switch PU is latched in operated condition and the down direction switch PD is in reset condition. With the up direction switch in operated condition, its contacts PU92, PU195, PU216, PU281 and PU591 are in engagement and its contacts PU123, PU134, PU150 and PU164 are separated. With the down direction switch in reset condition, its contacts PD110, PD201, PD217, PD280 and PD592 are separated and its contacts PD115, PD125, PD142 and PD155 are in engagement. The direction switches are also provided with latch contacts PU617 and PD611. Under the conditions assumed, contacts PD611 are in engagement and contacts PU617 are separated.

The engagement of potential switch contacts C48 and C55, together with the engagement of direction switch contacts PU195, effects the energization of the car button magnet coil 193.

Owing to the fact that contacts PD611 of the down direction switch are in engagement when the car is at the lower terminal, circuits are completed for the actuating coils PA603 and PB604 of the auxiliary direction switches PA and PB and the actuating coil AU608 of the auxiliary up direction relay upon the engagement of potential switch contacts C48 and C55. Switch PA, upon operation, engages its contacts PA544 and separates its contacts PA550. Switch PB, upon operation, engages its contacts PB526 and PB539 and separates its contacts PB525 and PB543. Switch AU, upon operation, engages its contacts AU377 and AU534.

The engagement of potential switch contacts C48 and C55 also completes the circuits for the actuating coils NS564 and ANS565 for the non-stop relay and auxiliary non-stop relay, respectively. Non-stop relay NS, upon operation, engages its contacts NS392, NS540 and NS545. Auxiliary non-stop relay ANS, upon operation, engages its contacts ANS535 and separates its contacts ANS537. The engagement of contacts NS540 and NS545, together with the engagement of contacts PB539 and PA544, prepares the reset and stop circuits. The engagement of contacts NS392 together with the engagement of contacts C376 and PB526 completes the circuit for up lamp 521 at the first floor. This connection is to the power supply lines indicated as + and − and is through selector contact 522 and brush 523. The purpose of the contacts of the auxiliary non-stop relay ANS and auxiliary up direction relay AU will be explained later in the description.

The car is started by the attendant in the car moving the starting switch to full start position. As previously explained, the starting switch has an intermediate position for effecting certain control operations and for effecting the closing of the car gate and the hatchway door for the floor at which the car is standing. For convenience of description, it will first be assumed that the starting switch is operated to the intermediate position and then to full start position in steps. It is to be understood, however, that in normal operation the car switch is moved to full start position immediately without pausing in the intermediate position.

Movement of the starting switch to its intermediate position causes the bridging of contacts 581. This completes the circuit for the coil DC573 of the door close switch. The circuit extends through a limit switch 571 arranged to be operated by the door operating mechanism, interlock contacts DO572 of the door open switch and contacts OC580 of the second starting switch sequence relay. This switch causes the operation of mechanism (not shown) to move the car gate and the hatchway door at the first floor to closed positions.

The bridging of contacts 581 also completes the circuit for coil P575 of the door operating relay P. Relay P is a latching relay, being provided with an operating coil and a reset coil. Coil P575 is the reset coil and acts, upon energization, to cause the relay to be reset. Relay P, upon being reset, separates contacts P52 and engages contacts P137, the condition of the contacts as illustrated. Contacts P52 are arranged in the circuit for coil DO51 of the door open switch, while contacts P137 are in the circuit for the coils of speed switches D, E, F and G.

Upon movement of the door operating mechanism a certain distance, a limit switch 50 in circuit with door open switch coil DO51 is closed. The circuit for coil DO51 is not completed, however, as contacts P52 of door operating relay P are separated. As the door and gate near closed position, limit switch 571 is opened, breaking the circuit for coil DC573 of the door close switch, discontinuing the operation of the door operating mechanism, and the door and gate are brought to a stop as they reach closed positions.

If the attendant, after he has effected the closing of the door and gate, desires to open them, or if he desires to arrest the movement of the door and gate in closing, he may do so by moving the starting switch back through off position to door opening position. Assume that the gate and door are closed and that the attendant moves his starting switch to door open position. Starting switch contacts 61 are bridged in this position, completing a circuit for the operating coil P56 of the door operating relay. The circuit extends through a portion of resistance 60, contacts OB62 of the first starting switch sequence relay, contacts D53 of the first speed switch and the emergency switch, this latter switch being illustrated as provided with two blades 47 and 54, the present circuit passing through blade 54. Relay P operates to engage its contacts P52, completing the circuit for the actuating coil DO51 of the door open switch. Switch DO causes the operation of the door operating mechanism to move the door and gate to open positions.

Upon movement of the door and gate a short distance in the opening direction, limit switch 571 closes, preparing the circuit for coil DC573 of the door close switch. Just before the door and gate reach open position, limit switch 50 opens to break the circuit for coil DO51, discontinuing the operation of the door operating mechanism and the door and gate are brought to a stop.

Returning to the operations resulting from movement of the starting switch to intermediate position, the bridging of starting switch contacts 581 completes a circuit for the operating coil SM577 of the selector stop magnet. The circuit extends through resistance 578, contacts AS579 of the auxiliary speed relay, and contacts OC580. This magnet extends the cam 730 to move the pawls into position where they do not engage the stopping lugs, and engages the three pairs of switch contacts, as previously described, these contacts being designated on the wiring diagrams as SM549, SM583 and SM586. Contacts SM583, upon engagement, establish a self-holding circuit for the magnet. Contacts SM549 are in the slow down initiating circuits and serve as an interlock. Contacts SM586 complete the circuit for the coil A585 of the first auxiliary stopping relay. The circuit is through a portion of resistance 584 and start switch contacts 581.

Stopping relay A, upon operation, engages contacts A532 and A594 and separates contacts A524 and A541. Contacts A541 open the reset circuit for the floor relays, the purpose of which will be seen later. Contacts A524 open the circuit to the hall light brushes 519 and 523, thus breaking the circuit to lamp 521 to extinguish the up light at the first floor. Contacts A532 prepare the circuit for effecting automatic reversal. This operation will be explained later. Contacts A594 are in the circuit for the selector machine advancer motor.

So far, the operation which transpires as a result of moving the starting switch to intermediate position has been described. Assume, now, that the starting switch has been moved immediately to full start position from off position, which is the normal condition. Assume also that a call has been registered for a floor a greater distance above the first floor than the distance which the advancer motor advances the brushes. The reason for this assumption will be seen as the description proceeds. The control operations previously described as effected as a result of movement of the starting switch to intermediate position take place as before, contacts 581 remaining bridged in full start position. Due to the bridging of contacts 112 and 597, other control operations occur at the same time as those effected by the bridging of contacts 581.

The bridging of starting switch contacts 597 completes the circuit for coil B587 of the second auxiliary stopping relay through a portion of resistance 584, and contacts A594. Relay B, upon operation, separates contacts B66 in the automatic door opening circuit and engages contacts B147 to complete the circuit for coil FB144 of the field boosting switch. Switch FB, upon operation, engages contacts FB140 to establish a self-holding circuit through contacts of one of the speed relays. This holding circuit is shown extending through contacts FF141 of the third speed relay, but it is to be understood that the relay employed would be determined by the requirements of the particular installation. It also engages contacts FB233 to short-circuit a variable portion of the generator field control resistance.

The bridging of contacts 597, together with the engagement of contacts A594, completes the circuit for the selector machine advancer motor. The circuit extends through advancer motor armature 589 and field winding 588 connected in parallel by contacts PU591, advancer motor field winding 590, resistance 593, contacts 594 and starting switch contacts 597. The advancer motor operates to close selector switches 102, 57, 121, 131, 154 and 162 in the order named. At the same time, the advancer motor advances brushes 507, 510, 511, 514, 515, 517, 519, 523, the cam 508 and the pawls 704 and 705, as previously described, the direction of current flow through the advancer motor armature being such as to cause the advance to take place in the up direction. The advancer mechanism is brought to a stop by stop collar 716.

The advancer motor is preferably adjusted so as to effect the closure of the selector switches and the advancing of the brushes, cam and pawls at a fairly rapid rate so that all the selector switches will be closed and the brushes totally advanced before the closure of the door and gate is effected. With this arrangement, the car is started when gate contacts 103 and hatchway door contacts 104 close as the gate and the door for the floor at which the car is positioned reach closed positions. The engagement of gate contacts 103 and door contacts 104 completes the circuit for coil H95 of the brake and field switch and coil HG100 of the generator field switch. This circuit is through a portion of resistance 96, contacts OC91 of second starting switch sequence relay, selector switch 102, up direction switch contacts PU92, terminal stopping switch 93, starting switch contacts 112 and emergency switch 54.

Switch H, upon operation, engages contacts H41, H67, H171, H205 and H211 and separates contacts H210, H270 and H615. Switch HG, upon operation, engages contacts HG97, HG237, HG254, HG570 and HG599 and separates contacts HG183 and HG277. The engagement of contacts HG97 by-passes contacts OC91 of the second starting switch sequence relay in the circuit for the coils of switches H and HG. Contacts HG599 engage to by-pass contacts 597 of the starting switch in the circuit for the coil of switch B and the circuit for the brush advancer motor. Contacts H67 are in the automatic door opening circuit. Contacts H615 are in the circuit with the coils of direction switches PU and PD, and serve to prevent the operation of these switches until the car has been brought to a stop. Contacts HG183 are arranged in the circuit for the generator auxiliary separately excited field winding 184, preventing the completion of this circuit so long as switch HG is operated. These contacts also control the circuit for the coil Y172 of the series field switch. Contacts H171, when in engagement, prepare the circuit for coil Y172 of the series field switch. Contacts HG277 and contacts H270 control the connecting of the generator separately excited field winding 255 to the generator armature 256. These contacts, upon separation, break the shunt circuits for resistance 266, which is of a high value, inserting this resistance in the circuit connecting the generator field winding to its armature. Contacts H205 and H211 complete the circuit for the brake release coil 214. Contacts H210 control a discharge circuit for the brake release coil. The purpose of this arrangement will be explained later. Contacts HG237 and HG254 connect the generator separately excited field winding 255 to supply lines + and —.

The completion of the circuit for the generator separately excited field winding causes current to be supplied from the generator armature 256 to the hoisting motor armature 257 and, the brake being released as a result of the energization of its release coil 214, the elevator motor starts the car in the up direction. The elevator motor field is brought up to full strength as the starting of the elevator motor is effected, owing to the short-circuiting of resistance section 35 by contacts H41. The circuit for the generator field winding, upon starting the elevator motor, is through resistance steps 245, 246, 252 and 253. Contacts FB233 have been illustrated as short-circuiting step 251 but it is to be understood that the amount of resistance actually short-circuited by these contacts will be determined by the characteristics of the particular installation. The purpose of contacts FB233 is to apply a rather high value of voltage to the generator field winding 255 initially, forcing the field strength of the generator to be more rapidly built up.

Contacts HG570 complete the circuit for coils OB568 and OC569 of the starting switch sequence relays. Relay OC engages contacts OC136 to prepare the circuits for the coils of the speed switches. It separates contacts OC91 to insert cooling resistance 96 in the circuit for the coils of switches H and HG. Contacts OC576 in conjunction with contacts HG570 by-pass contacts 581 of the starting switch. Contacts OC580 break the initial energizing circuit for the operating coil of the stop magnet SM and also for the reset coil P575 of the door operating relay. First starting switch sequence relay OB, upon operation, separates contacts OB62 to break the circuit for the operating coil P56 of the door operating relay, preventing the manual reopening of the doors until the car is again brought to a stop.

Upon the closing of selector switch 121 by the advancer motor, a circuit is completed for coil AS114 of the auxiliary speed relay. This relay engages contacts AS533 and AS547 and separates contacts AS579 and AS616. Contacts AS579 are in the initial energizing circuit for coil SM577 of the stop magnet. This arrangement prevents the starting of the car upon movement of the starting switch to start position in the event that the advancer mechanism is for any reason in an advanced condition. Contacts AS616 are in the circuit which controls the coils of direction switches PU and PD, and act to prevent the operation of these switches to reverse the direction of car travel in the event that the advancer mechanism is for any reason in an advanced condition. The purpose of contacts AS547 and AS533 will be explained later.

The brake, upon being released, effects the separation of contacts 196, which act to remove the short-circuit for the operating coil BK203 of the brake resistance relay. This relay operates to separate its contacts BK206 to insert cooling resistance 212 in circuit with brake release coil 214, and engages its contacts BK120, which completes the circuit for the coil D117 of the first speed switch. The circuit may be traced through contacts OC136, contacts P137, coil D117, contacts BK120, selector contacts 121, up direction switch contacts PD115, terminal stopping switch contacts 116 and emergency switch 54.

Switch D operates to engage its contacts D170 and D224 and to separate its contacts D53. Contacts D53 are in the door operating circuits and serve to prevent the energization of the coil of the door open switch DO while the car is running. Contacts D170 complete the circuit for the retiring magnets 166 and 167 for the levelling switches. These magnets operate to attract the levelling rollers of the selector so as to cause them to clear the levelling cams as floors are passed at which stops are not to be made. The retraction of the rollers causes the engagement of levelling switch contacts 75, 77, 82 and 87 and the separation of levelling switch contacts 83 and 90, as previously explained.

The engagement of contacts 75 and 77 completes the circuit for the actuating coil LE74 of the fast speed levelling switch and coil LZ73 of the levelling slow down relay through a portion of resistance 70. Switch LE engages contacts LE191 in the circuit for generator auxiliary separately excited field winding 184. The purpose of these contacts will be explained later. Switch LZ separates contacts LZ192 which also control the circuit for field winding 184, as will be explained later.

Contacts D224, upon engagement, short-circuit step 253 of the control resistance for the generator field winding 255. This increases the voltage applied to the generator field winding. This in turn increases the voltage of the generator armature, with the resultant increase in the speed of the elevator motor.

The coils of certain relays are arranged in circuit with the generator field winding 255. As the current in the generator field winding builds up as a result of the operation of switch D, a point is reached where sufficient voltage is applied to the actuating coil EE264 of the second speed relay to cause this relay to operate. Upon operation, relay EE engages contacts EE130 to complete the circuit for the actuating coil E127 of the second speed switch.

Switch E, upon operation, engages contacts E157 and E223. Contacts E157 prepare the circuit for the coils of speed switches F and G. Contacts E223 short-circuit step 252 of the generator field control resistance. This further increases the voltage applied to generator field winding 255, causing corresponding increase in the speed of the elevator motor. As the current increases in the generator field winding circuit, a point is reached where sufficient current is supplied to coil FF263 of the third speed relay to cause this relay to operate. Upon operation, relay FF separates contacts FF141 to break the holding circuit for switch FB. This switch is maintained operated by contacts B147. The purpose of this arrangement will be explained later. Relay FF also engages contacts FF153 to complete the circuit for coil F152 of the third speed switch. Switch F, upon operation, engages contacts F222 to short-circuit step 251 of generator field control resistance, illustrated as subject also to contacts FB233.

Upon the current supplied to the generator field winding increasing to a further point, coil GG225 of the fifth speed switch relay is energized sufficiently to cause this relay to operate. Relay GG, upon operation, engages contacts GG161. This completes the circuit for coil G160 of the fourth speed switch. This switch, upon operation, engages contacts G221, G261 and G265 and separates contacts G40 and G267. Contacts G265, upon engagement, connect resistance 274 across the actuating coils FF263 and EE264 of the third and second speed relays, resistance 274 acting as a cooling resistance for these coils. Contacts G267 upon separation, break the circuit through resistance 266, thereby disconnecting the generator field winding 255 from the generator armature. Contacts G221, upon engagement, short-circuit step 246 of generator field control resistance, while contacts G40 remove the short-circuit for all but a portion of section 34 of the elevator motor field control resistance. The resulting increase in generator voltage and the weakening of the elevator motor field causes further increase in the speed of the elevator motor. Contacts G261 short-circuit a portion of resistance 271 in circuit with coil Z234 of the notch-back switch.

The coil Z234 of the notch-back switch is connected across the generator armature. The operation of switch Z is thus delayed until after the operation of switch G and until the generator voltage rises to a predetermined value. Upon operation, switch Z engages contacts Z260 and separates contacts Z31 and Z231. Contacts Z231 control step 247 of the generator field control resistance. Contacts Z260 connect voltage coil Q235 of the load switch across the generator armature. The separation of contacts Z31 removes the short-circuit for an additional portion of resistance 34 in the circuit with the elevator motor separately excited field winding. The resultant weakening of the elevator motor field causes the elevator motor to come up to full speed.

Load switch Q is provided with a current coil Q244 in addition to its voltage coil Q235. These coils act cumulatively when the elevator motor is lifting above balanced load to cause the operation of the switch, the operation of the switch being delayed until after switch Z operates. The switch is provided with forward contacts Q220 and with back contacts Q262 and Q232. Contacts Q262 separate to insert a portion of resistance 272 in circuit with voltage coil Q235 while contacts Q232 separate to remove a shunt for step 250 of the generator field control resistance. Resistance step 250 is maintained short-circuited, however, by contacts G221. Contacts Q220 short-circuit the remaining step 245 of generator field resistance to compensate for the load conditions.

Governor operated switch 200 controls the governor field switch GF to provide speed regulation. Upon a predetermined amount of overspeed, governor switch 200 closes to complete the circuit for coil GF197 of the governor field switch which operates to engage its contacts GF204 and GF32. Contacts GF32 short-circuit section 35 of the elevator motor separately excited field control resistance, already cut out by contacts H41, and a portion of resistance section 34. The shunting of the portion of resistance section 34 strengthens the elevator motor field to reduce the speed of the motor. The other contacts GF204 establish a self-holding circuit for the coil GF197, maintaining the switch operated until the direction of travel is reversed. The purpose of the governor field switch is served particularly under full load conditions during downward travel.

As the current in the generator field winding builds up as a result of the operation of the speed switches, a point is reached where sufficient voltage is applied to coil O226 of the safety handle relay to cause the operation of this relay. Upon operation, relay O engages contacts O94 to bypass contacts 112 of the starting switch. This arrangement permits the return of the starting switch to off position without stopping the car, upon the speed of the elevator car reaching a predetermined value, say 40% of normal full speed. It also permits the car to be stopped by centering the car switch before the car reaches 40% normal full speed. This is particularly useful where it is desired to stop quickly in emergencies.

The coil PL236 of the direction levelling relay is connected through resistance 273 across the generator armature. This relay also has a coil PL72 which is energized upon engagement of the potential switch contacts C48 and C55 through a portion of resistance 70. These coils act cumulatively during the up direction of car travel to cause the operation of the relay upon the generator voltage reaching a predetermined value, say, that which it attains during an average of four feet of car travel. Once the relay is operated, it is maintained operated by coil PL72 until the car starts its travel in the down direction. During down car travel, these coils act differentially. Upon the generator voltage applied to coil PL236 reaching a predetermined value, the relay is caused to drop out. Upon operation, the relay engages contacts PL180 and separates contacts PL177. The purpose of these contacts is served during levelling of the car, as will be explained later.

Assume that the call previously assumed to be registered was registered in response to the pressing of the up push button 295 at the seventh floor. The pressing of this button energizes coil 313 of its floor relay, the relay acting to engage contacts 349 and to separate contacts 367. The operating coils of the floor relays are connected to the source of supply for the building so as to be operable at any time, regardless of whether, in case of power being applied to the hoisting motor of a motor generator set, the motor generator set for any elevator is in operation or not. Assume also that a passenger has been taken into the car at the first floor and that this passenger desires to alight at the eighth floor. Upon the passenger signifying his destination, the attendant presses car button 407 for the eighth floor. This button is maintained operated by car button magnet 193. Assume further that the car attains a speed of 1000 F. P. M. under full speed operating conditions. A six-floor run has been assumed so that in an average installation the car will have reached substantially full speed before the car arrives at the slow down point for the seventh floor.

Upon the arrival of the car at a certain distance from the seventh floor, say fifty feet, brush 514 engages contact 427, rendered "alive" by the engagement of floor relay contacts 349, establishing a circuit for coil SM548 of the stop magnet. This coil neutralizes coil SM577, releasing cam 730 and extending the pawls to permit up pawl 705 to engage the stopping lug for the seventh floor. The circuit for coil SM548 is through seventh floor relay reset coil 331 and contacts 349, bus bar UH7, contact 427, brush 514, contacts PA544, contacts NS545, resistance 546, contacts AS547, coil SM548 and contacts SM549. The release of the cam also effects the opening of contacts SM549, SM583 and SM586.

The opening of contacts SM549 and SM583 breaks the circuits for coils SM548 and SM577.

The opening of contacts SM586 breaks the circuit for coil 585 of the first auxiliary stopping relay. This relay drops out, separating contacts A594 and A532 and engaging contacts A524 and A541. The separation of contacts A594 breaks the circuit for the advancer motor and coil B587 of the second auxiliary stopping relay. The second auxiliary stopping relay drops out to separate contacts B147 and engage contacts B66. The engagement of contacts B66 prepares the automatic door opening circuit, while the separation of contacts B147 breaks the circuit for coil FB144 of the field boosting switch. The dropping out of the field boosting switch to separate its contacts FB233 does not affect the running of the car as the resistance controlled thereby is maintained short-circuited by speed switch contacts, illustrated as contacts F222 of the third speed switch.

The engagement of contacts A541 completes a circuit through brush 515 and contact 428 to effect the reset of the up seventh floor relay, this circuit extending through the reset coil 331 and contacts 349 of the relay, contacts PB539, contacts NS540 and resistance 542. Although a circuit was completed for reset coil 331 by the engagement of brush 514 with contact 427, the amount of current supplied to this coil through that circuit was not sufficient to cause the relay to be reset. The current supplied to this coil through the circuit completed through brush 515 and contact 428 by the engagement of contacts A541, however, is sufficient to reset the relay, which separates its contacts 349 and reengages its contacts 367.

The engagement of contacts A524 completes the circuit for the up light 433 at the seventh floor, this circuit being through contacts C376, contacts PB526, brush 523, contact 434 and contacts NS392. The up hall lantern at the seventh floor is lighted considerably before the car arrives at the seventh floor, and, under the conditions assumed, before the car has started to slow down. With the equivalent of a fifty foot advance obtained by the advancer mechanism, this lamp would be lighted as soon as the car arrived at a distance fifty feet from the floor. It will be seen that where a plurality of cars are operating and any one of them may respond to the registered call, a maximum duration of lighting is provided by this arrangement as the lamp is lighted as soon as the car for which it is provided is selected to be the one to make a stop in response to the call, even though actual slow down does not take place until some point later. Also, there is no false or duplicate lighting of hall lanterns as the floor relay is reset at the same time the hall lantern is lighted, preventing any other car lighting its corresponding hall lantern in response to the registered call.

As the car continues in motion, the up pawl 705 engages the lug for the seventh floor, bringing the sliding carriage 703 and rack 702 to a stop. Brush 523 is still engaged with contact 434 at this time so that the up hall lantern at the seventh floor is maintained lighted. Continued motion of the crosshead causes the pinion 701 to ride up the rack 702. As this movement takes place, a point is reached when selector switch 162 is opened. For a 1000 F. P. M. installation, switch 162 would be set to open with the car at about 29 feet from the floor. Continued movement of the crosshead opens selector switches 154, 131, 121, 57 and 102 in sequence, at predetermined distances from the landing, as the car continues its travel to the seventh floor.

The opening of selector switch 162 breaks the circuit for the coil G160 of the fourth speed switch. This switch engages contacts G40 and G267 and separates contacts G221, G261 and G265. Contacts G265 disconnect cooling resistance 274 from the coils EE264 and FF263. Contacts G261 reinsert the portion of resistance 271 in circuit with coil Z234 of the notch-back switch. Contacts G221 insert resistance steps 246 and 247 in circuit with the generator field winding, contacts Z231 of the notch-back switch being maintained separated. Contacts G221 also insert resistance step 250 in circuit with the generator field winding under conditions where the load switch Q has been operated. Contacts G40 short-circuit section 34 of the elevator motor field winding control resistance.

The weakening of the generator field and strengthening of the elevator motor field as a result of the deenergization of the fourth speed switch G causes the elevator car to slow down. The reengagement of contacts G267 reconnects generator field winding 255 to the generator armature 256 through resistance 266, this connection being such as to cause a voltage to be applied to the field winding by the generator armature of a polarity which opposes the voltage applied by the supply lines. This assists in weakening the generator field. The amount of weakening obtained in this manner is determined by the value of resistance 266, which is preferably of a high value.

The opening of selector switch 154 deenergizes coil F152 of the third speed switch. Switch F separates contacts F222 to remove the short-circuit for step 251 of the generator field control resistance. This causes further weakening of the generator field with consequent further slow down of the elevator car.

The opening of selector switch 131 breaks the circuit for coil E127 of the second speed switch. This switch separates contacts E157 and E223. The separation of contacts E223 reinserts resistance step 252 of the generator field control resistance in circuit with the generator field winding. This further weakens the generator field and causes further slow down of the elevator car.

The opening of selector switch 121 breaks the circuit for coil D117 of the first speed switch, which separates contacts D170 and D224 and engages contacts D53. The separation of contacts D224 removes the short-circuit for resistance step 253 in circuit with the generator field winding, causing further slow down of the elevator car to take place. The engagement of contacts D53 connects resistance 65 across supply lines + and − in the automatic door opening circuit, this circuit extending through selector switch 57, contacts B66 and contacts H67. Selector switch 57 is arranged in shunt to coil P56 of the door operating relay and prevents energization of this coil to effect the opening of the door and gate at the seventh floor at this time.

Contacts D170 break the circuit for retiring magnets 166 and 167 for the levelling switches. As a result, the levelling rollers are permitted to assume positions for cooperation with the levelling cam for the seventh floor. The car being below the seventh floor, the up levelling roller engages the seventh floor levelling cam, causing contacts 82 to be maintained in engagement and also causing contacts 75 to be maintained in engagement in the event that the car is a certain distance below the floor at the time that the rollers are reextended. Owing to the fact that the down levelling roller does not engage the cam, contacts 77 and 87 are permitted to separate and contacts 83 are permitted to reengage. The reengagement of levelling contacts 83 completes the circuit for coil LU81 of the up levelling direction switch. This circuit extends through coil H95 of the brake and field switch, resistance 84 and contacts LD80 of the down levelling direction switch. Assuming levelling contacts 75 to be maintained in engagement, the levelling fast speed switch LE and levelling slow down relay LZ are maintained operated.

Switch LU, upon operation, engages contacts LU175, LU181 and LU187 and separates contacts LU85. Contacts LU85 are interlock contacts arranged in the circuit for coil LD86 of the down levelling direction switch. Contacts LU175 and LU187 serve as direction contacts for the generator auxiliary field winding 184. Contacts LU181 are in series with contacts PL177 in a shunt circuit for step 186 of the control resistance for the generator auxiliary field winding. The purpose of this arrangement is served in case of an overrun of a floor in stopping during down car travel. Contacts LU175 and LU187 prepare the circuit for field winding 184 but this circuit is not completed owing to the fact that contacts HG183 are separated.

Upon the opening of selector switch 57, the short-circuit for operating coil P56 of the door operating relay is removed. This causes the door operating relay to operate, which engages its contacts P52 to complete the circuit for coil DO51 of the door open switch. Switch DO causes the operation of the door operating mechanism to move the door and gate to open positions as the car arrives at the seventh floor. The exact setting of switch 57 is determined by the requirements of the particular installation. Switch P also separates its contacts P137 to prevent the reestablishment of the circuits for any of the speed switches, once the door opening operation is initiated.

The opening of selector switch 102 occurs just before the car arrives at the seventh floor. The opening of this switch deenergizes coil HG100 of the generator field switch. Switch HG opens to separate its contacts HG97, HG237, HG254, HG570 and HG599 and reengages its contacts HG183 and HG277.

The separation of contacts HG570 breaks the circuit for coils OB568 and OC569 of the starting switch sequence relays, assuming that the starting switch has been returned to neutral. Relay OC separates contacts OC136 and OC576 and reengages contacts OC91 and OC580 and relay OB reengages contacts OB62.

The separation of contacts HG237 and HG254 disconnects the generator main separately excited field winding 255 from the supply lines. At the same time, however, the generator auxiliary separately excited field winding 184 is connected to the supply lines by contacts HG183. The excitation of the generator is now effected through the auxiliary field winding 184. Switch Y is also operated as a result of the engagement of contacts HG183 and separates its contacts Y230 to disconnect resistance 227 in parallel with the generator series field winding 242. This strengthens the field of the generator for the levelling operation. The engagement of contacts HG277 connects resistance 276 in parallel with resistance 266 in the circuit connecting the generator field winding 255 to the generator armature. This causes stable operation to be obtained during operation of the car on the auxiliary field winding. It minimizes the effects of residual flux by causing the main field winding to provide a magnetomotive force which opposes that due to field winding 184 and which increases upon any tendency of the generator armature voltage to increase and thus decreases the net magnetizing force, and vice versa, thus producing a state of substantial equilibrium.

Assuming that the car is in the fast speed levelling zone at the time that contacts HG183 engage, contacts LE191 are in engagement, short-circuiting resistance section 186 and a portion of section 185, causing the car to travel at a fast levelling speed. As the car runs from the fast speed to the slow speed levelling zone, levelling contacts 75 are separated, deenergizing fast speed levelling switch coil LE74 and coil LZ73 of the levelling slow-down relay. Switch LE drops out to separate its contacts LE191. This removes the short-circuit for sections 185 and 186 of the control resistance for field winding 184, decreasing the generator voltage and causing the car to run at a slow levelling speed.

Relay LZ is delayed in dropping out after the breaking of the circuit for its coil, as by a dash pot (see Figure 23). The purpose of this arrangement is to minimize the possibility of overruns during stopping operations due to the time constant of the auxiliary field winding 184. The insertion of both resistance sections 185 and 186 as the car enters the slow speed zone decreases the voltage applied to the field winding to a sufficiently low value to obviate the effect of the lag of the field, thus insuring the desired retardation. The later reengagement of contacts LZ182 short-circuits section 186 to insure the generation of sufficient voltage to bring the car to the floor.

Just before the car reaches the exact level with the seventh floor landing, levelling contacts 82 are separated. The circuit for coils H95 and LU81 is thus broken. Switch H drops out, causing the separation of contacts H41, H67, H171, H205 and H211 and the engagement of contacts H210, H270 and H615. The separation of contacts H171 deenergizes series field switch Y to effect the reengagement of contacts Y230. The separation of contacts H67 breaks the circuit for coil P56. This cannot interrupt the opening of the door and gate, however, as contacts P52 are latched in engagement. The separation of contacts H205 and H211 breaks the circuit for the brake release coil 214. This causes the brake to be applied, which reengages its contacts 196 to short-circuit coil BK203, thus causing brake resistance relay BK to drop out. The separation of contacts H41 reinserts resistance section 35 in circuit with the elevator motor field winding, reducing the current therein to a "standing field" value. The reengagement of contacts H270 short-circuits resistances 266 and 276 in the circuit connecting the generator field winding 255 to the generator armature. This increases the effect of armature 256 on field winding 255 substantially to destroy the residual flux of the generator field.

Up levelling direction switch LU, dropping out simultaneously with switch H, separates contacts LU175, LU181 and LU187. The separation of contacts LU175 and LU187 disconnects the generator auxiliary field winding 184 from the supply lines.

Thus, the brake being applied and the generator separately excited field windings being disconnected from the supply lines, the car is brought to rest with the car in exact alignment with the seventh floor landing. The reengagement of contacts H210 connects resistance 207 in parallel with resistance 213 across coil 214, softening the final application of the brake.

Should an overrun occur, circuits are completed to return the car to the seventh floor landing level. Assume that an overrun occurs into the slow speed levelling zone. This results in the engagement of levelling contacts 87 to complete a circuit for coils H95 and LD86 of the brake and field switch and down levelling direction switch respectively, levelling interlock contacts 90 now being in engagement. Switch H operates to effect the release of the brake, to remove the short-circuit for resistances 266 and 276, to strengthen the field of the elevator motor and to cause the shunt circuit for the generator series field winding to be broken. Switch LD engages contacts LD174, LD182 and LD190 and separates contacts LD80. Contacts LD80 are interlock contacts corresponding with contacts LU85. Contacts LD174 and LD190 connect the generator auxiliary field winding 184 to the supply lines. Due to the reversal of the flow of current through this winding from that during the levelling operation upon the car approaching the floor in the up direction, the car is caused to start in the down direction. As the car returns to the floor, it is stopped by the separation of levelling contacts 87 in a manner similar to that described for the approach of the car to the floor in the up direction.

If the overrun extends into the fast speed levelling zone, levelling contacts 77 as well as levelling contacts 87 are engaged. The engagement of contacts 77 causes the operation of levelling slow down relay LZ and of levelling fast speed switch LE which engages its contacts LE191 to short-circuit section 186 and a portion of section 185 of the control resistance for field winding 184. This increases the generator voltage, causing the elevator motor to run at a fast levelling speed. As the car returns to the slow speed levelling zone, switch LE is dropped out, reinserting a portion of resistance 185 in circuit with field winding 184. Owing to the fact that relay LZ is delayed in dropping out, the separation of contacts LE191 also removes the short-circuit for resistance section 186. At this time contacts LD182 as well as contacts PL180 are in engagement so that a resistance 176 of relatively low value is connected in parallel with resistance 186. This compensates for the effects of hysteresis to cause field winding 184 to create a magnetizing force for the slow speed levelling operation in the slow speed zone which is sufficient to insure the continued return of the car to the floor. Contacts PL177 and LU181 serve a similar purpose in case of an overrun during down car travel.

In the above described slow-down operation, it was assumed that the starting switch had been returned to off position. In the event that this switch is held in full running or intermediate position, the starting switch sequence relay OC insures the slowing down of the car and bringing it to a stop, and the opening of the gate and door. Assume in the above example where the car is brought to a stop at the seventh floor, that the starting switch is held in either full running or intermediate position during the slow-down operation. Upon the separation of contacts HG570, coils OB568 and OC569 of the starting switch sequence relays are not deenergized, owing to the fact that a circuit remains established for these coils through contacts OC576 and starting switch contacts 581. Thus, relay OC does not drop out, maintaining separated its contacts OC580 in the circuit for coil SM577 of the stop magnet. This prevents energization of coil SM577 by way of starting switch contacts 581 and therefore prevents the reoperation of the stop magnet. Also, contacts OC580 prevent the establishment of a circuit through starting switch contacts 581 for coil P575 of the door operating relay. The establishment of this circuit would prevent the latching of contacts P52 in engaged condition, which would prevent the opening of the door and gate. Further, contacts OC580 prevent the establishment of a circuit through starting switch contacts 581 for coil DC573 of the door close switch. It is to be noted that with this arrangement, the starting switch must be returned to off position before the reclosing of the door and gate, and the restarting of the car, can be effected.

The steps of resistance in the circuit for the generator main field winding 255 are proportioned to suit the requirements of the particular installation, both as regards the time for bringing the car up to speed and the smoothness of the starting operation. For retardation, in order to cause the car to slow down in the desired time interval, which may be less than the time interval for acceleration, the short-circuit for resistance step 247 is removed by contacts Z231 of the notch-back switch, to permit a larger amount of resistance to be reinserted in the generator field winding circuit upon the separation of contacts G221.

The load switch Q, by means of its contacts Q232, assists in bringing the car to an accurate stop under different conditions of load.

The safety handle relay O is arranged to hold in until after the separation of contacts HG237 and HG254, being assisted by the action of generator field discharge resistance 240. This insures the deenergization of coil HG100 by selector switch 102.

Assume that the intending passenger at the seventh floor is taken into the car. Assume further that he desires to be taken to the tenth floor, and so informs the car attendant. The attendant presses the tenth floor car button 381 and moves the starting switch to full start position. This initiates the operation of the door operating mechanism to close the gate and door at the seventh floor. It also energizes the stop magnet SM to retract the pawls 704 and 705, and to cause the operation of relay A. Relay A separates its contacts A524 to extinguish the lighted hall lantern at the seventh floor and engages contacts A594 to cause the operation of the advancer motor to advance the brushes.

The eighth floor car button 407 has also been pressed, under the assumed conditions, to cause a stop at the eighth floor for the passenger who was taken into the car at the first floor. This button connects selector contact 408 to the negative supply line, rendering this contact "alive". Contact 408 is engaged by brush 507 as the advancer motor advances this brush in response to movement of the car starting switch to full operated position. This engagement completes a circuit for coil SM548 of the stop magnet, causing the release of the pawls and the separation of contacts SM586 to deenergize relay A. Relay A separates contacts A594 to bring the advancer motor to a stop. Brush 523 is in engagement with contact 420 at this time so that the reengagement of contacts A524 completes a circuit for lamp 419 at the eighth floor, causing the up eighth floor hall lantern to be lighted. Owing to the fact that the car is started when the door and gate close, this arrangement causes the lighting of the hall lantern to take place, under the conditions assumed, before the car is actually started from the seventh floor. In fact, the hall lantern is lighted almost immediately the starting switch is thrown to start position, thereby getting maximum duration of the advisory signal at the eighth floor landing.

During the advance of the brushes, selector switches 102, 57, 121 and 131 are closed but selector switches 154 and 162 are set so as not to be closed during a one-floor run in an installation operating at 1000 F. P. M. Thus, upon the reclosure of the gate and the seventh floor hatchway door, the car is started and speed switches D and E are operated to cut out steps of generator field control resistance. The field boosting switch FB is also operated to engage its contacts FB233 which short-circuit an additional portion of the generator field control resistance. Coil FB144 of this switch is energized by the momentary engagement of contacts B147 of relay B engaged as a result of the momentary operation of relay A. The field boosting switch remains operated after contacts B147 open, as a result of the engagement of the eighth floor contact by the brush, by its holding contacts FB140. Thus the field of the generator is forced, under the conditions assumed, as well as under conditions where full brush advance is obtained during the starting operation.

As the car moves up the hatchway, up pawl 705, which has been advanced along with brush 507, engages stopping lug 706 for the eighth floor and, upon continued movement, causes the opening of selector switch 131. The third speed relay FF is adjusted to operate just before selector switch 131 is opened. The operation of relay FF causes the dropping out of switch FB and the opening of switch 131 causes the dropping out of switch E. These switches reinsert resistance in circuit with field winding 255, causing the car to slow down. The car is thereafter further slowed down and finally brought to a stop at the eighth floor landing, the car gate and hatchway door for that floor automatically opening as the car is brought to rest, as previously described.

The above examples of operation show that when the brushes do not meet a live contact during their advance in response to movement of the starting switch to full operated position, the advancer mechanism is brought to a stop by the engagement of the advancer carriage with one of its collars, the advancer motor being maintained energized, whereas when an "alive" contact is engaged by a brush during the advance, the advancer motor is deenergized and the mechanism is brought to a stop at that point.

After the passenger has been discharged at the eighth floor, the attendant moves the starting switch to full start position. The lighted hall lantern at the eighth floor is extinguished during the starting operation as a result of the operation of relay A. Should the up hall button at the eighth floor be pressed after the starting switch has been operated, contacts AS547 insure that this button does not cause a stop at the ninth floor, these contacts remaining open until considerably after the disengagement of brush 514 from contact 413 for the eighth floor is assured. Assume that this button is not pressed and only the tenth floor car button remains to be responded to. The brush advance motor is operated in response to operation of the starting switch and is brought to a stop upon engagement of brush 507 with contact 382 for the tenth floor, this contact being independent of tenth floor car button 381, which serves to insure the car being brought to a stop at the upper terminal floor. Also, relay A reengages contacts A524 to complete the circuit through selector contact 390 for the hall lantern at the tenth floor. Upon the closure of the car gate and eighth floor hatchway door, the car is restarted in the up direction.

The car is slowed down and stopped at the tenth floor by the action of the terminal stopping switches 156, 143, 126, 116 and 93. The selector switches are opened as a result of the engagement of brush 507 with contact 382. These terminal stopping switches are as a matter of safety set to act ahead of the selector switches, the latter being utilized to insure the slow down and stopping action. In case of the run from the eighth to the tenth floor in a 1000 F. P. M. installation, terminal stopping switch 156 is opened before the eighth floor is reached.

The opening of the door and gate at the upper terminal is effected in a manner similar to that previously described. Owing to the fact that the car is running very slowly during the latter part of the slow down operation at the upper terminal, due to the opening of the terminal stopping switches ahead of the selector switches, the short-circuit for coil P56 is maintained by the engagement of brush 64 with contact 63 until a certain point is reached, thereby avoiding premature opening of the door and gate.

As the car arrives at the upper terminal, brush 621 engages selector stationary contact 610. Thus, upon the reengagement of contacts H615 and AS616 as the car is brought to a stop, a circuit is completed for restoring coil PU613 of the up direction switch and for operating coil PD612 of the down direction switch. This causes reset of the up direction switch and the latching of the down direction switch in operated condition. Upon the latching of the down direction switch being effected, contacts PD611 are separated, breaking the circuit. Switches PU and PD are preferably mechanically interlocked, as by a walking beam. This insures the reset of switch PU before latch contacts PD611 separate. Discharge resistance 609 in shunt to coils PD612 and PU613 acts to absorb any arc incident to the separation of contacts PD611.

Upon the reset of the up direction switch PU, contacts PU92, PU195, PU216, PU281 and PU591 are separated and contacts PU123, PU134, PU150 and PU164 are engaged. Upon the operation of down direction switch PD, contacts PD110, PD201, PD217, PD280 and PD592 are engaged and contacts PD115, PD125, PD142 and PD155 are separated.

The separation of contacts PD611 also breaks the circuit for auxiliary direction switch coils PA603 and PB604 and for auxiliary up direction switch coil AU608. Auxiliary direction switch PA, upon dropping out, separates its contacts PA544 and reengages its contacts PA550. Auxiliary direction switch PB, upon dropping out, separates contacts PB526 and PB539 and reengages contacts PB525 and PB543. Auxiliary up direction switch AU, upon dropping out, separates its contacts AU377 and AU534.

Contacts PU92 and PD110 are for the purpose of insuring the dropping out of switch HG by the terminal stopping device switches at the terminals and permitting reoperation of switches H and HG to effect starting of the car in the opposite direction. Contacts PD115 and PU123, PD125 and PU134, PD142 and PU150, and PD155 and PU164 serve a similar purpose in connection with the operation of speed switches D, E, F and G at the terminals. The separation of contacts PU195 and subsequent engagement of contacts PD201 causes the deenergization and subsequent energization of car button magnet 193. This releases all pressed car buttons to open circuit condition and renders the magnet effective to maintain subsequently pressed car buttons in operated condition. The separation of contacts PB526, PB599 and PA544 opens the circuits to brushes 523, 515 and 514 respectively while the simultaneous engagement of contacts PB525, PB543 and PA550 prepares the circuits to brushes 519, 511 and 510 respectively. Inasmuch as brush 519 is in engagement with selector stationary contacts 388 with the car stopped at the upper terminal, the circuit for the down hall lantern at the tenth floor is transferred from up brush 523 to down brush 519 as a result of the operation of auxiliary direction switch PB.

It is to be noted that the circuit for the coils of the direction switches extends through contacts AS616 of the auxiliary speed relay. These contacts act to prevent the reversal of the direction of car travel if for any reason the advancer mechanism is in an advanced condition. Contacts AS579 of this relay act to prevent the starting of the car if the advancer mechanism is in an advanced condition.

The closing of the car gate and hatchway door and the starting of the car from the upper terminal are effected in a manner similar to that described for starting the car in the up direction. Movement of the car starting switch to full running position causes the retraction of the pawls, the operation of the advancer motor to advance the brushes, cam 508 and pawls and close selector switches 102, 57, 121, 131, 154 and 162, and the closing of the gate and door. The circuit for the brush advancer motor is through field winding 588, armature 589 and field winding 590 connected in parallel by contacts PD592. Thus, current is supplied to the advancer motor armature in a direction which is the reverse of the direction in which current was supplied thereto in starting the car in the up direction, so that the brushes are advanced downwardly instead of upwardly. Upon engagement of gate contacts 103 and door contacts 104, the circuit for the coils of switches H and HG is completed. Switch H causes the brake to be released and switch HG causes current to be supplied to generator field winding 255. The current through the field winding is reversed as a result of the operation of the direction switches PU and PD to cause contacts PU216 and PU281 to be separated and contacts PD217 and PD280 to be in engagement so that the car is started in the down direction. Otherwise the operation of the system to start and accelerate the car is the same as that previously described, the circuits for the coils of the speed switches being through back contacts of up direction switch PU instead of through the back contacts of down direction switch PD, and through contacts 124, 135, 151 and 165 of the terminal stopping switch instead of contacts 116, 126, 143 and 156.

The circuits illustrated for the advancer motor are for providing constant speed of the motor during the advancing operation. The field windings 588 and 590 act cumulatively, one being connected across the armature so that any increase in load on the motor, due to misalignment of selector contacts or otherwise, tending to decrease the speed of the motor, would, by a lowering of the counterelectromotive force of the motor, weaken the field winding subject thereto. This would counteract the tendency to decrease the speed of the motor, maintaining the speed substantially constant. The point at which the motor armature is connected to resistance 598 may be changed so as to adjust for the desired speeds for the different directions of rotation of the motor. The portion of this resistance used for each direction is connected in parallel with the motor armature and field winding in series with the armature, and any change in the value of this resistance, in conjunction with resistance 593, alters the voltage applied to the motor. For example, for down car travel, a decrease in the value of the portion of resistance 598 connected in parallel to field winding 588 and armature 589 decreases the voltage applied to the motor and thus causes it to run at a slower speed.

Stopping in response to down push buttons at the landings during downward car travel is effected in a manner similar to that in which stops are made in response to up push buttons during upward travel. Assume that, with the car positioned at the upper terminal, the down sixth floor hall button 292 is pressed. This completes a circuit for operating coil 310 of the down sixth floor relay. This relay latches contacts 346 in engagement and contacts 363 in separated condition. The engagement of contacts 346 renders selector stationary contacts 439 and 440 "alive".

Upon the engagement of contact 439 by brush 510 as the brushes are advanced in the down direction incident to the operation of starting the car from the upper terminal, a circuit is completed for neutralizing coil SM548 of the stop magnet. Thus, the pawls are released to permit the down pawl to engage the stopping lug for the sixth floor and contacts SM586 open to break the circuit for coil A585 of the first auxiliary stop relay. This relay acts through its contacts A594 to bring the advancer motor to a stop, through its contacts A541 to cause sufficient voltage to be applied to reset coil 328 of the down sixth floor relay to cause this relay to be reset, and through its contacts A524 to complete the circuit for lamp 446, lighting the down lantern at the sixth floor.

As the car continues its downward motion, down pawl 704 engages the lug for the sixth floor and cooperates therewith to cause the opening of the selector switches to slow down the car and finally bring it to a stop at the sixth floor. It is believed that the operations involved will be readily understood, from previously described slow down and stopping operations in the up direction, and need not be described in detail.

Response is had to car buttons during downward travel of the car in a manner similar to that in which response is had to car buttons during upward travel. The pressing of any car button renders the corresponding selector stationary contact in the column including contact 408 "alive". The engagement of "alive" car button stationary contacts by brush 507 causes the car in its downward travel to be slowed down and finally brought to a stop at the floor corresponding to the button pressed.

The door and gate opening operation during stops in the down direction is effected in the same manner as described for stops in the up direction.

The car is slowed down and stopped at the lower terminal in its downward travel by the action of terminal stopping switches 165, 151, 135, 124 and 111. The selector switches, as in the case of a stop at the upper terminal floor, are utilized to insure the slow down and stopping operation, selector contact 506 for the lower terminal being connected to the minus supply line. The opening of the door and gate at the first floor is effected in the same manner as this operation was effected at the upper terminal floor, the short-circuit for coil P56 being maintained by the engagement of brush 64 with stationary contact 71 until the car arrives at the desired point in relation to the first floor.

As the car arrives at the lower terminal, brush 621 engages stationary contact 620. Thus, upon the reengagement of contacts H615 and AS616, as the car is brought to a stop, a circuit is completed for restoring coil PD619 of the down direction switch and for operating coil PU618 of the up direction switch. This causes reset of the down direction switch and the latching of the up direction switch in operated condition. Resistance 622 acts to absorb any arc incident to the separation of contacts PU617. The operation of switches PU and PD just described places the direction controlling circuits in the same condition as originally described, with the car positioned at the first floor. The car button magnet 193 is deenergized and reenergized by the separation of contacts PD201 and the engagement of contacts PU195. This releases all pressed car push buttons and again renders the magnet effective to maintain subsequently pressed car buttons in operated condition.

The hall lantern 521 at the first floor is lighted upon the engagement of brush 519 with contact 520 and the dropping out of switch A. The operation of auxiliary direction switch PB incident to the change in the direction control circuits causes the circuit for this lamp to be transferred to contact 522 and brush 523 as the car arrives at the first floor by the separation of contacts PB525 and the engagement of contacts PB526.

Since the car buttons are maintained operated, once pressed, by car button magnet 193, the corresponding selector stationary contacts are maintained "alive" during this time. Thus, response is had to car buttons during travel of the car in either direction, in the natural order of floors, regardless of the order in which the buttons are pressed. Also, response is had to each car button pressed during a run from one terminal to another, so long as brush 507 has not passed the selector stationary contact to which the button is connected at the time that the button is pressed. The hall buttons, once pressed, cause the operation of corresponding floor relays. Since these relays are latched in operated condition, the corresponding selector stationary contacts are maintained "alive" until the relays are reset, i. e., until the call is answered. With this arrangement, stops are made in the natural order of floors regardless of the order in which the hall buttons are pressed. Also, the call is answered upon the next approach of the car to the landing at which the button is located, travelling in the direction corresponding to the button pressed, so long as the selector brushes have not passed the corresponding selector stationary contacts for the floor at which the button is located at the time the button is pressed. As distinguished from car button operation, the selector stationary contacts controlled by the hall buttons are not rendered "dead" at the terminals, so that the call is ultimately responded to.

In the description up to this point, it has been assumed that the car ran to the terminals before reversing. The system is arranged, however, so that with service switch 373 closed and with the direction controlling mechanism set for up car travel, the direction of car travel is reversed automatically at any floor under conditions where, at the time circuits are set up which cause the car to be slowed down and brought to a stop at that floor, no push buttons are pressed which require further travel in the up direction. This also involves stopping the car in its upward travel in response to a down hall button under conditions where no push buttons for floors above or the up push button at that floor are operated at the time the circuits are set up for causing the car to be slowed down and stopped at the floor at which the down button is located.

The highest operated push button may be a car button, an up hall button or a down hall button. While an up push button may be the highest one pressed, it also indicates that the prospective passenger desires to be carried in the up direction. Under such conditions the direction controlling mechanism remains set for up car travel in answering this button so that the car is started in the up direction after taking on the passenger who pressed the button. In case of a car button or down hall button, however, there is no indication for further travel in the up direction. The pressing of a down hall button indicates a desire to be carried in the down direction while the pressing of a car button indicates no further use of the car after the button has been answered. Therefore, in case the highest operated push button is a car button or a down hall button at the time the circuits are initially set up for answering the button, the direction controlling mechanism is operated automatically to change the direction of car travel to down when the car is brought to a stop.

In the arrangement of circuits illustrated, these operations are accomplished principally by the selector brush switches 395—494 and operating insulated cam 508, selector contacts 387—518 and cooperating brush 517, back contacts of the floor relays, and circuits and switches controlled thereby. The floor brush switches are connected in series and are controlled individually by the car buttons to control the energization of topmost car call relay TC. The back contacts of the floor relays are also arranged in series relation from the back contacts of the down second floor relay, through the back contacts of the up second floor relay, and likewise through those of the floor relays for each succeeding floor above in the same sequence, the back contacts of the upper terminal floor relay being connected to the negative line. Connections are taken off between the back contacts of the down and up floor relays for each floor and led to a stationary contact on the selector for that floor in the column of contacts engaged by brush 517. This arrangement controls the energization of the topmost hall call relay TH.

The operation of the system to automatically reverse the direction of car travel at intermediate floors will now be described. Assume the car positioned at the ground floor with service switch 373 closed. While the car is standing at the ground floor switch AU is operated, causing its contacts AU377 and AU534 to be in engagement. If no hall push button is operated, all floor relay back contacts are in engagement so that contacts AU534 complete a circuit for coil TH536 of the topmost hall call relay. This circuit is through brush 517 and contact 518 of the selector and back contacts 355—372 of the floor relays. Relay TH, upon operation, separates its contacts TH378 so that the engagement of contacts AU377 only prepares the circuit for lamp 379. The engagement of contacts TH531 prepares the circuit for coil AR529 of the automatic reversal relay.

Assume now that the down seventh floor hall button 294 is pressed and that no other push buttons are operated. The pressing of this button completes the circuit for coil 312 of the down seventh floor relay, which latches its contacts 348 in engagement, and its contacts 366 in separated condition. The separation of contacts 366 breaks the circuit for coil TH536, which drops out to reengage its contacts TH378, completing a circuit for lamp 379 in the elevator car. This lamp is for advising the attendant as to the direction of car travel. So long as the lamp stays lighted the car will start from any intermediate floor in the up direction.

The car is started as before by moving the starting switch in the car to full operated position. Selector switch 607 closes as a result of the operation of the advancer mechanism, this switch being operated by insulated cam 508 which operates the floor brush switches in the circuit for the coil of topmost car call relay TC. The switch is engaged by the cam causing the switch to be open while the car is idle at the first floor. As the advancer mechanism operates in starting, the cam is moved upwardly, disengaging the switch and permitting it to close. The closing of switch 607 completes the circuit for coil UL606 of the up indicator light relay. Relay UL engages contacts UL375 to by-pass contacts TH378 in the circuit for lamp 379. It also engages contacts UL528 in the circuit for coil AR529 of the automatic reversal relay.

When brush 517 engages selector stationary contact 429, a circuit is reestablished through back contacts 367—372 of the floor relays for coil TH536 of the topmost hall call relay. This relay engages contacts TH531, completing a circuit for coil AR529 of the automatic reversal relay. Relay AR, upon operation, engages contacts AR527 to establish a self-holding circuit and also engages contacts AR551 and AR614 and separates contacts AR602. The separation of contacts AR602 breaks the circuit for coils PA603 and PB604 of the auxiliary direction relays, these relays dropping out to separate contacts PA544, PB539 and PB526 and to engage contacts PA550, PB543 and PB525. The engagement of contacts AR551 completes the circuit for neutralizing coil SM548 of the stop magnet, which causes the dropping out of first auxiliary stopping relay A and releases the pawls to permit the engagement of the stopping collar for the seventh floor by the up pawl 705. Brush 517 is set sufficiently ahead of brushes 514 and 515 to insure the release of the pawls in time for the up pawl to engage the proper stopping collar.

Relay A, upon dropping out, separates contacts A594 to deenergize the brush advancer motor. It also engages contacts A541, completing a circuit through contacts PB543, brush 511, selector contact 426 and contacts 348 for reset coil 330 of the down seventh floor relay to restore the relay to reset condition. It also engages contacts A524, completing the circuit through contacts PB525 for lamp 432, lighting the down hall lantern at the seventh floor.

Continued movement of the car after the up pawl has engaged the seventh floor stopping collar causes the car to be slowed down and finally brought to a stop at the seventh floor landing. Owing to the engagement of contacts AR614, a circuit is established for the operating coil PD 612 of the down direction switch and reset coil PU613 of the up direction switch, upon the reengagement of contacts H615 as the car comes to rest, to cause the operation of these switches to reverse the direction of car travel. The separation of contacts PD611 of the down direction switch, incident to the change in the direction controlled circuits, breaks the circuit for coil UL606 of the up indicator light relay. Relay UL separates its contacts UL528 to deenergize coil AR529, causing the automatic reversal relay to drop out. Relay UL also separates its contacts UL375, breaking the circuit for the direction indicating lamp 379 in the car. This advises the car attendant that the car is now set for travel in the down direction. The car is started in the down direction in response to movement of the starting switch in the car to full start position because contacts PD280 and PD217 are in engagement, causing the direction of current flow in field winding 255 to be such as to cause the car to run in the down direction.

Assume that the button pressed while the car is idle at the first floor is a car button instead of a down hall button; that is, assume, for example, that the seventh floor car button 422 is pressed and that no other push buttons are operated. With no hall push buttons operated, the topmost hall call relay TH is operated, engaging its contacts TH531 and separating its contacts TH378. Each of the car buttons is connected through its floor brush switch and the floor brush switches for floors above to the coil of topmost car call relay TC so that the pressing of car button 422 not only renders selector stationary contact 423 "alive" but also completes a circuit through selector switches 424, 410 and 395 for topmost car call relay coil TC553. This relay operates to engage contacts TC380 and separate contacts TC530. Contacts TC530 are in the circuit for coil AR529 of the automatic reversal relay, their separation preventing the energization of this coil as a result of the closing of selector switch 607 and contacts AS533 during the operation of the advancer mechanism in starting the car from the first floor. The engagement of contacts TC380 completes a circuit for lamp 379 in the elevator car, advising the attendant of the direction of car travel.

The car is started as before by moving the starting switch in the car to full operated position. Relay UL operates to establish a by-pass circuit for lamp 379. When insulated cam 508 engages and opens selector brush switch 424 for the seventh floor, the circuit for coil TC553 of the topmost car call relay is broken. This relay drops out to reengage its contacts TC530. The topmost hall call relay TH is operated intermittently as brush 517 engages each of its cooperating stationary contacts during upward movement of the brush. Thus, this relay is operated to engage its contacts TH531 upon the engagement of brush 517 with seventh floor contact 429. This occurs at the same time that relay TC is dropped out so that the engagement of contacts TC530 completes a circuit for the coil of the automatic reversal relay AR. Relay AR operates as previously described to cause the dropping out of auxiliary direction switches PA and PB and the completion of the circuit for the neutralizing coil of stop magnet SM. The stop magnet acts to drop out auxiliary stopping relay A and release the pawls. Relay A deenergizes the brush advancer motor and completes the circuit for lamp 432, lighting the down hall lantern at the seventh floor.

Continued movement of the car after the engagement of up pawl 705 with seventh floor stopping lug causes the car to be slowed down and finally brought to a stop at the seventh floor landing. Owing to the engagement of contacts AR614 of the automatic reversal relay, the direction switches PU and PD are operated upon the reengagement of contacts H615 as the car comes to rest to establish the direction circuits for down car travel. The direction indicating lamp 379 is extinguished by the separation of contacts UL375 incident to the reversal of the direction of car travel, advising the car attendant that the direction controlling mechanism is now set for down car travel.

Assume the button pressed while the car is idle at the first floor to be an up hall button instead of a car button or a down hall button. Assume that the up hall button 297 at the eighth floor is the one pressed and that no other push buttons are operated.

The pressing of this button energizes coil 315 of the up eighth floor relay, which latches its contacts 351 in engagement and its contacts 369 in separated condition. The separation of contacts 369 breaks the circuit for coil TH536, which completes the circuit for lamp 379 as before. When the car has been started in the up direction and brush 517 engages selector stationary contact 415 for the eighth floor, the circuit for coil TH536 of the topmost hall call relay is not reestablished, owing to the fact that contacts 369 still maintain this circuit open. However, the engagement of brushes 514, 515 and 523 with contacts 413, 414 and 420 causes the up eighth floor hall lantern 419 to be lighted, the up eighth floor relay to be reset, and the car to be slowed down and brought to a stop at the eighth floor landing.

When the up eighth floor relay is reset, its contacts 369 reengage and complete a circuit for coil TH536 of the topmost hall call relay. Relay TH engages its contacts TH531, but this does not complete the circuit for coil AR529 of the automatic reversal relay as the reset of the up eighth floor relay to cause the operation of relay TH was effected by the dropping out of auxiliary stopping relay A which, when it dropped out, separated its contacts A532 and thus prevented the energization of coil AR529 by the engagement of contacts TH531. The separation of contacts TH378 does not break the circuit for lamp 379 in the car as this lamp is maintained lighted by contacts UL375. Thus the car attendant is advised that the direction controlling mechanism is still set for travel in the up direction.

Assume that the intending passenger at the eighth floor who pressed the up eighth floor hall button is taken into the car and advises the car attendant that he desires to be carried to the ninth floor. The car attendant therefore presses the ninth floor car button 393, which causes the energization of coil TC553 of the topmost car call relay. Relay TC engages contacts TC380 paralleling contacts UL375 in the circuit for lamp 379, and separates its contacts TC530 in the circuit for coil AR529 of the automatic reversal relay.

Movement of the starting switch to full operated position causes operation of the brush advancer motor to advance the brushes and cam 508 in the up direction. The engagement of cam 508 with selector switch 395 breaks the circuit for coil TC553, which completes the circuit for coil AR529 of the automatic reversal relay. This relay operates, as previously described, to cause the dropping out of auxiliary direction relays PA and PB and the completion of the circuit for the neutralizing coil of stop magnet SM. The stop magnet acts to drop out auxiliary stop relay A and release the pawls. Relay A deenergizes the brush advancer motor and completes a circuit for lamp 403, lighting the down hall lantern at the ninth floor. Up pawl 705 being extended for cooperation with the ninth floor stopping collar, causes the car, after being started, to be slowed down and brought to a stop at the ninth floor landing. When the car is brought to a stop, the direction switches are operated to reverse the direction of car travel. The direction indicating lamp 379 is extinguished by the operation of contacts UL375 incident to the reversal of the direction of car travel, advising the car attendant that the direction controlling mechanism is now set for down car travel.

In case an up hall button is pressed at the highest floor for which a push button is operated, the direction controlling mechanism is maintained set for up car travel even though a car button or down hall button for that floor is also pressed. This is due to the fact that contacts A532 separate before contacts TH531 engage. However, the direction controlling mechanism is operated to reverse the direction of car travel when both the car button and the down hall button are pressed at a floor for which circuits have been set up to cause a stop to be made in case no push buttons are pressed for any floor above. Both contacts TC530 and TH531 must be in engagement at the same time in order for automatic reversal to take place, and, in case of contacts TH531, they must be reengaged before contacts A532 separate.

It is believed that it will be seen from the above description that where several up hall buttons or car buttons or both have been pressed, the car will continue to travel in the up direction until all of these push buttons have been responded to and that, in case the push button pressed at the last floor at which a stop is made is an up push button, the car will remain set for up car travel when it arrives at the floor at which the highest operated up hall button has been pressed.

There is a remote possibility that the person who presses the highest of the operated uphall buttons changes his mind, and does not desire to use the car. There is no way that this can be ascertained either by the car attendant or by the automatic mechanism which controls the operation of the elevator car. Therefore, the up hall lantern at the particular floor is lighted in the usual manner and the direction indicating light in the car remains lighted, advising the car attendant that the car is still set for up car travel. It is desirable that the car should leave the floor in the up direction under such conditions, since, as there is no way for the automatic controlling mechanism to register the change in intentions of the intending passenger, the car attendant would be unable to tell from the direction indicating light whether this light is lighted as a result of the registration of the call at that floor or as a result of the registration of a call for a floor above. With no calls above, however, the car is caused to slow down and stop at the next landing before its direction of travel is reversed.

In order that this may be more clearly understood, assume that the intending passenger who pressed the up eighth floor hall button in the example of operation previously assumed changes his mind and does not desire to use the car. Assume further that he has left the corridor so that there is no passenger to be taken into the car at the eighth floor when the stop is made. Confronted with this condition, the operator can only move the car switch to start position again to restart the car. The topmost hall call relay TH can be in operated condition only at a time that brush 517 is in engagement with one of its cooperating stationary contacts. The advancer mechanism causes this brush to leave the stationary contact for the floor at which the car is stopped before the operation of auxiliary speed relay AS in the starting operation. This prevents the operation of automatic reversal relay AR before the engagement of brush 517 with the stationary contact for the next floor above. Thus, in the above example with the car stopped at the eighth floor, brush 517 leaves contact 415 before the engagement of contacts AS533, causing the dropping out of relay TH to separate contacts TH531 and thereby prevent the energization of coil AR529. Upon the engagement of brush 517 with the ninth floor contact 400, relay TH is again operated, completing a circuit for coil AR529. The automatic reversal relay thereupon operates to cause the lighting of the down hall lantern at the ninth floor, the slowing down and stopping of the car at the ninth floor and the reversal of the direction of car travel. Thus, under the abnormal conditions assumed, the car stops at the next possible floor and sets its direction controlling mechanism for the opposite direction of car travel.

In the case where a down hall button has been pressed, the car stops to answer up hall buttons at floors intervening the floor from which the car started and the one at which the down button is located, and to discharge passengers at such intervening floors in response to car buttons, but does not stop at such intervening floors in response to down hall buttons. A stop is made in response to a down hall button when no buttons for floors beyond have been pressed by the action of selector brush 517 and cooperating contacts and the floor relay back contacts above the contacts of the floor relay for the operated down hall button in completing a circuit for the coil of topmost hall call relay TH. Should any hall button, for a floor above the one at which an operated down hall button is located, be operated or should the up hall button at the floor at which such down hall button is located be operated, the circuit for coil TH536 is not completed when brush 517 engages the selector stationary contact for that floor. In case a car button is pressed for a floor above, the topmost car call relay is operated, preventing the operation of relay AR in response to the engagement of contacts TH531, thereby preventing the slowing down and stopping of the car in response to the down hall button. All down hall buttons that are not responded to during up car travel are answered during down car travel as their floor relays are not reset and maintain their corresponding selector stationary contacts "alive" until the buttons are responded to.

Car button 381 for the upper terminal does not control the effectiveness of selector contact 382, being employed to maintain, when pressed, coil TC553 energized. It is to be noted that a car button, when pressed, not only renders the corresponding selector stationary contact "alive", but also renders other car button selector stationary contacts "alive" through selector switches 395—494. However, these other contacts, so rendered "alive", do not cause stopping of the car upon being engaged by brush 507. Assume, for example, that the car is positioned at the lower terminal and that the sixth floor car button 436 is pressed. This renders not only selector contact 437 "alive" but also the selector contacts for the second, third, fourth, fifth, seventh, eighth and ninth floors "alive". As the advancer mechanism advances the brushes, it also advances cam 508, which engages and opens selector switch 494 before the engagement of brush 507 with stationary contact 493 occurs, and maintains this switch open so long as brush 507 is in engagement with this contact. Thus, contact 493 is "dead" while engaged by brush 507, so that no false operation is obtained. The same operation is had with respect to selector car button stationary contacts for the third, fourth and fifth floors, switches 480, 466 and 452 being engaged by cam 508 before the engagement of the corresponding stationary contacts by brush 507 occurs. The opening of selector switch 438, however, has no effect on stationary contact 437, under the assumed conditions, so that the car is caused to slow down and stop at the sixth floor in response to the sixth floor car button 436. Cam 508 is of such length and is so positioned as to maintain the floor brush switch for any floor open until after brush 507, during upward travel, has left the stationary contact for the floor above. This prevents, for example under the assumed conditions, the rendering of selector contacts 423, 408 and 394 "alive" by the sixth floor car button 436 at the time that they are engaged by brush 507. Switch 438 being held open until after brush 507 disengages contact 423, renders this contact "dead" while engaged by the brush, thereby preventing a false stop. Contacts 408 and 394 are rendered "dead" in a like manner by switches 424 and 410 respectively.

Floor brush switch 607 is positioned so as to be opened by insulated cam 508 when the car is at the main floor and also so that the cam passes off the switch to permit it to reclose during the advance of the cam by the advancer mechanism, as pointed out hereinbefore. The point at which the cam leaves the switch is selected so as to permit the energization of the automatic reversal relay at the proper time to effect slow down and stop of the car at the second floor and reversal of its direction of travel when conditions exist for effecting reversal at the second floor. The purpose of switch 607 and up indicator light relay UL controlled thereby is principally to prevent the operation of the automatic reversal relay to cause the direction controlling mechanism to operate to change the direction of car travel as the car comes from the basement to the main floor. Relay UL also serves to maintain the pilot light 379 in the car lighted after the reset of the floor relay in answering a highest up call.

The automatic reversal feature may be cut out by opening service switch 373. This opens the feed to the series circuit of floor relay back contacts and thereby prevents the operation of the topmost hall call relay TH at any time. Inasmuch as the automatic reversal relay AR cannot operate to reverse the direction of travel of the car until relay TH is operated, the car cannot be reversed automatically except at terminals. Therefore, with service switch 373 open, the car, once started in the up direction from the ground floor, must make a complete trip to the upper terminal before reversal is automatically effected. The direction switches PU and PD may be manually controlled as by means of switch 623 to reverse the direction of car travel at any floor, if desired. Service switch 373 is preferably a snap switch arranged on the dispatcher's panel.

The car may be caused to run non-stop with respect to operated hall buttons by pressing either the non-stop switch 566 in the car or non-stop switch 567 at the dispatcher's station where a plurality of elevators are operated in a group and a dispatcher's panel is provided. For example, when the car becomes fully loaded and the attendant desires to prevent the taking on of more passengers until room is again provided in the car as a result of discharge of passengers, he may do so by opening the non-stop switch 566 in the car. This deenergizes coil NS564 of the non-stop relay and coil ANS565 of the auxiliary non-stop relay. Relay NS separates contacts NS392, NS540 and NS545 and relay ANS separates contacts ANS535 and engages contacts ANS537. The separation of contacts NS540 and NS545 prevents the establishment of circuits by brushes 510, 511, 514 and 515, thereby preventing response of the car to hall buttons.

The separation of contacts NS392 prevents the lighting of the hall lanterns. Although it is preferred to prevent the lighting of hall lanterns at floors under non-stop operation, it may be desirable to permit the lighting of these lanterns under conditions where the car under non-stop operation is stopped in response to a car button. This may be done by omitting contacts NS392. With contacts NS392 omitted, the hall lantern for the floor at which a stop is made in response to a car button is lighted so that if any intending passengers are waiting to be carried in the direction in which the car is travelling, they may be taken on to replace the passengers discharged.

The purpose of the auxiliary non-stop relay ANS is served under conditions where service switch 373 is closed to render the automatic reversal mechanism effective. Contacts ANS535 serve to prevent the intermittent operation of the topmost hall call relay TH during up car travel when no hall buttons are operated for floors above a point in the hatchway corresponding to the position of brush 517. Contacts ANS537 serve to permit reversal of the car at the next floor whose floor brush switch is engaged by cam 508 under conditions where no car buttons for floors above that floor are pressed at the time the non-stop switch is operated. These contacts also serve to permit reversal of the car at the highest floor for which a car button is pressed under non-stop operating conditions.

The non-stop relays, upon dropping out, do not prevent response of the car to the car buttons. Slow-downs are made in response to these buttons in the manner previously described. Furthermore, in the case of hall buttons, the selector stationary contacts are maintained "alive" so that the call is ultimately responded to.

In reviewing the operation of the control system, passengers upon entering the car call out their desired destinations, which are registered by the car attendant by pressing car buttons for the floors announced. The attendant closes the door and gate and starts the car by moving the starting switch to the start position. The advancer mechanism starts the advancing operation immediately, which is completed preferably before the door and gate reach closed positions. That is, upon movement of the starting switch to start position, the stop magnet is energized to retract the pawls and to effect the energization of the advancer motor, which acts to advance the carriage with its pawls and brushes until brought to a stop. At the same time the selector switches are operated, the member operated being dependent upon the amount of advance. When the door and gate are closed, the car starts, the starting switch being released after the car attains a certain speed.

The car is caused to slow down and stop at the first floor for which the advance car button brush engages an "alive" selector contact or the advance hall button brush for the direction of car travel engages an "alive" selector contact. This may occur while the car is stationary or in motion, i. e., while the brushes are being advanced or while they are being moved along with the crosshead in accordance with movement of the car. This causes the pawls to be released and the one for the direction in which the car is travelling engages a stop as the crosshead continues its movement, in the event the car is in motion, or as movement of the crosshead takes place in the event an "alive" contact is engaged during the advance, bringing the carriage to a stop. Continued movement of the crosshead takes up the advance of the carriage and in doing so restores the selector switches that were operated to their former condition. The restoration of the selector switches begins as the car arrives at a certain distance from the floor for which the "alive" contact is provided, determined by the amount of advance of the carriage, and is effected in succession as the car arrives at decreasing distances from the landing. The restoration of the selector switches causes the car to be slowed down and finally brought to a stop at the landing. The car gate and hatchway door for that floor are opened automatically, in response to the restoration of one of the selector switches as the stop is made, permitting the passenger transfer to be made immediately the car comes to a stop.

The hall lantern at that floor for the direction in which the car is travelling is lighted immediately the engagement of the brush with the "alive" contacts occurs, thus providing maximum duration of the period during which intending passengers at the floor are advised of the approach to and presence of the car at the floor, and its direction of travel.

Immediately the transfer of passengers has been completed, the attendant operates the starting switch. This causes the operation of the advancer mechanism and the closure of the car gate and hatchway door. Upon the door and gate reaching closed position, the car is restarted. The lighted hall lantern is extinguished immediately the starting switch is operated, without waiting on the closure of the door and gate. This eliminates the attraction of intending passengers to the car after the starting switch has been operated.

Assuming that the car is set for up travel and that service switch 373 is open, the car continues its travel in the up direction after each stop until the upper terminal floor is reached. Car buttons for succeeding floors and up hall buttons for succeeding floors, if operated before the selector brushes disengage the corresponding stationary contacts, cause the car to be stopped, during the trip, at the floors for which the buttons are provided. The car gate and hatchway door at the floor open automatically upon each stop and the proper hall lantern is lighted as soon as the call is "picked up".

As the car nears the upper terminal, it is slowed down automatically and finally brought to a stop. The gate and hatchway door at the terminal floor open automatically and the terminal floor down hall lantern is lighted. Also, the car is set for travel in the down direction so that, upon the starting switch being operated and the gate and door closed, the car is started in the down direction. Car buttons and unanswered down hall buttons are responded to during the trip of the car to the lower terminal floor.

Where a plurality of elevators are operated in a group, the power and control circuits for each additional elevator may be identical with those illustrated and described. The hall buttons and their floor relays are common to all the elevators. The circuits through the making contacts of the floor relays are illustrated as leading to bus bars from where they are taken off in branch circuits to the selector machines of the various elevators, as illustrated in Figure 24b for one elevator. These bus bars have been characterized generally in accordance with the floor which is involved. For example, UH7 indicates that the bar is in the up hall button floor relay circuit for the seventh floor. The breaking contacts of the floor relays are also illustrated as connected to bus bars, the connections being taken off the series circuit containing these back contacts between the back contacts of the up and down floor relays for each floor. The bus bars to which these connections extend are designated numerically as to floors and by the letter R to indicate that they are in the automatic reversal circuits. Connections are taken off the reversal bus bars in branch circuits to the selector machines of the elevators of the group as illustrated in Figure 24b for one elevator. The car buttons are individual to their respective elevator cars and operate independently of the car buttons in any other car. Each elevator has one up and one down hall lantern at each intermediate floor, a down hall lantern at the top floor and an up hall lantern at the first floor.

The hall buttons, their floor relays and connected circuits being common to all of the elevators in the group, a call registered by the pressing of a hall button may be answered by any one of the cars. The car which answers a call registered by a hall button is selected automatically in accordance with the effective positions of the cars, i. e., the relative positions of the advancer brushes of the different elevators, and the direction of travel of the cars. Due to the immediate reset of the floor relay, only one car can respond to the call and only the hall lantern for the car which is selected to answer the call is lighted. This not only eliminates false or duplicate stops but also provides a maximum duration of hall signal without false or duplicate indication.

When the hall button is answered, the registration of another call by this button is prevented until after the starting switch has been operated to restart the car, preventing later false stops. This is due to the reset brush of the car which is answering the button remaining in contact with the selector contact, thereby maintaining the reset coil of the floor relay energized so long as the button is pressed. This prevents the latching of the relay in operated condition and it falls out as soon as the button is released.

The floors are served in their natural order, regardless of the order in which the buttons were pressed. If a hall button is pressed after a car in effect has passed the floor at which the button is located, i. e., after the disengagement of the selector stationary contact controlled by the hall button by its brush, with the car set for a direction of travel corresponding to that of the button pressed, the call registered by the button is reserved for the next car set for the corresponding direction of car travel in effect to reach its slow down point for that floor, i. e., whose selector stationary contact controlled by the hall button is engaged by its brush. However, if circuits have been set up to cause the car to stop at a floor in response to its car button for that floor, the pressing of the hall button for the direction of travel for which the car is set after the circuits controlled by the car button for causing the slow down have been established, a call is not registered by the hall button as conditions are such that a stop is being made which will satisfy this pressing of the hall button. If the pressing of the hall button is delayed until after the attendant operates the starting switch, the reset coil of the floor relay is not energized and the call is registered and reserved for the next car set for the corresponding direction of car travel whose brush engages the stationary contact rendered "alive" by the floor relay.

The elevators may be changed from terminal-to-terminal operation to operation whereby the direction of travel of any car set for up car travel is reversed automatically when, at the time that circuits are set up to cause the car to be slowed down and brought to a stop at a floor, no push buttons are pressed which require or indicate further travel of that car in the up direction from that floor. This is done by opening switch 373. Under these conditions a car may stop in its upward travel in response to a down hall button at the floor at which the button is located, provided no buttons have been pressed requiring further travel of the car in the up direction. When circuits are set up to cause a car to respond to the highest call, each of the other cars set for up car travel is reversed at the next floor for which brush 517 therefor engages a stationary contact, provided no push button for a floor between the point corresponding to the position of the brush and the floor for which the highest call exists remains to be responded to at the time the engagement occurs. If such push button is pressed, all cars whose brushes 517 are below the selector stationary contacts for that button are caused to continue their upward travel until circuits are set up for one of them to answer the call. Each car will go to the highest floor for which a car button in the car is pressed, regardless of the hall buttons operated.

The system of control above described is adapted for any installation in which attendants are provided in the elevator cars. The automatic reversal feature is particularly useful for installations in hotels, those in department stores, wherein the traffic is mostly between a lower group of floors, and for night service. It is also useful for office buildings, particularly under certain conditions. Any elevator of a group which is arranged for automatic reversal may be used for night service. It is preferred, for night service, to arrange the system so that an audible signal is given whenever a hall button is pressed. A night bell relay has been shown for this purpose, its coil NB262 being illustrated as in a circuit common to the hall buttons. Thus, when any hall button is pressed, this relay is operated and completes the circuit to a suitable form of audible signal, advising the night operator that service is required. The pilot light 379 serves during night operation to advise the operator upon return of the car to the ground floor whether calls are registered which have not been responded to.

It is contemplated that many of the features of the invention disclosed may be used in connection with apparatus and circuits different from those specifically described and also in connection with other forms of elevator control.

Certain of the features are applicable to systems of control in which the starting as well as the stopping of the cars is controlled by the push buttons in the car and at the landings. Also, certain of the features are applicable to arrangements in which the stopping of the cars to discharge passengers is controlled by the attendants' start control switches in the cars or in which stops both to discharge and receive passengers are controlled in this manner.

The start control switch may be employed to effect the final stopping operation after the automatic slow down in response to a push button. This switch may be arranged so that it must be moved to one position to start the car in the up direction and to another position to start the car in the down direction, with the service conditions also exercising control over the direction in which the car can be started. Also, the direction of travel may be determined solely by the position to which the switch is moved, and the attendant may be advised as to the proper direction of travel as by signal. The operation of the doors may be controlled by a switch solely for that purpose. The doors may be manually operated if desired.

The manner of controlling the operation of the hall lanterns may be varied. The cars may be express or local cars. If the cars are express cars, the predetermined landing to which the cars may be made to travel may be the first landing of the local zone.

Various alterations in the control of the hoisting motor may be made. The power supply may be either from direct current or alternating current supply mains. The manner in which the motor is accelerated or retarded may be varied. The operation of the advancer mechanism may be delayed so as to control the rate of acceleration by the selector switches 102, 57, 121, 131, 154 and 162 instead of electrically, or it may be started at the same time the car is started but advanced rapidly with the time of operation of the speed switches controlled by other means.

The construction and operation of the selector machine may be varied. Various features of this machine may be used separately from other features thereof. Floor relays maintained operated electrically may be used instead of those mechanically held in operated condition, or the hall buttons themselves may be automatically held in operated condition. The system of control and mechanism disclosed are very complex and admit of many variations in addition to those mentioned which do not depart from the spirit or scope of the invention. Many apparently widely different embodiments of the invention can be made within the scope of the invention. It is therefore intended that all matter contained in the above description or shown in the accompanying drawings shall be interpreted as illustrative and not in a limiting sense.

What is claimed is:

1. In combination; an elevator car movable in a hatchway to serve a plurality of landings; a plurality of circuit controlling means, one for each of said landings; means common to said circuit controlling means and adapted upon relative movement with respect thereto to cooperate therewith individually in succession; means for causing relative movement of said common means and said circuit controlling means in accordance with movement of the car; and means for causing advance relative movement of said common means and said circuit controlling means in effecting the starting of the car prior to said relative movement thereof in accordance with car movement, said relative movement thereof in accordance with car movement being effected with said common means and said circuit controlling means in their relatively advanced condition.

2. In combination; an elevator car; a plurality of landings served by the car; car actuating and stopping mechanism; means for causing operation of said mechanism to start the car; a plurality of circuits, one for each of said landings; a plurality of controls, one for each of said landings, each control being adapted upon operation to prepare the circuit for the landing for which the control is provided; control switching means for the car comprising, a plurality of circuit controlling means, one in each of said circuits, means common to said circuit controlling means adapted upon being moved to successively cooperate therewith to effect the completion of the circuits which have been prepared, means for moving said common means in accordance with movement of the car, and means for initially advancing said common means with respect to said moving means in effecting the starting of the car; and means responsive to the completion of any circuit for bringing said common means to a stop, movement of said movable means taking up the advance of said common means to restore it to its former condition with respect to said movable means.

3. In combination; an elevator car; a plurality of landings served by the car; car actuating and stopping mechanism; manually operable start control means for the car; means responsive to said start control means for causing operation of said mechanism to start the car; control switching means for the car comprising, a plurality of spaced stationary contacts, one for each of said landings, a contact common to said stationary contacts and movable to engage the same in succession, movable means, means for moving said movable means in accordance with movement of the car, supporting means for said common contact mounted on said movable means for relative movement with respect thereto in the direction in which said movable means is movable by said moving means, and means responsive to the operation of said start control means to effect the starting of the car for moving said supporting means from an initial position with respect to said movable means to advance said supporting means with respect to said movable means; a plurality of controls, one for each of said landings; and means responsive to the engagement of said common contact with the stationary contact for any landing for which a control is operated for bringing said supporting means to a stop, thereby to cause said supporting means to be restored to its initial position with respect to said movable means by movement of said movable means.

4. In combination; an elevator car; a plurality of landings served by the car; car actuating and stopping mechanism; manually operable start control means for the car; means responsive to said start control means for causing operation of said mechanism to start the car; control switching means for the car comprising, a plurality of spaced stationary contacts, one for each of said landings, a contact common to said stationary contacts adapted for movement with respect to said stationary contacts and to engage the same individually during such movement, movable means, supporting means for said common contact mounted on said movable means for relative movement with respect thereto, means responsive to the operation of said start control means to effect the starting of the car for moving said supporting means from an initial position with respect to said movable means to advance said supporting means a predetermined amount with respect to said movable means prior to the starting of the car, and means for moving said movable means, with said supporting means in its advanced condition, in accordance with movement of the car as soon as the car starts; a plurality of controls, one for each of said landings; and means responsive to the engagement of said common contact, either during the initial advance of said supporting means or its subsequent movement along with said movable means in accordance with movement of the car, with the stationary contact for any landing for which a control is operated for bringing said supporting means to a stop in the position to which it has moved either during its initial advance of its subsequent movement in accordance with movement of the car, continued movement of said movable means in the event the car has been started or movement of said movable means upon starting of the car restoring said supporting means to its initial position with respect to said movable means.

5. In combination; an elevator car; a plurality of landings served by the car; car actuating and stopping mechanism; manually operable start control means for the car; means responsive to said start control means for causing operation of said mechanism to start the car; a plurality of circuits, one for each of said landings; control switching means for the car comprising, a plurality of spaced stationary contacts, one in each of said circuits, a contact common to said stationary contacts adapted upon being moved to engage said stationary contacts individually, movable means, supporting means for said common contact mounted on said movable means for relative movement with respect thereto in the direction of movement thereof, means responsive to the operation of said start control means to effect the starting of the car for moving said supporting means from an initial position with respect to said movable means to advance said supporting means a predetermined amount with respect to said movable means prior to the starting of the car, and means for moving said movable means, with said supporting means in its advanced condition, in accordance with movement of the car as soon as the car starts; a plurality of controls, one for each of said landings, each control being adapted upon operation to prepare the circuit for the landing for which it is provided, said common contact upon engagement, either during the initial advance of said supporting means or its subsequent movement along with said movable means in accordance with movement of the car, with the stationary contact in any circuit which is prepared, completing that circuit; and means responsive to the completion of any circuit for bringing said supporting means to a stop in the position to which it has moved either during its initial advance or its subsequent movement in accordance with movement of the car, thereby to cause said supporting means to be restored to its initial position with respect to said movable means by continued movement of said movable means in the event the car has been started or as a result of movement of said movable means upon starting of the car.

6. In combination; an elevator car; a plurality of landings served by the car; a source of current supply; car actuating and stopping mechanism; a manually operable start control in the car; means responsive to operation of said start control for causing operation of said mechanism to start the car; a plurality of circuits, one for each of said landings; control switching mechanism for the car comprising, a plurality of spaced stationary contacts, one for each of said landings, each circuit being connected to the contact for the landing for which the circuit is provided, a contact common to said stationary contacts adapted for movement with respect thereto and to engage the same individually during such movement, a crosshead, means for moving said crosshead, a support for said movable contact mounted on said crosshead for relative movement with respect thereto in the direction of movement thereof, stopping means for limiting the amount of movement of said support with respect to said crosshead, and an electric motor carried by said crosshead connected to said support to move the same with respect to said crosshead; means responsive to the operation of said start control for connecting said motor to said source prior to the operation of said starting means to cause the starting of the car, said motor upon thus being energized acting to move said support with respect to said crosshead until brought to a stop, thereby advancing said support with respect to said crosshead before the car starts; means connected to the car for driving said crosshead moving means, thereby to move said crosshead in accordance with movement of the car; a plurality of controls, one for each of said landings, each control being adapted upon operation to connect the circuit for the landing for which it is provided to one side of said source; a circuit connecting said movable contact to the other side of said source so as to complete the circuit for any landing for which the control is operated upon engagement of the stationary contact for that landing by said movable contact either during the initial advance of said support or its subsequent movement along with said crosshead in accordance with movement of the car; means responsive to the completion of any circuit for disconnecting said motor from said source and for bringing said support to a stop in the position to which it has moved either during its initial advance, in the event it has not been advanced the full amount permitted by said stopping means, or, in the event it has been fully advanced, during its subsequent movement along with said crosshead in accordance with movement of the car, without affecting movement of said crosshead, said crosshead taking up the advance of said support as it continues its movement in the event the car has been started or as its movement takes place upon starting of the car; and means responsive to the completion of such circuit for bringing the moving means for the crosshead to a stop when the crosshead reaches a position where it and said support are in the same positions with respect to each other as they were prior to the starting of the car.

7. In combination; an elevator car; a plurality of landings served by the car; a source of current supply; car actuating and stopping mechanism; a manually operable start control in the car; closure means for controlling access to and from the car at each of said landings; means responsive to operation of said start control for causing the closing of said closure means at the landing at which the car is positioned; means responsive to the operation of said start control for causing operation of said mechanism to start the car upon the closure of said closure means; a plurality of circuits, one for each of said landings; control switching mechanism for the car comprising, a plurality of spaced stationary contacts, one for each of said landings, each circuit being connected to the contact for the landing for which the circuit is provided, a contact common to said stationary contacts adapted for movement with respect thereto and to engage the same individually during such movement, a crosshead, means for moving said crosshead, a support for said movable contact mounted on said crosshead for relative movement with respect thereto in the direction of movement thereof, stopping means for limiting the amount of movement of said support with respect to said crosshead, a rack secured to said support, an electric motor carried by said crosshead, and a pinion meshing with said rack and driven by said motor; means responsive to the operation of said start control, to effect the closing of the closure means at the landing at which the car is positioned, for connecting said motor to said source, said motor upon thus being energized acting through said rack and pinion to move said support with respect to said crosshead until brought to a stop, thereby advancing said support with respect to said crosshead prior to the starting of the car; means connected to the car for driving said crosshead moving means, thereby to move said crosshead in accordance with movement of the car; a plurality of controls, one for each of said landings, each control being adapted upon operation to connect the circuit for the landing for which it is provided to one side of said source; a circuit connecting said movable contact to the other side of said source so as to complete the circuit for any landing for which the control is operated upon engagement of the stationary contact for that landing by said movable contact either during the initial advance of said support or its subsequent movement along with said crosshead in accordance with movement of the car; means responsive to the completion of any circuit for disconnecting said motor from said source and for bringing said support to a stop in the position to which it has moved either during its initial advance, in the event it has not been advanced the full amount permitted by said stopping means, or, in the event it has been fully advanced, during its subsequent movement along with said crosshead in accordance with movement of the car, without affecting movement of said crosshead, said crosshead taking up the advance of said support as it continues its movement in the event the car has been started or as its movement takes place upon starting of the car; and means responsive to the completion of such circuit for bringing the car to a stop at the landing for which the circuit is provided and thus bringing said crosshead to a stop when the crosshead reaches a position where it and said support are in the same positions with respect to each other as they were prior to said starting of the car.

8. In combination; an elevator car; a plurality of landings served by the car; a source of current supply; car actuating and stopping mechanism; a manually operable start control in the car; closure means for controlling access to and from the car at each of said landings; means responsive to operation of said start control for causing the closing of said closure means at the landing at which the car is positioned; means responsive to the operation of said start control for causing operation of said mechanism to start the car upon the closure of said closure means; a plurality of circuits, one for each of said landings; control switching mechanism for the car comprising, a plurality of spaced stationary contacts, one for each of said landings, each circuit being connected to the contact for the landing for which the circuit is provided, a contact common to said stationary contacts adapted for movement with respect thereto and to engage the same individually during such movement, a crosshead, means for moving said crosshead, a support for said movable contact mounted on said crosshead for relative movement with respect thereto in the direction of movement thereof, stopping means for limiting the amount of movement of said support with respect to said crosshead, a plurality of spaced stationary lugs, one for each said landings, a pawl carried by said support and biased into position to engage said lugs during movement of said support, magnetically operated means for retracting said pawl into position where it clears said lugs during movement of said support, a rack secured to said support, an electric motor carried by said crosshead, a pinion meshing with said rack, and means connecting said rack and motor in driving and driven relation; means responsive to the operation of said start control, to effect the closing of the closure means at the landing at which the car is positioned, for rendering said magnetically operated means effective to retract said pawl; means responsive to the retraction of said pawl for connecting said motor to said source, said motor upon thus being energized acting through said connecting means to rotate said pinion in a certain direction and said pinion acting upon said rack to move said support with respect to said crosshead until brought to a stop, thereby advancing said support with respect to said crosshead prior to the starting of the car; means connected to the car for driving said crosshead moving means, thereby to move said crosshead in accordance with movement of the car; a plurality of controls, one for each of said landings, each control being adapted upon operation to connect the circuit for the landing for which it is provided to one side of said source; a circuit connecting said movable contact to the other side of said source so as to complete the circuit for any landing for which the control is operated upon engagement of the stationary contact for that landing by said movable contact either during the initial advance of said support or its subsequent movement along with said crosshead in accordance with movement of the car; means responsive to the completion of any circuit for rendering said magnetically operated means ineffective to maintain said pawl in retracted position, said motor connecting means operating upon the release of said pawl to disconnect said motor from said source, and said pawl, upon being released, being extended for engagement with the stopping lug for that landing, such stopping lug being positioned so as to be immediately engaged by said pawl as a result of the movement of said crosshead, the engagement of said pawl with said lug bringing said support to a stop in the position to which it has moved either during its initial advance in the event it has not been advanced the full amount permitted by said stopping means, or, in the event it has been fully advanced, during its subsequent movement along with said crosshead in accordance with movement of the car, without affecting movement of said crosshead, said crosshead taking up the advance of said support as it continues its movement in the event the car has been started or as its movement takes place upon starting of the car; and means responsive to the completion of such circuit for bringing the car to a stop at the landing for which the circuit is provided.

9. An electric elevator system comprising; an elevator car; a plurality of landings served by the car; car actuating and stopping mechanism; a start control; means responsive to the operation of said start control after each stop for causing operation of said mechanism to start the car; a circuit for each landing; a control for each landing operable to prepare the circuit for that landing; means operable in accordance with car movement for completing each prepared circuit upon arrival of the car at a predetermined distance from the landing for which the circuit is provided, under conditions where at the time the car was last started, it was more than said predetermined distance from such landing, said means being also operable in response to the operation of said start control in causing the operation of said starting means for completing said circuit in the event the car is less than said predetermined distance from said landing at that time; and means responsive to the completion of any of said circuits for causing said mechanism to slow down the car as it approaches the landing for which the circuit is provided.

10. An electric elevator system comprising; an elevator car; a plurality of landings served by the car; car actuating and stopping mechanism; a start control; means responsive to operation of said start control to cause operation of said mechanism to start the car; a plurality of circuits, one for each landing; a plurality of controls, one for each landing, each control being operable to prepare the circuit for the landing for which the control is provided; circuit controlling means in each of said circuits; means common to all of said circuit controlling means adapted upon relative movement between it and said circuit controlling means to successively cooperate therewith to effect the completion of the circuits which are prepared; means responsive to the operation of said start control for initially changing the position of said common means with respect to said circuit controlling means sufficiently to effect cooperation of said common means with one or more of said circuit controlling means; means responsive to the starting of the car for changing the position of said common means with respect to said circuit controlling means in accordance with movement of the car; and means responsive to the completion of any circuit for causing the operation of said mechanism to slow down the car.

11. An electric elevator system comprising; an elevator car; a plurality of landings served by the car; car actuating and stopping mechanism; a manually operable start control in the car; means responsive to operation of said start control to a start position to cause operation of said mechanism to start the car; a plurality of circuits, one for each landing; a plurality of controls, one for each landing, each control being operable to prepare the circuit for the landing for which the control is provided; a plurality of stationary contacts, one for each landing, each contact being arranged in the circuit for the landing for which it is provided; a contact common to all of said stationary contacts and movable successively to engage said stationary contacts, said movable contact, upon engagement with any stationary contact in a circuit which is prepared, completing that circuit; means responsive to movement of said start control to start position for advancing said movable contact a predetermined amount; means responsive to the starting of the car for moving said movable contact in its advanced position in accordance with movement of the car; and means responsive to the completion of any circuit for causing the operation of said mechanism to slow down the car and bring it to a stop at the landing for which the circuit is provided.

12. An electric elevator system comprising; an elevator car; a plurality of landings served by the car; a control for each of said landings; a signal for each of said landings; car actuating mechanism; a start control operable to cause operation of said mechanism to start the car after each stop; and means controlled by the controls that are operated, by movement of the car and by said start control for controlling the giving of said signals, said means acting to cause the operation of each signal corresponding to a control operated upon arrival of the car at a predetermined distance from the landing for which such control is provided, under conditions where, at the time the car was started, it was more than such distance from that landing and, if the car was less than such distance from such landing, for causing the operation of the signal immediately upon operation of said start control to cause the starting of the car.

13. An electric elevator system comprising; an elevator car; a plurality of landings served by the car; a control for each of said landings; a signal for each of said landings; car actuating and stopping mechanism; a start control operable to cause operation of said mechanism to start the car after each stop; means controlled by the controls that are operated, by movement of the car and by said start control for controlling the giving of said signals, said means acting to cause the operation of each signal corresponding to a control operated upon arrival of the car at a predetermined distance from the landing for which such control is provided, under conditions where, at the time the car was started, it was more than such distance from that landing and, if the car was less than such distance from such landing, for causing the operation of the signal immediately upon operation of said start control to cause the starting of the car; and means responsive to the operation of the first named means to thereafter cause said mechanism to slow down the car as it nears the landing for which the signal is given.

14. An electric elevator system comprising; an elevator car; a plurality of landings served by the car; a control for each of said landings; a signal for each of said landings; car actuating and stopping mechanism; a start control operable after each stop to cause operation of said mechanism to start the car; a circuit for each signal; means responsive to any of the controls that are operated for preparing the circuit for the signal for that landing; means operable in accordance with car movement upon the car being started from any landing for completing the circuit for the next landing for which a circuit has been prepared to cause operation of the signal for that landing for which the circuit is provided upon the arrival of the car at a predetermined distance from that landing, under conditions where at the time the car was last started, it was more than said predetermined distance from such landing, said means being also operable in response to the operation of said start control in causing the starting of the car to complete said circuit to cause operation of said signal before movement of the car takes place in the event the car is less than said predetermined distance from said landing at that time; and means for causing said mechanism to slow down the car and bring it to a stop at each landing for which the signal is given.

15. An electric elevator system comprising; an elevator car; a plurality of landings served by the car; car actuating and stopping mechanism; a manually operable start control; means responsive to operation of said start control to cause operation of said mechanism to start the car; a plurality of circuits, one for each landing; a plurality of controls, one for each landing, each control being operable to prepare the circuit for the landing for which the control is provided; circuit controlling means in each of said circuits; means common to all of said circuit controlling means adapted upon relative movement between it and said circuit controlling means to successively cooperate therewith to effect completion of the circuits which are prepared; means responsive to the operation of said start control for causing a predetermined amount of relative movement of said common means and said circuit controlling means sufficient to effect cooperation between said common means and at least one of said circuit controlling means; means operable upon the starting of the car to cause relative movement of said common means and said circuit controlling means in accordance with movement of the car to cause cooperation between said common means and said circuit controlling means in succession; a signal for each landing; means responsive to the completion of any circuit for causing the giving of the signal for the landing for which the circuit is provided; and means for causing the operation of said mechanism to bring the car to a stop at each landing for which a signal is given.

16. An electric elevator system comprising; an elevator car; a plurality of landings served by the car; car actuating and stopping mechanism; a manually operable start control in the car; means responsive to operation of said start control to a start position to cause operation of said mechanism to start the car; a plurality of circuits, one for each landing; a plurality of controls, one for each landing, each control being operable to prepare the circuit for the landing for which the control is provided; a plurality of stationary contacts, one for each landing, each contact being arranged in the circuit for the landing for which it is provided; a contact common to all of said stationary contacts and movable successively to engage said stationary contacts, said movable contact, upon engagement with any stationary contact in a circuit which is prepared, completing that circuit; means responsive to movement of said start control to start position for advancing said movable contact a predetermined amount; means responsive to the starting of the car for moving said movable contact in its advanced position in accordance with movement of the car; a signal for each landing; means responsive to the completion of any circuit for causing the giving of the signal for the landing for which the circuit is provided; and means for causing the operation of said mechanism to bring the car to a stop at each landing for which a signal is given.

17. An electric elevator system comprising; an elevator car; a plurality of landings served by the car; car actuating and stopping mechanism; a manually operable start control in the car; means responsive to operation of said start control to a start position to cause operation of said mechanism to start the car; a plurality of circuits, one for each landing; a plurality of controls, one for each landing, each control being operable to prepare the circuit for the landing for which the control is provided; a plurality of stationary contacts, one for each landing, each contact being arranged in the circuit for the landing for which it is provided; a contact common to all of said stationary contacts and movable to engage said stationary contacts individually, said movable contact, upon engagement with any stationary contact in a circuit which is prepared, completing that circuit; means responsive to movement of said start control to start position for advancing said movable contact a predetermined amount; means responsive to the starting of the car for moving said movable contact in its advanced position in accordance with movement of the car; a signal for each landing; means responsive to the completion of any circuit either during said advance of said movable contact or during its movement in accordance with car movement for causing the giving of the signal for the landing for which the circuit is provided and for thereafter causing the operation of said mechanism to slow down the car and bring it to a stop at that landing; and means for stopping further movement of said movable contact by either of said moving means upon completion of any of said circuits by the engagement of the movable contact with a stationary contact and for returning the contact to the position from which it was advanced as the car is brought to a stop.

18. An electric elevator system comprising; an elevator car; a plurality of landings served by the car; car actuating and stopping mechanism; a manually operable start control in the car; means for determining the direction of car travel; means responsive to operation of said start control to a start position to cause operation of said mechanism to start the car in a direction determined by said direction determining means; a plurality of up circuits, one for each landing; a plurality of down circuits, one for each landing; a plurality of up controls, one at each landing; a plurality of down controls, one at each landing; means responsive to the operation of any up control for preparing the up circuit for the landing at which the up control is located and responsive to the operation of any down control for preparing the down circuit for the landing at which the down control is located; a plurality of up stationary contacts, one for each landing, each up contact being arranged in the up circuit for the landing for which it is provided; a plurality of down stationary contacts, one for each landing, each down contact being arranged in the down circuit for the landing for which it is provided; an up movable contact common to all of said up stationary contacts for successively engaging said up stationary contacts individually, said up movable contact, upon engagement in its movement in a certain direction with any up stationary contact in an up circuit which is prepared, completing that circuit; a down movable contact common to all of said down stationary contacts for successively engaging said down stationary contacts individually, said down movable contact, upon engagement in its movement in a direction opposite to said certain direction with any down stationary contact in a down circuit which is prepared, completing that circuit; means responsive to movement of said start control to start position for advancing said up movable contact from a certain position a predetermined amount in said certain direction when said direction determining means is set for up car travel and for advancing the down movable contact from a certain position a predetermined amount in said opposite direction when said direction determining means is set for down car travel; means responsive to the starting of the car in the up direction for moving said up movable contact in its advanced position in said certain direction in accordance with movement of the car and responsive to the starting of the car in the down direction for moving said down movable contact in its advanced position in said opposite direction in accordance with movement of the car; an up signal at each landing; a down signal at each landing; means responsive to the completion of any up circuit for causing the operation of the up signal at the landing for which the up circuit is provided and for thereafter causing the operation of said mechanism to slow down the car as it arrives at a certain distance from that landing and to bring the car to a stop at that landing, and responsive to the completion of any down circuit for causing the operation of the down signal at the landing for which the down circuit is provided and for thereafter causing operation of said mechanism to slow down the car as it arrives at a certain distance from that landing and to bring the car to a stop at that landing; and means for stopping further movement of said up movable contact by either of said moving means upon completion of any of said up circuits by the engagement of the up movable contact with an up stationary contact and for returning the up movable contact to the position from which it was advanced as the car is slowed down and brought to a stop and for stopping further movement of said down movable contact by either of said moving means upon completion of any of said down circuits by the engagement of the down movable contact with a down stationary contact and for returning the down movable contact to the position from which it was advanced as the car is slowed down and brought to a stop.

19. In combination; an elevator car; a plurality of landings served by the car; car actuating and stopping mechanism; means for causing operation of said mechanism to start the car; a circuit for each of said landings; a plurality of circuit controlling means, one for each of said landings, said circuit controlling means being spaced in accordance with the distances between the landings for which they are provided; means common to said circuit controlling means and adapted to cooperate therewith in succession upon relative movement with respect thereto; means responsive to the operation of said starting means in effecting the starting of the car for causing relative movement between said common means and said circuit controlling means; a plurality of controls, one for each of said landings; means responsive to any of said controls that are operated for causing, upon the cooperation of said common means with the circuit controlling means for the landing for which the control is provided, the completion of the circuit for such landing; means for causing the slowing down and stopping of the car at such landing; and means responsive to such cooperation for stopping relative movement between said common means and said circuit controlling means for such landing to maintain said common means and such circuit controlling means in cooperative relation during such slow down and stopping and until said starting means is again operated to effect the starting of the car from such landing.

20. In combination; an elevator car; a plurality of landings served by the car; car actuating and stopping mechanism; means for causing operation of said mechanism to start the car; a plurality of controls, one for each of said landings; means for each control for retaining that control, once operated, in operated condition; a plurality of spaced stationary circuit controlling means, one for each of said landings; means common to said stationary circuit controlling means and movable to cooperate therewith individually; means responsive to the operation of said starting means in effecting the starting of the car for moving said common means with respect to said stationary circuit controlling means to cooperate with the same; means for bringing said common means to a stop upon its being moved into a position of cooperation with the stationary circuit controlling means for a control that is operated; means responsive to such cooperation for effecting the restoration of such operated control; means for causing said mechanism to slow down the car and bring it to a stop at the landing for which such stationary circuit controlling means is provided; and means for maintaining said common means stopped in its position of cooperation with such stationary circuit controlling means during such slow down and stopping and until said starting means is again operated to effect the starting of the car from such landing, to prevent the retaining means for the control for such landing retaining such control in operated condition if such control be operated prior to the operation of said starting means to effect the starting of the car from such landing.

21. In combination; an elevator car; a plurality of landings served by the car; car actuating and stopping mechanism; means for causing operation of said mechanism to start the car; a plurality of controls, one for each of said landings; means for each control for retaining that control, once operated, in operated condition; a restoring circuit for each control; a plurality of spaced stationary contacts, one for each of said landings, each contact being connected in the circuit for the landing for which the contact is provided; a movable contact common to said stationary contacts for engaging the same; means responsive to the operation of said starting means in effecting the starting of the car for moving said movable contact with respect to said stationary contacts to engage the same; means for bringing said movable contact to a stop upon its engagement with the stationary contact in the circuit for a control that is operated, said movable contact, upon its engagement with the stationary contact in such circuit, completing the circuit to effect the restoration of the control for the landing for which the stationary contact is provided; and means for causing said mechanism to slow down the car and bring it to a stop at the landing for which such stationary contact is provided, said means for stopping said movable contact maintaining it stopped in engagement with such stationary contact during such slow down and stopping and until said starting means is again operated to effect the starting of the car from such landing, to prevent the retaining means for the control for such landing retaining such control in operated condition if such control be operated prior to the operation of said starting means to effect the starting of the car from such landing.

22. In combination; an elevator car; a plurality of landings served by the car; car actuating and stopping mechanism; means for causing operation of said mechanism to start the car; a crosshead; means for moving said crosshead in accordance with movement of the car; a device carried by said crosshead for relative movement with respect thereto in the direction of movement thereof; stopping means for limiting the amount of movement of said device with respect to said crosshead; means responsive to the operation of said starting means in effecting the starting of the car for moving said device with respect to said crosshead before the car starts until brought to a stop, thereby advancing said device with respect to said crosshead; a plurality of controls, one for each of said landings; means for each control for retaining that control, once operated, in operated condition; a restoring circuit for each control, each control being adapted upon operation to prepare its restoring circuit; a plurality of spaced stationary contacts, one for each of said landings, each contact being connected in the restoring circuit for the control for the landing for which the contact is provided; a contact common to said stationary contacts, said common contact being mounted on said device to engage said stationary contacts individually during movement of said device, said common contact, upon its engagement with the stationary contact in any circuit which has been prepared completing that circuit to effect the restoration of said control for that landing; means for bringing said device to a stop with said common contact in engagement with such stationary contact without affecting movement of said crosshead so as to cause said crosshead to take up the advance of said device as movement of the crosshead takes place; and means responsive to such movement of the crosshead after said device has been stopped for causing said mechanism to slow down the car and bring it to a stop at the landing for which such stationary contact is provided, said means for stopping said device maintaining it in position with said common contact in engagement with such stationary contact until said starting means is operated to effect the starting of the car from such landing, to prevent the retaining means for the control for such landing retaining such control in operated condition if it be operated again prior to such operation of said starting means.

24. In combination; an elevator car; a plurality of landings served by the car; car actuating and stopping mechanism; means for causing operation of said mechanism to start the car; a movable member; means for moving said movable member in accordance with movement of the car; a device carried by said movable member for relative movement with respect thereto in the direction of movement thereof; means responsive to the operation of said starting means in effecting the starting of the car for moving said device to advance the same with respect to said movable member; a plurality of controls, one for each of said landings; a signal for each of said landings; a plurality of spaced stationary circuit controlling means, one for each of said landings; means common to said circuit controlling means mounted on said device for cooperation with said circuit controlling means during movement of said device; means responsive to any of said controls that are operated for causing, upon the cooperation of said common means with the circuit controlling means for the landing for which the control is provided, the giving of the signal for the landing for which such control is provided; means for causing the slowing down and stopping of the car at such landing; and means for bringing said device to a stop with said common means in cooperation with such stationary circuit controlling means and for maintaining it in that position during such slow down and stopping and until said starting means is again operated to effect the starting of the car from such landing, thereby causing the giving of said signal to be continued until said starting means is operated to effect the starting of the car from such landing.

24. In combination; an elevator car; a plurality of landings served by the car; car actuating and stopping mechanism; means for causing operation of said mechanism to start the car; a movable member; means for moving said movable member in accordance with movement of the car; a device carried by said movable member for relative movement with respect thereto in the direction of movement thereof; stopping means for limiting the amount of movement of said device with respect to said movable member; means responsive to the operation of said starting means in effecting the starting of the car for moving said device with respect to said movable member before the car starts until brought to a stop, thereby advancing said device with respect to said movable member; a plurality of controls, one for each of said landings; a signal lamp at each of said landings; a circuit for each of said lamps; a plurality of spaced stationary contacts, one for each of said landings, each stationary contact being connected in the circuit for the lamp for the landing for which the contact is provided; a contact common to said stationary contacts mounted on said device to engage said stationary contacts during movement of said device; means responsive to any of said controls that are operated for causing, upon the engagement of said common contact with the stationary contact for the landing for which the control is provided, either during the advancing of said device or during its movement along with said movable member in accordance with movement of the car, the completion through said common contact of the circuit for the lamp for the landing for which such control is provided; means for causing the slowing down and stopping of the car at such landing; and means for bringing said device to a stop with said common contact in engagement with said stationary contact for such landing and for maintaining it in that position during such slow down and stopping and until said starting means is again operated to effect the starting of the car from such landing, thereby causing said circuit for said lamp to remain completed and the lamp lighted until said starting means is operated to effect the starting of the car from such landing.

25. In combination; an elevator car; a plurality of landings served by the car; car actuating and stopping mechanism; means for causing operation of said mechanism to start the car; a crosshead; means for moving said crosshead in accordance with movement of the car; a device carried by said crosshead for relative movement with respect thereto in the direction of movement thereof; stopping means for limiting the amount of movement of said device with respect to said crosshead; means responsive to the operation of said starting means in effecting the starting of the car for moving said device with respect to said crosshead before the car starts until brought to a stop, thereby advancing said device with respect to said crosshead; a plurality of controls, one for each of said landings; a circuit for each landing, each control being adapted upon operation to prepare the circuit for the landing for which the control is provided; a plurality of spaced stationary contacts, one for each of said landings, each contact being connected in the circuit for the landing for which the contact is provided; a contact common to said stationary contacts mounted on said device to engage said stationary contacts individually during movement of said device; a signal lamp at each of said landings; a circuit for each of said lamps; a plurality of additional spaced stationary contacts, one for each of said landings, each additional contact being connected in the circuit for the lamp for the landing for which the additional contact is provided; a contact common to said additional contacts mounted on said device to engage said additional contacts during movement of said device at substantially the same time the first named common contact engages the first named stationary contacts for the same landings; means responsive to the engagement of said first named common contact with the first named stationary contact in any of the first named circuits which have been prepared, either during the advancing of said device or during its movement along with said crosshead in accordance with movement of the car, for causing the completion of the circuit for the lamp for the landing for which such first named circuit is provided through the second named common contact and the additional stationary contact for such landing, and for causing said mechanism to slow down the car and bring it to a stop at such landing; means for bringing said device to a stop with the second named common contact in engagement with said additional contact for such landing and for maintaining it in that position until said starting means is again operated to effect the starting of the car from such landing, thereby causing said lamp for such landing to be lighted from the time of the engagement of the first named common contact with the first named stationary contact for such landing until said starting means is operated to effect the starting of the car from such landing.

26. In combination; an elevator car; a plurality of landings served by the car; car actuating and stopping mechanism; means for causing operation of said mechanism to start the car; a plurality of controls, one for each of said landings; means for each control for retaining that control, once operated, in operated condition; a plurality of spaced stationary contacts, one for each of said landings; a contact common to said stationary contacts and movable to engage the same; a signal at each of said landings; a circuit for each of said signals; a plurality of additional spaced stationary contacts, one for each of said landings, each additional contact being connected in the circuit for the signal for the landing for which the additional contact is provided; a contact common to said additional contacts and movable to engage the same; means for moving said common contacts in accordance with movement of the car into engagement with their respective stationary contacts for the same landings at substantially the same time; means responsive to the engagement of said first named common contact with the first named stationary contact for any landing for which a control is operated for completing the circuit for the signal at such landing through the second named common contact and the additional stationary contact for such landing and for restoring the operated control for such landing; means for causing said mechanism to slow down the car and bring it to a stop at such landing; and means for maintaining the second named common contact in engagement with said additional contact for such landing until said starting means is again operated to effect the starting of the car from such landing, thereby causing said signal for such landing to be given from the time of the engagement of the first named common contact with the first named stationary contact for such landing until said starting means is operated to effect the starting of the car from such landing.

27. In combination; an elevator car; a plurality of landings served by the car; car actuating and stopping mechanism; means for causing operation of said mechanism to start the car; a movable member; means for moving said movable member in accordance with movement of the car; a device carried by said movable member for relative movement with respect thereto in the direction of movement thereof; means responsive to the operation of said starting means in effecting the starting of the car for moving said device to advance it with respect to said movable member; a plurality of controls, one for each of said landings; means for each control for retaining that control, once operated, in operated condition; a plurality of spaced stationary contacts, one for each of said landings; a contact common to said stationary contacts mounted on said device to engage said stationary contacts during movement of said device; a signal at each of said landings; a circuit for each of said signals; a plurality of additional spaced stationary contacts, one for each of said landings, each additional contact being connected in the circuit for the signal for the landing for which the additional contact is provided; a contact common to said additional contacts mounted on said device to engage said additional contacts during movement of said device at substantially the same time the first named common contact engages the first named stationary contacts for the same landings; means responsive to the engagement of said first named common contact with the first named stationary contact for any landing for which a control is operated, either during the advancing of said device or during its movement along with said movable member in accordance with movement of the car, for completing the circuit for the signal at such landing through the second named common contact and the additional stationary contact for such landing, and for restoring the operated control for such landing to its former condition; means for causing said mechanism to slow down the car and bring it to a stop at such landing; and means responsive to such engagement of the first named common contact with the first named stationary contact for such landing for bringing said device to a stop with the second named common contact in engagement with said additional contact for such landing and for maintaining it in that position until said starting means is again operated to effect the starting of the car from such landing, thereby causing said signal for such landing to be given from the time of the engagement of the first named common contact with the first named stationary contact for such landing until said starting means is operated to effect the starting of the car from such landing.

28. In combination; an elevator car; a plurality of landings served by the car; car actuating and stopping mechanism; means for causing operation of said mechanism to start the car; a movable member; means for moving said member in accordance with movement of the car; means for advancing said member with respect to said car; a plurality of switches; means responsive to the operation of said starting means to effect the starting of the car for operating said switches and advancing said member; and means for each of said landings for bringing said member to a stop, continued movement of the car, upon said member being stopped by any of said stopping means, causing successive restoration of said switches to their former condition as the car arrives at decreasing distances from the landing for which such stopping means is provided.

29. In combination; an elevator car; a plurality of landings served by the car; car actuating and stopping mechanism; means for causing operation of said mechanism to start the car; a member movable in accordance with movement of the car; a plurality of switches carried by said member; means responsive to the operation of said starting means to effect the starting of the car for operating said switches; a device carried by said member and movable by said operating means to advance with respect to said member during the operation of said switches; and means for each of said landings for bringing said device to a stop, said device upon being stopped by any of said stopping means acting through said operating means, as said member is moved in accordance with car movement, to successively restore said switches to their former condition as the car arrives at decreasing distances from the landing for which such stopping means is provided.

30. In combination; an elevator car; a plurality of landings served by the car; car actuating and stopping mechanism, said mechanism being adapted to operate the car at a speed greater than obtained in a run in which the car is brought to a stop at the landing next to the one from which it is started; means for causing operation of said mechanism to start the car; a member movable in accordance with movement of the car; a plurality of switches carried by said member; means responsive to the operation of said starting means to effect the starting of the car for operating said switches; a device carried by said member and movable by said operating means in operating said switches to advance said device with respect to said member; means for limiting the amount of said advance, said limiting means permitting an advance corresponding at least to the distance traversed by the car in being slowed down and brought to a stop from full speed; and means for each of said landings for bringing said device to a stop either in a partially advanced position or fully advanced position, the number of said switches operated being determined by the amount of said advance, said device upon being stopped by any of said stopping means acting through said operating means as said member is moved in accordance with car movement to successively restore the switches that are operated to their former condition as the car arrives at decreasing distances from the landing for which such stopping means is provided, the first of said switches to be restored being restored as the car arrives at a distance from such landing determined by the length of the run and acting to cause said mechanism to start slowing down the car, and the remaining switches upon being restored acting to cause said mechanism to further slow down the car and finally bring it to a stop at such landing.

31. In combination; an elevator car; a plurality of landings served by the car; car actuating and stopping mechanism; means for causing operation of said mechanism to start the car; a member movable in accordance with movement of the car; a plurality of switches carried by said member; means responsive to the operation of said starting means to effect the starting of the car for successively operating said switches; a device carried by said member and movable by said operating means with respect to said member and in the direction in which the member is movable until brought to a stop, thereby advancing said device with respect to said member, the number of switches operated being determined by the amount of said advance and the last of said switches being operated upon an advance of said device with respect to said member corresponding to the total slow down distance required for the car from full speed; means for stopping movement of said device with respect to said member after an amount of movement at least sufficient to permit operation of all of said switches; a stop for said device for each of said landings; and means carried by said device for cooperating with each of said stops to bring said device to a stop either in a partially advanced or fully advanced position with respect to said member, said member upon said device being brought to a stop by one of said stops acting as it is moved in accordance with car movement to successively restore the switches that are operated to their former condition as the car arrives at decreasing distances from the landing for which such stop is provided.

32. In combination; an elevator car; a plurality of landings served by the car; car actuating and stopping mechanism; means for causing operation of said mechanism to start the car in either the up or the down direction; a movable member; means for moving said member in accordance with movement of the car; a plurality of switches carried by said movable member; means responsive to the operation of said starting means to effect the starting of the car in either direction for successively operating said switches; a device carried by said movable member and movable by said switch operating means with respect to said movable member in accordance with the direction in which the car is being started; stopping means for limiting the amount of such movement of said device with respect to said movable member in each direction, said stopping means permitting an amount of such movement sufficient at least to effect operation of all of said switches, the last of said switches being operated upon an amount of movement of said device with respect to said movable member corresponding to the slow down distance required for the direction in which the car is being started, to slow down and stop the car from full speed; a stop for said device for each of said landings; and means carried by said device for cooperating with each of said stops during movement of said device in either direction to bring said device to a stop in the position to which it has moved either during its initial advance in the event it has not been advanced the full amount permitted by said stopping means or, in the event it has been fully advanced, during its subsequent movement along with said movable member in accordance with movement of the car, without effecting movement of said movable member, said movable member acting to successively restore the switches that are operated to their former condition as the car arrives at decreasing distances from the landing for which the stop is provided.

33. In combination; an elevator car; a plurality of landings served by the car; car actuating and stopping mechanism; start control means; a plurality of controls, one for each of said landings; a member movable in accordance with movement of the car; a plurality of switches carried by said member; a cam for operating each switch, said cams also being carried by said member; means responsive to the operation of said start control means for operating said cams into positions to operate said switches; means responsive to the operation of said start control means and of a certain one of said switches for causing operation of said mechanism to start the car; a device carried by said member and movable by said operating means with respect to said member in the direction in which said member is movable; means for stopping movement of said device with respect to said member after all of said switches have been operated, said operating means causing the last of said switches to be operated when said device has advanced an amount corresponding to the maximum slow down distance required for the car; circuit controlling means for each of said controls; means carried by said device for cooperating with said circuit controlling means; means responsive to the cooperation of said means carried by said device with the circuit controlling means for any control which has been operated for bringing said device to a stop, said device upon being stopped acting through said cams as movement of said member takes place to successively restore said switches to their former condition as the car arrives at decreasing distances from the landing for which such control is provided; and means responsive to the restoration of said switches to their former condition for causing said mechanism to slow down the car and finally bring it to a stop at such landing.

34. In combination; an elevator car; a plurality of landings served by the car; car actuating and stopping mechanism; start control means; a plurality of circuits, one for each of said landings; a plurality of controls, one for each of said landings, each control being adapted upon operation to prepare the circuit for the landing for which it is provided; a plurality of circuit controlling means, one in each of said circuits; means common to said circuit controlling means adapted for movement with respect thereto and to successively cooperate therewith individually during such movement to effect the completion of the circuits which have been prepared; a crosshead movable in accordance with movement of the car; a support for said common means mounted on said crosshead for relative movement with respect thereto in the direction in which said crosshead is movable; means for limiting the amount of movement of said support with respect to said crosshead, said limiting means permitting advance movement of said support with respect to said crosshead corresponding at least to the maximum slow down distance required for the car; a plurality of switches carried by said crosshead; a cam for operating each switch, said cams also being carried by said crosshead; means responsive to the operation of said start control means for operating said cams into positions to operate said switches; means responsive to operation of said start control means and to the operation of a certain one of said switches for causing operation of said mechanism to start the car; means connecting said cams and said support for moving said support with respect to said crosshead as said switches are operated until said support is brought to a stop, thereby advancing said common means with respect to said crosshead the number of switches operated being determined by the amount of said advance; means responsive to the completion of any circuit for bringing said support to a stop in the position to which it has moved, said support upon being stopped acting through its connection to said cams, as movement of said crosshead takes place, to return said cams to their former position and thus to successively restore said switches to their former condition as the car arrives at decreasing distances from the landing for which the circuit is provided; and means responsive to the restoration of said switches to their former condition for causing said mechanism to retard the car and to bring it to a stop at such landing.

35. In combination; an elevator car; a plurality of landings served by the car; car actuating and stopping mechanism; means operable to start the car in either the up or the down direction; a plurality of up controls, one for each of said landings; a plurality of down controls, one for each of said landings; a movable member; means for moving said movable member in accordance with movement of the car; a plurality of switches carried by said movable member; an up cam for operating each switch; a down cam for operating each switch; means responsive to the operation of said starting means in starting the car in the up direction for operating said up cams into positions to successively operate said switches and responsive to the operation of said starting means in starting the car in the down direction for operating said down cams into positions to successively operate said switches; means responsive to the operation of said starting means and the first of said switches to operate to cause said mechanism to start the car; a device carried by said movable member and movable by said cam operating means with respect to said member in accordance with the direction in which the car is being started, thereby advancing said device with respect to said movable member, the number of switches operated being determined by the amount of said advance; stopping means for limiting the amount of such movement of said device with respect to said movable member in each direction, said stopping means permitting an amount of such movement sufficient at least to effect operation of all of said switches, the last of said switches being operated upon an amount of movement of said device with respect to said movable member corresponding to the slow down distance required for the car from full speed for the direction in which the car is being started; a plurality of spaced stationary stops, one for each of said landings; an up pawl and a down pawl carried by said device, said pawls being biased into positions for said up pawl to engage said stops during movement of said device in its direction for upward car travel and for said down pawl to engage said stops during movement of said device in the opposite direction; means for retracting said pawls into positions where they clear said stops during movement of said device; up circuit controlling means for each of said up controls; down circuit controlling means for each of said down controls; up means carried by said device for cooperating with said up circuit controlling means; down means carried by said device for cooperating with said down circuit controlling means; means responsive to the cooperation of said up means with the up circuit controlling means for any up control that is operated for releasing said up pawl which engages said stop for the landing for which that control is provided, bringing said device to a stop and thereby causing the operation of said cam operating means as movement of said member takes place to restore said up cams to their former condition and thus successively to restore said switches to their former condition; means responsive to the cooperation of said down means with the down circuit controlling means for any down control that is operated for releasing said down pawl which engages said stop for the landing for which that control is provided, bringing said device to a stop, thereby causing the operation of said cam operating means as movement of said member takes place to restore said down cams to their former condition and thus successively to restore said switches to their former condition; and means responsive to the restoration of said switches to their former condition for retarding the car and, upon the restoration of the last one of said switches to its former condition, for bringing the car to a stop at such landing.

36. In combination; an elevator car; a plurality of landings served by the car; car actuating and stopping mechanism; circuits for controlling starting, acceleration, retardation and stopping of the car; a member movable in accordance with movement of the car; a device mounted on said member for movement relative thereto in the direction in which said member is movable, thus advancing with respect to said member; a plurality of switches carried by said member, one in each of said circuits; means for causing operation of said switches and, upon operation of a certain one of them, for completing said starting circuit, the additional switches operated acting to prepare their respective circuits, said means also causing the advance of said device with respect to said member an amount dependent upon the length of the run to be made, the number of switches operated being determined by the amount of said advance; means responsive to the completion of said circuit which controls starting to cause operation of said mechanism to start the car; means responsive to the starting of the car to successively complete the remainder of the circuits which have been prepared to cause operation of said mechanism to accelerate the car; and means for each landing for stopping said device either in a partially or fully advanced position, depending upon the amount of movement of said device before being stopped, or its subsequent movement along with said member in accordance with movement of the car, said member acting to take up the advance of said device as its movement takes place and also acting as said advance is taken up to restore said switches to their former condition successively as the car arrives at certain distances from the landing for which such stopping means is provided, said switches upon being restored acting to break the circuits which have been completed to cause said mechanism to retard the car and to bring it to a stop at such landing.

37. In combination; an elevator car; a plurality of landings served by the car; car actuating and stopping mechanism; circuits for controlling starting, acceleration, retardation and stopping of the car; closure means for controlling access to and from the car at each of said landings; means for causing the closing of said closure means at the landing at which the car is positioned; a member movable in accordance with movement of the car; a device mounted on said member for movement relative thereto in the direction in which said member is movable; a plurality of switches carried by said member for controlling said circuits; a plurality of cams carried by said member, one for operating each switch; means responsive to the operation of said closing means to effect the closing of the closure means at the landing at which the car is positioned for advancing said device with respect to said member prior to the closure of such closure means, and for operating said cams into positions to operate said switches in sequence to prepare said circuits, the number of switches operated and of circuits prepared being determined by the amount of said advance and the amount of advance being determined by the amount of travel of the car to be made before the car is brought to a stop; means responsive to the closing of said closure means at the landing at which the car is positioned for completing the circuit which controls starting to cause operation of said mechanism to start the car; timed means for successively completing the additional circuits which have been prepared to cause operation of said mechanism to accelerate the car; and means for each landing for stopping said device either during its advance or its subsequent movement along with said member in accordance with movement of the car, without affecting movement of said member so as to cause said member to take up the advance of said device as movement of the member takes place, said member during such movement causing said cam operating means to operate said cams into positions to restore said switches to their former condition successively as the car arrives at certain distances from the landing for which such stopping means is provided, said switches upon being restored acting to break the circuits which have been completed to cause said mechanism to retard the car and to bring it to a stop at such landing.

38. In combination; a movable member; a second member carried by said movable member and movable with respect thereto in the direction of movement thereof; a plurality of switches carried by the first member; adjustable operating means for each switch; means for causing movement of said second member to advance it with respect to said first member and for causing said switch operating means to operate said switches during such advance; means for moving said first member; means for bringing said second member to a stop without affecting movement of said first member so as to cause said first member to take up the advance of said second member as movement of said first member takes place and in taking up said advance to act through said switch operating means to effect the successive restoration of said switches to their former condition; a scale carried by one of said members; and a pointer carried by the other member whereby, without moving said first member, said switch operating means can be set to effect the restoration of said switches at the desired points by moving said second member into positions with respect to the first where said pointer registers with such points on said scale.

39. In combination; an elevator car; a plurality of landings served by the car; car actuating and stopping mechanism; means for causing operation of said mechanism to start the car; a movable member; means for moving said member in accordance with movement of the car; a device carried by said movable member and movable with respect thereto in the direction of movement thereof; a plurality of switches carried by said movable member for controlling the retardation of the car; adjustable operating means for each switch; means responsive to the operation of said starting means to effect the starting of the car for causing movement of said device to advance it with respect to said movable member and for causing said switch operating means to operate said switches during such advance; means for each of said landings for bringing said device to a stop without affecting movement of said movable member so as to cause said movable member to take up the advance of said device as movement of said movable member takes place and in taking up said advance to act through said switch operating means to effect the successive restoration of said switches to their former condition as the car arrives at certain distances from the landing for which the stopping means is provided; and means for indicating by the relative positions of said device and said movable member, when movement of said device has been stopped, the distance of the car from such landing so that with the car stopped, said switch operating means can be set to effect the restoration of said switches with the car at the desired distances from a landing by moving said device into positions with respect to said movable member which are shown by said indicating means to correspond to such distances.

40. In combination; an elevator car; a plurality of landings served by the car; car actuating and stopping mechanism; means for causing operation of said mechanism to start the car in either the up or the down direction; a movable member; means for moving said member in accordance with movement of the car; a device carried by said movable member and movable with respect thereto in accordance with the direction in which the car is being started; a plurality of switches carried by said movable member for controlling the retardation of the car; an up cam for each switch; a down cam for each switch; means responsive to the operation of said starting means to effect the starting of the car for causing movement of said device with respect to said movable member in accordance with the direction in which the car is being started, thereby advancing said device with respect to said movable member, and for causing said up cams to operate said switches during such advance, when the car is being started in the up direction and said down cams to operate said switches during such advance when the car is being started in the down direction; a stop for said device for each of said landings; means carried by said device for cooperating with any of said stops during movement of said device in either direction to bring said device to a stop without affecting movement of said movable member so as to cause said movable member to take up the advance of said device as movement of said movable member takes place and in taking up said advance to act through said up cams, in the event said device has been moving in a direction for upward car travel, and to act through said down cams, in the event said device has been moving in a direction for downward car travel, to effect the successive restoration of said switches to their former conditions as the car arrives at certain distances from the landing for which such stop is provided; means responsive to the restoration of said switches to their former condition for retarding the car; a scale carried by said device; and a pointer carried by said movable member, said cams being adjustable so that, without moving said car, they can be set to effect the restoration of said switches with the car at the desired distances from a landing by moving said device into positions where said pointer registers with points on said scale corresponding to such distances.

41. In combination; an elevator car; a plurality of landings served by the car; car actuating and stopping mechanism; means for causing operation of said mechanism to start the car; a movable member; means for moving said member in accordance with movement of the car; means for advancing said member with respect to said car; a plurality of stops, one for each of said landings; a complementary stop carried by said movable member for cooperating with the first named stops; means responsive to the operation of said starting means to effect the starting of the car for effecting relative movement of the first named and complementary stops into position where said complementary stop clears said first named stops during its movement and for advancing said member with respect to the car; and means for restoring said stops to cooperative relationship to effect the cooperation of said complementary stop with one of said first named stops, such cooperation bringing said member to a stop, said car acting, as its movement takes place with said member brought to a stop, to take up the advance of said member.

42. In combination; an elevator car; a plurality of landings served by the car; car actuating and stopping mechanism; means operable to cause operation of said mechanism to start the car; a movable member; means for moving said movable member in accordance with movement of the car; a device carried by said movable member and movable with respect thereto in the direction of movement thereof; stopping means for limiting the amount of such movement; a plurality of spaced stationary stops, one for each of said landings; a pawl carried by said device for engaging said stops during movement of said device in a given direction; means responsive to the operation of said starting means to effect the starting of the car in said given direction for retracting said pawl into position where it clears said stops during movement of said device; means responsive to said retraction of said pawl for advancing said device with respect to said movable member in said given direction; and means for releasing said pawl during movement of said device in said given direction, said pawl upon being released engaging one of said stops to bring said device to a stop either in a partially or fully advanced condition without affecting movement of said movable member so as to cause said movable member to take up the advance of said device as movement of said movable member takes place.

43. In combination; an elevator car; a plurality of landings served by the car; car actuating and stopping mechanism; means operable to cause operation of said mechanism to start the car in either the up or the down direction; a movable member; means for moving said movable member in accordance with movement of the car; a device carried by said movable member and movable with respect to said member in accordance with the direction in which the car is being started; stopping means for limiting the amount of such movement of said device with respect to said movable member in each direction; a plurality of spaced stationary stops, one for each of said landings; an up pawl and a down pawl carried by said device, said pawls being biased into positions for said up pawl to engage said stops during movement of said device along with said movable member for upward car travel and for said down pawl to engage said stops during movement of said device along with said movable member for downward car travel;

magnetically operated means for retracting said pawls into positions where they clear said stops during movement of said device; means responsive to the operation of said starting means to effect the starting of the car for rendering said magnetically operated means effective to retract said pawls; means responsive to the retraction of said pawls for causing movement of said device with respect to said movable member for upward car travel, when the car is being started in the up direction, and for downward car travel, when the car is being started in the down direction, thereby advancing said device with respect to said movable member in accordance with the direction in which the car is being started; means for limiting the amount of such advance; and means for releasing said up pawl to engage a stop during movement of said device for upward car travel and for releasing said down pawl to engage a stop during movement of said device for downward car travel, the engagement of any stop by either of said pawls bringing said device to a stop without affecting movement of said movable member so as to cause said movable member to take up the advance of said device as movement of said movable member takes place.

44. In combination; an elevator car serving a plurality of landings; stationary circuit controlling means for each of said landings; a movable member for cooperating with said circuit controlling means; a stationary switch for each of said landings, each switch being connected to the circuit controlling means for the landing for which the switch is provided; a second movable member for successively operating said switches; and means for moving said movable members in accordance with movement of the car, said second movable member being of a length and arranged so that during movement of the car in a given direction it operates each switch before the movement of the first movable member into cooperative relation with the stationary circuit controlling means for the landing for which the switch is provided and maintains that switch operated until after said first movable member has been moved into and out of cooperative relation with the stationary circuit controlling means for the next landing.

45. In combination; an elevator car serving a plurality of landings; a stationary contact for each of said landings; a movable contact for successively engaging said stationary contacts; a stationary switch for each of said landings, each having an operating member, both said switches and said stationary contacts being spaced to correspond with the distances between their respective landings; means connecting said switches in series relation; a movable member for successively engaging said operating members to open said switches, the engagement between said operating members and said movable member being non current conducting; and means for moving said movable member and said movable contact in accordance with movement of the car, said member being of a length and arranged so that during movement of the car in a certain direction it engages said operating member for each switch to open that switch before the engagement of said movable contact with the stationary contact for the landing for which the switch is provided and maintains that switch open until after said movable contact has engaged and left the stationary contact for the next landing.

46. A switch comprising; a stationary contact; a pivoted contact member for engaging said stationary contact; means for biasing said contact member into engagement with said stationary contact; a movable operating member for said contact member; and a lost motion connection between said contact member and its pivot for causing said contact member to be maintained in sliding contact engagement with said stationary contact during movement of said operating member to operate said contact member until the lost motion is taken up, continued movement of said operating member after said lost motion is taken up effecting the disengagement of said contact member from said stationary contact.

47. A switch comprising; a stationary contact; a lever, one end of which forms a contact for engaging said stationary contact; a pivotal mounting for said lever having a certain amount of lost motion to permit a sliding movement thereof without disengagement from the stationary contact; a second lever connected to the first named lever and operable to move it about its pivot; and resilient means between said levers for maintaining the first named lever in sliding contact engagement with said stationary contact during the initial operation of the second named lever to operate the first and yielding after said lost motion is taken up to permit the disengagement of the first named lever from said stationary contact.

48. A control system for an elevator car serving a plurality of landings comprising; car actuating and stopping mechanism; a switch for causing operation of said mechanism to bring the car at a levelling speed from below a landing at which a stop is being made to the landing level, said switch having an operating coil; a switch for causing operation of said mechanism to bring the car at a levelling speed from above a landing at which a stop is being made to the landing level, said switch having an operating coil; a circuit for each of said coils; two pairs of contacts in each circuit, one of said pairs of contacts in each circuit being biased to open position and the other to closed position; and means actuated in accordance with car movement and operable when the car is being stopped at a landing for closing the biased open contacts in circuit with one of said coils and for opening the biased closed contacts in circuit with the other coil while permitting the opening of the biased open contacts in circuit with said other coil and the closing of the biased closed contacts in circuit with said one coil.

49. A control system for an elevator car serving a plurality of landings comprising; car actuating and stopping mechanism; a switch for causing operation of said mechanism to bring the car at a levelling speed from below a landing at which a stop is being made to the landing level, said switch having an operating coil; a switch for causing operation of said mechanism to bring the car at a levelling speed from above a landing at which a stop is being made to the landing level, said switch having an operating coil; a circuit for each of said coils; two pairs of contacts in each circuit, one of said pairs of contacts in each circuit being biased to open position and the other to closed position; and means actuated in accordance with car movement and operable when the car is being stopped at a landing for causing both of said contacts in the circuit for the coil of the up switch to be closed and both of said contacts in the circuit for the coil of the down switch to be open while the car is within a certain zone below the landing and for causing both of said contacts in the circuit for the coil of the down switch to be closed and both of said contacts in the circuit for the coil of the up switch to be open while the car is within a certain zone above the landing.

50. Levelling switching mechanism for an elevator car serving a plurality of landings comprising; contacts for causing movement of the car in the up direction; contacts for causing movement of the car in the down direction; interlock contacts connected in circuit with said up contacts; interlock contacts connected in circuit with said down contacts; means for causing both of said interlock contacts to be open during running of the car; and means operable when the car is being stopped at a landing for causing said up contacts to be closed, said interlock contacts for the up contacts to be closed and said interlock contacts for the down contacts to be open while the car is within a certain zone below the landing and for causing said down contacts to be closed, said interlock contacts for the down contacts to be closed and said interlock contacts for the up contacts to be open while the car is within a certain zone above the landing.

51. In a control system for an elevator car serving a plurality of landings; mechanism for starting and running the car and for slowing it down and bringing it to a stop at each of said landings; and levelling switching mechanism for causing said mechanism to bring the car to the landing level in case it overruns or underruns the landing at which a stop is being made, said levelling mechanism comprising up contacts for causing said mechanism to move the car in the up direction, down contacts for causing said mechanism to move the car in the down direction, contacts which serve as an electrical interlock for said up contacts, contacts which serve as an electrical interlock for said down contacts, electromagnetic means operable upon energization to close said up and said down contacts and to open both of said interlock contacts, and means actuated in accordance with car movement and operable upon deenergization of said electromagnetic means as the car is being stopped at a landing for causing said up contacts to be closed and said contacts which serve as an interlock for the down contacts to be open while the car is within a certain zone below the landing and for causing said down contacts to be closed and said contacts which serve as an interlock for the up contacts to be open while the car is within a certain zone above the landing.

52. Levelling switching mechanism for an elevator car comprising; two contacts; a member for moving said contacts; two additional contacts, one for each of the first named contacts, each additional contact being positioned in the path of movement of the first named contact for which it is provided and being adapted to be engaged thereby; a movable support for each additional contact; and means for limiting the movement of each support during operation of said member to cause the separation of one of said first named contacts from its additional contact before the separation of the other from its additional contact.

53. Levelling switching mechanism for an elevator car comprising; two contacts; a movable operating member for said contacts upon which the contacts are mounted; two additional contacts, one for each of the first named contacts, each additional contact being positioned in the path of movement of the contact on said member for which it is provided; a support for each of said additional contacts movable in the direction of movement of said member; a stop for each support for limiting the amount of movement thereof toward said member; means for moving said member to effect the engagement of each of said contacts thereon with its additional contact and for thereafter moving said support for that additional contact away from its stop; means for effecting return movement of said member; and means for maintaining each of said additional contacts in engagement with its contact on said member during such return movement until its support engages the stop therefor, said stops being positioned so that the separation of one of said contacts on said arm from its additional contact occurs before the separation of the other from its additional contact.

54. Levelling switching mechanism for an elevator car comprising; a pivoted arm; two contacts mounted on said arm for movement therewith; two additional contacts, one for each of the first named contacts, each additional contact being positioned in the path of movement of the contact on said arm for which it is provided; means for biasing said arm into position with the contacts thereon separated from their respective additional contacts; a support for each of said additional contacts movable in the direction of movement of said arm; a stop for each support for limiting the amount of movement thereof toward said arm; means for biasing each support into position against its stop; and means for causing movement of said arm against the force of its biasing means to effect the engagement of said contacts thereon with their respective additional contacts, said stops being positioned so that one of said contacts on said arm engages its additional contact before the engagement of the other with its additional contact, said arm, after the engagement of each of said other contacts thereon with its additional contact, moving said support for such additional contact away from its stop against the force of its biasing means as movement of the arm continues, said biasing means for each support acting, during return movement of said arm, to maintain the contact carried thereby in engagement with its contact on said arm until that support engages its stop, thereby effecting the separation of said other contacts on said arm from their respective additional contacts in the reverse order.

55. Levelling switching mechanism for an elevator car serving a landing comprising; a pivoted arm; three contacts mounted on said arm for movement therewith; three additional contacts, one for each of the first named contacts, each additional contact being positioned in the path of movement of the contact on said arm for which it is provided; means for biasing said arm into position with one of said contacts thereon in engagement with its additional contact and with the other contacts thereon separated from their respective additional contacts; a support for each of the latter two additional contacts movable in the direction of movement of said arm; an adjustable stop for each support for limiting the amount of movement thereof toward said arm; resilient means for each support for yieldingly maintaining it against its stop; and means for causing movement of said arm against the force of its biasing means to effect the separation of said one contact thereon from its additional contact and the engagement of the other contacts thereon with their respective additional contacts, said stops being adjusted so that one of said other contacts on said arm engages its additional contact before the engagement of the other with its additional contact takes place, said arm, after the engagement of each of said other contacts thereon with its additional contact, engaging said support for such additional contact and moving it away from its stop as continued movement of the arm takes place, said arm also acting, during its return movement by its biasing means, to maintain such engagement with each of said supports until that support engages its stop, thereby effecting the separation of said other contacts on said arm from their respective additional contacts in the reverse order.

EDWARD LEE DUNN.
DAVID CARL LARSON.